(12) United States Patent
Matsusaka

(10) Patent No.: US 8,369,022 B2
(45) Date of Patent: Feb. 5, 2013

(54) VARIABLE MAGNIFICATION OPTICAL SYSTEM, IMAGE PICKUP DEVICE AND DIGITAL APPARATUS

(75) Inventor: Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 401 days.

(21) Appl. No.: 12/782,316

(22) Filed: May 18, 2010

(65) Prior Publication Data

US 2010/0295985 A1 Nov. 25, 2010

(30) Foreign Application Priority Data

May 19, 2009 (JP) ................................ 2009-121137
Apr. 26, 2010 (JP) ................................ 2010-100725

(51) Int. Cl.
| | |
|---|---|
| G02B 13/08 | (2006.01) |
| G02B 3/00 | (2006.01) |
| G02B 7/00 | (2006.01) |
| G02B 9/00 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |
| G02B 15/14 | (2006.01) |
| G02B 9/34 | (2006.01) |
| G02B 13/16 | (2006.01) |

(52) U.S. Cl. ........ 359/686; 359/642; 359/676; 359/680; 359/781; 348/335

(58) Field of Classification Search ............. 348/207.99, 348/240.99–240.3, 335–357, 373–376; 359/642, 359/676–706, 745–754, 763–783

See application file for complete search history.

(56) References Cited

U.S. PATENT DOCUMENTS

| | | | | |
|---|---|---|---|---|
| 7,158,315 | B2 * | 1/2007 | Shibayama | 359/690 |
| 7,336,429 | B2 * | 2/2008 | Shibayama | 359/690 |
| 7,679,837 | B2 * | 3/2010 | Souma | 359/690 |
| 7,889,439 | B2 * | 2/2011 | Take | 359/690 |
| 2004/0169934 | A1 * | 9/2004 | Oomura et al. | 359/687 |
| 2008/0285150 | A1 * | 11/2008 | Souma | 359/690 |
| 2009/0046375 | A1 * | 2/2009 | Wakazono et al. | 359/688 |
| 2009/0135500 | A1 * | 5/2009 | Sudoh et al. | 359/686 |
| 2010/0085647 | A1 * | 4/2010 | Nurishi | 359/687 |
| 2010/0188553 | A1 * | 7/2010 | Mihara et al. | 348/340 |
| 2010/0238564 | A1 * | 9/2010 | Kubota et al. | 359/687 |
| 2011/0273774 | A1 * | 11/2011 | Saruwatari | 359/554 |
| 2012/0105708 | A1 * | 5/2012 | Hagiwara | 348/345 |

FOREIGN PATENT DOCUMENTS

JP 2006-98962 A 4/2006

\* cited by examiner

*Primary Examiner* — Jason Chan
*Assistant Examiner* — Michael Osinski
(74) *Attorney, Agent, or Firm* — Cozen O'Connor

(57) ABSTRACT

A variable magnification optical system of the present invention and an image pickup device and a digital apparatus including this are provided with a four-component optical system of negative-negative-positive-negative arrangement, wherein a first lens group thereof includes only one negative lens as a lens having an optical power, and a third lens group thereof satisfies a conditional expression of $1.4 < \beta 3t/\beta 3w < 4$ when $\beta 3t$ and $\beta 3w$ respectively denote image magnifications of the third lens group at a telephoto end and at a wide-angle end. The variable magnification optical system, the image pickup device and the digital apparatus having such a construction can be further downsized.

24 Claims, 37 Drawing Sheets

1B

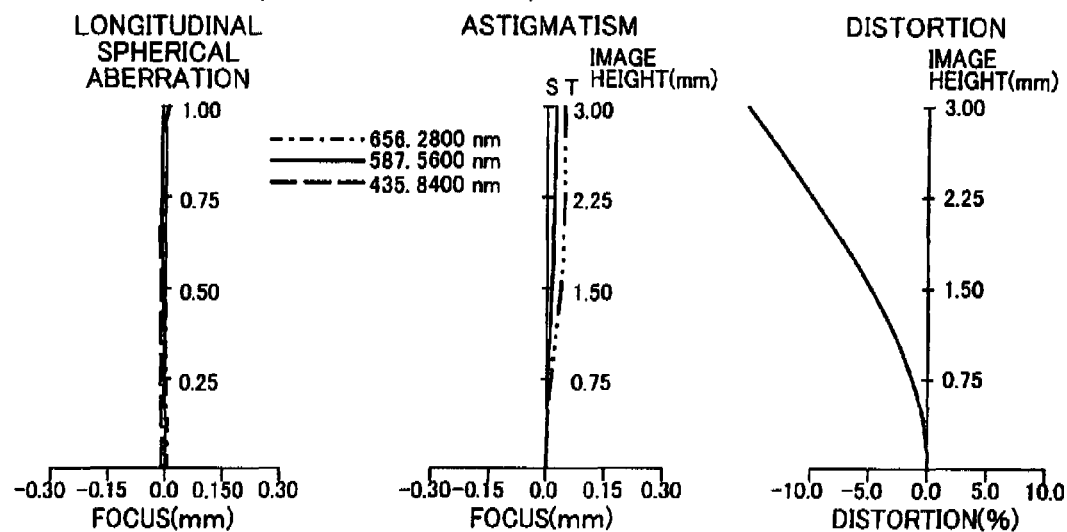
FIG. 24A FIRST EXAMPLE (WIDE-ANGLE END)
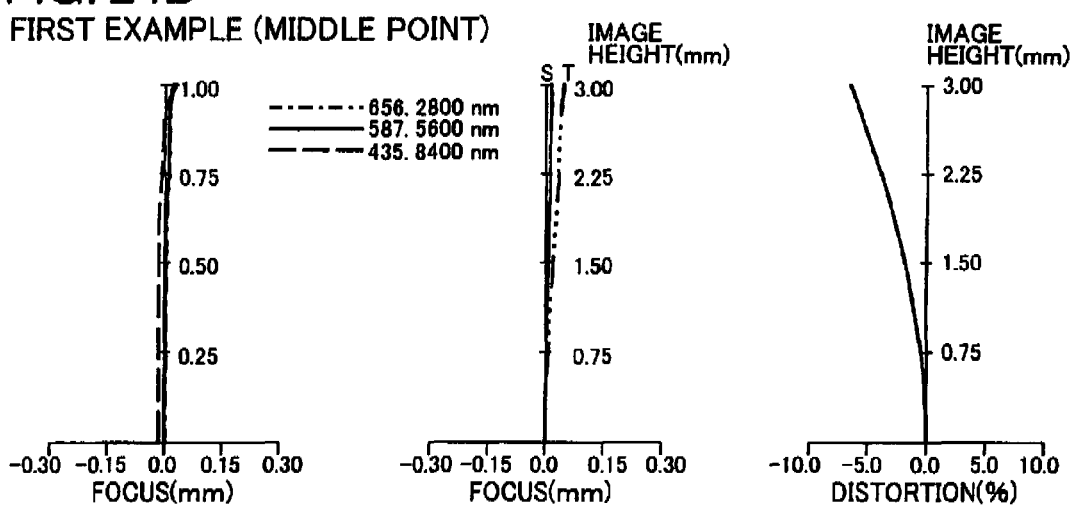
FIG. 24B FIRST EXAMPLE (MIDDLE POINT)
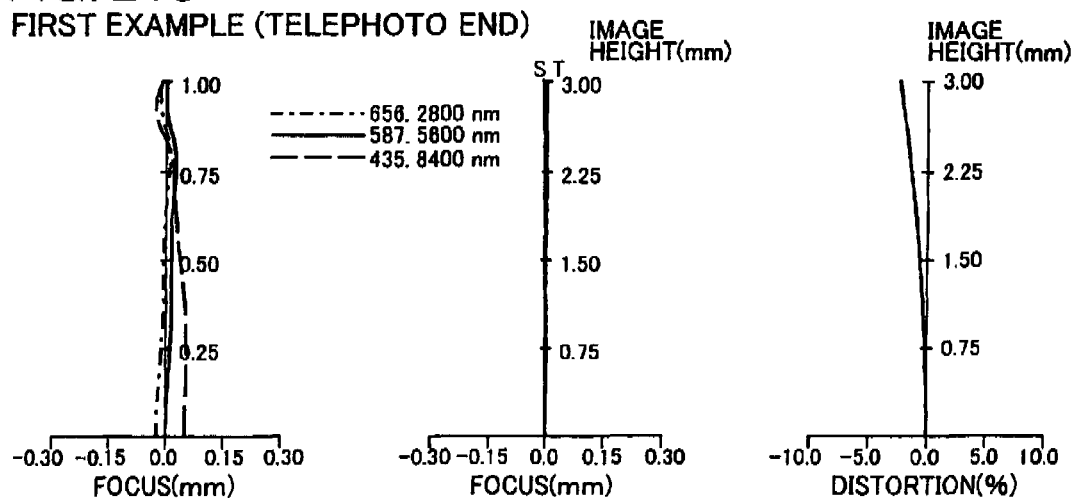
FIG. 24C FIRST EXAMPLE (TELEPHOTO END)

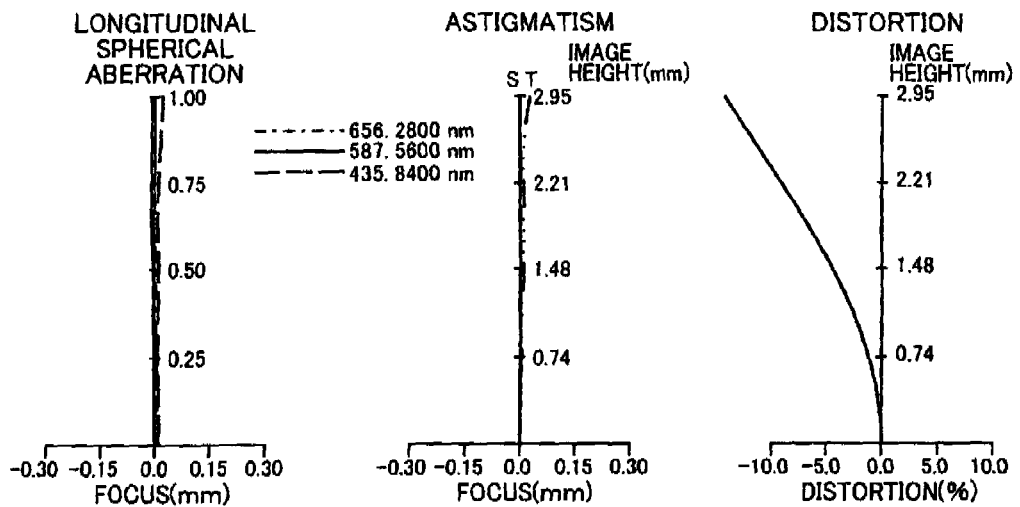
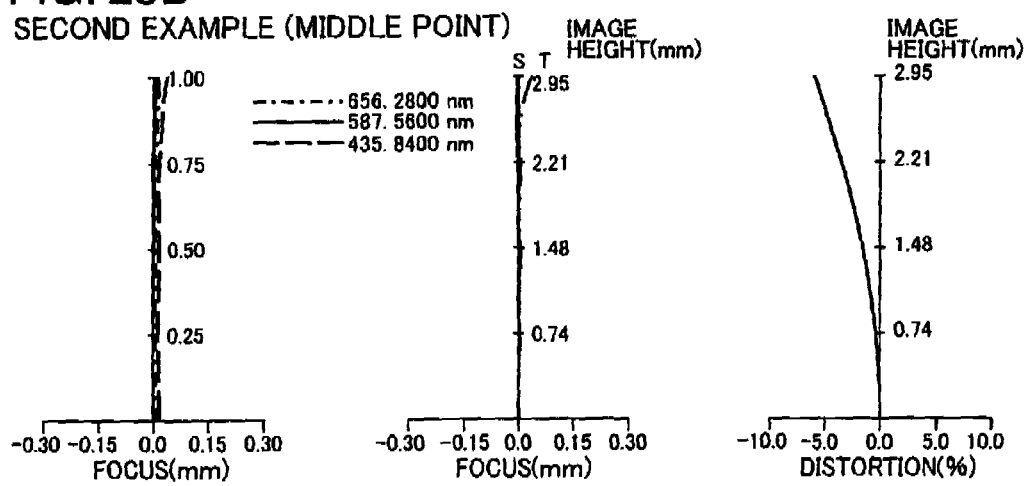
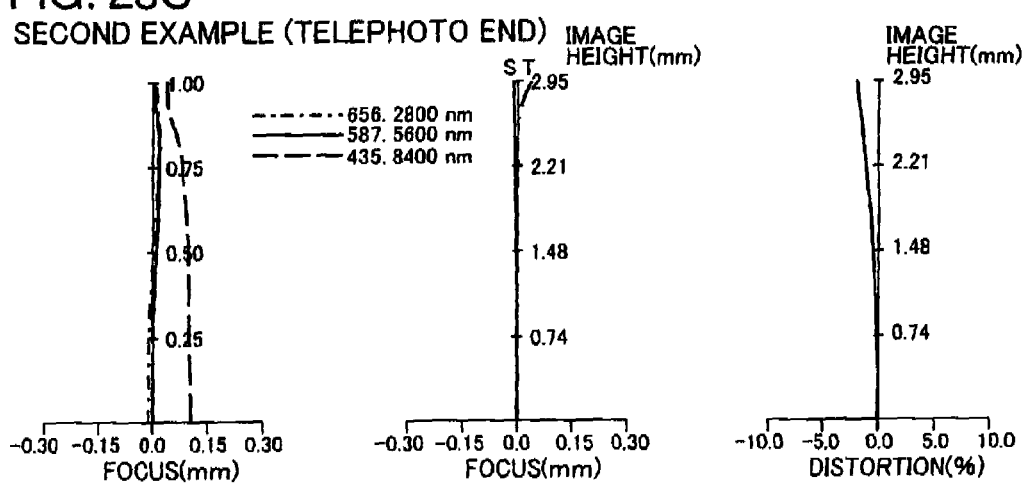

THIRD EXAMPLE (WIDE-ANGLE END)

THIRD EXAMPLE (MIDDLE POINT)

THIRD EXAMPLE (TELEPHOTO END)

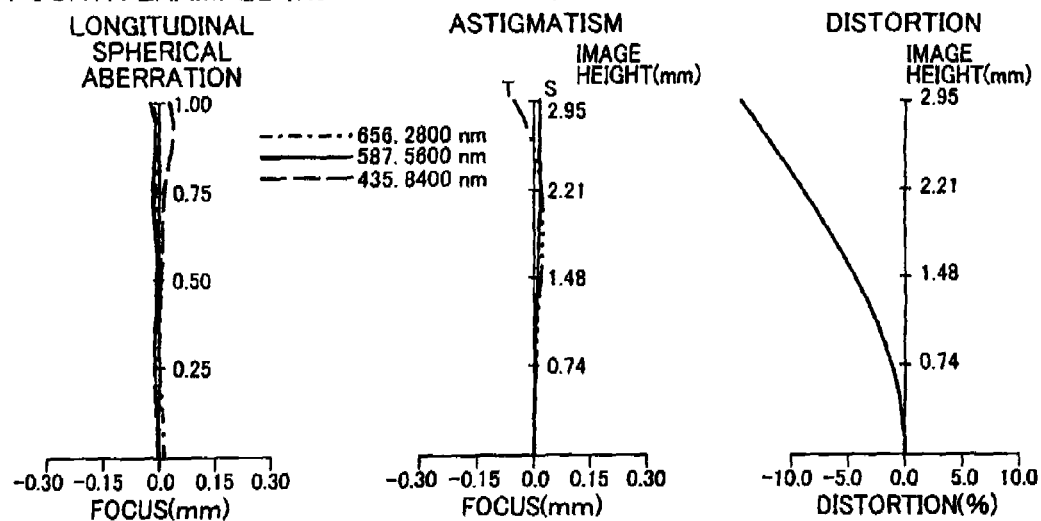
FIG. 27A FOURTH EXAMPLE (WIDE-ANGLE END)
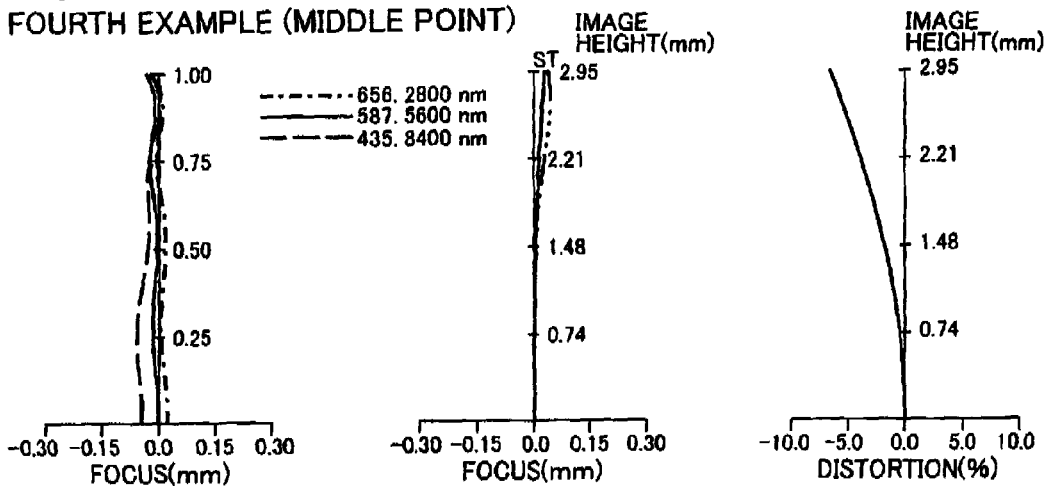
FIG. 27B FOURTH EXAMPLE (MIDDLE POINT)
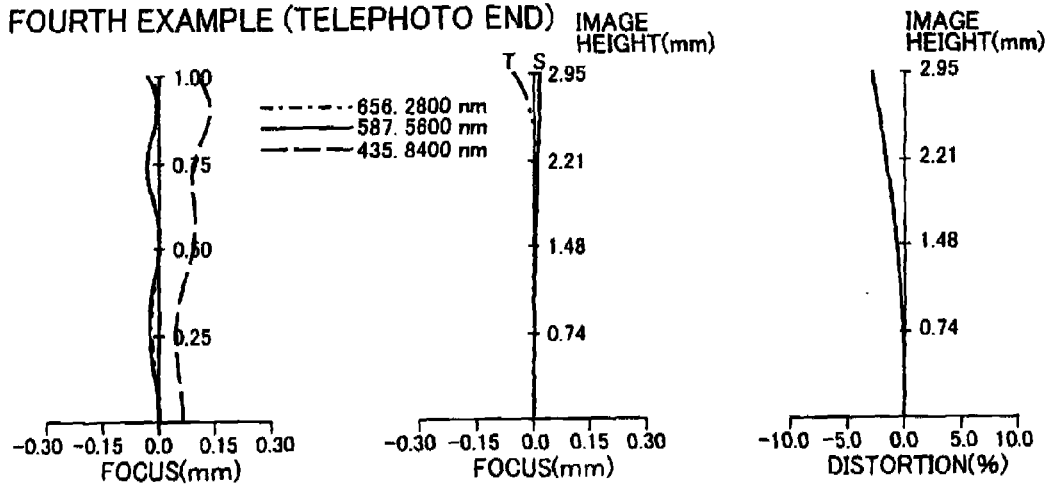
FIG. 27C FOURTH EXAMPLE (TELEPHOTO END)

FIFTH EXAMPLE (WIDE-ANGLE END)

FIFTH EXAMPLE (MIDDLE POINT)

FIFTH EXAMPLE (TELEPHOTO END)

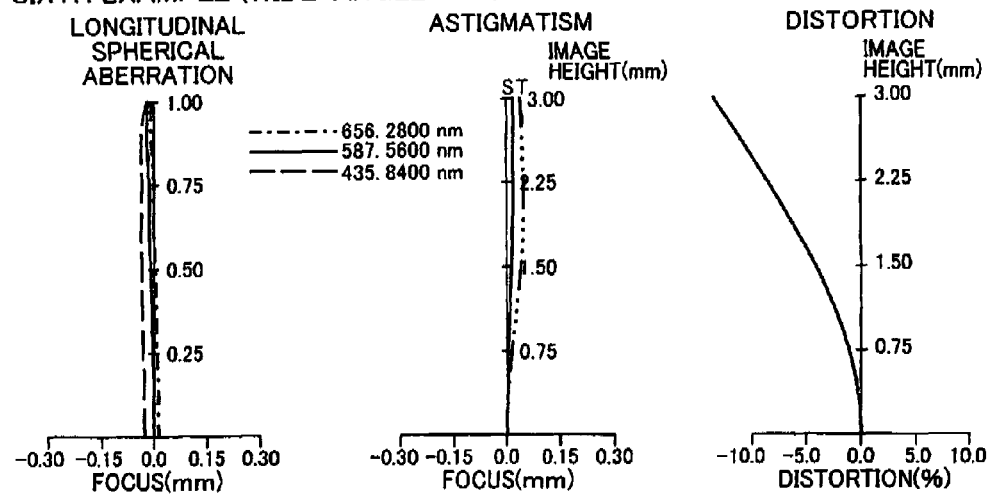
FIG. 29A SIXTH EXAMPLE (WIDE-ANGLE END)
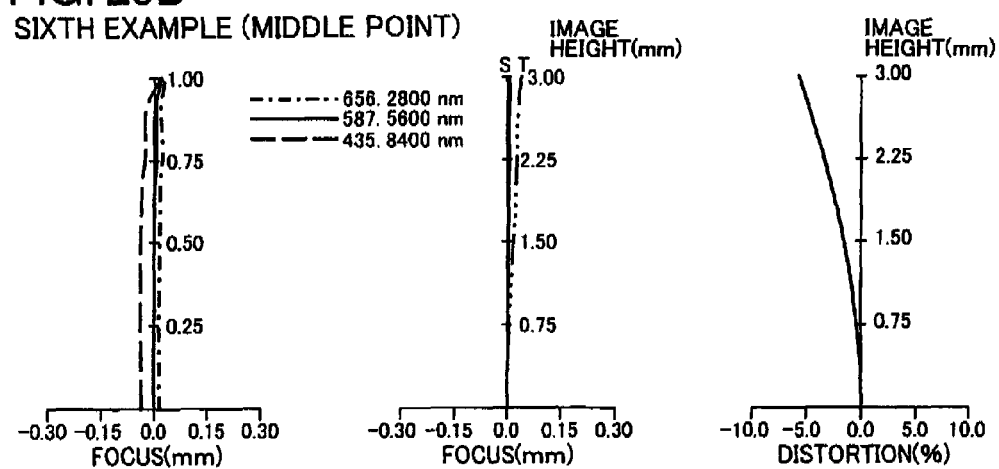
FIG. 29B SIXTH EXAMPLE (MIDDLE POINT)
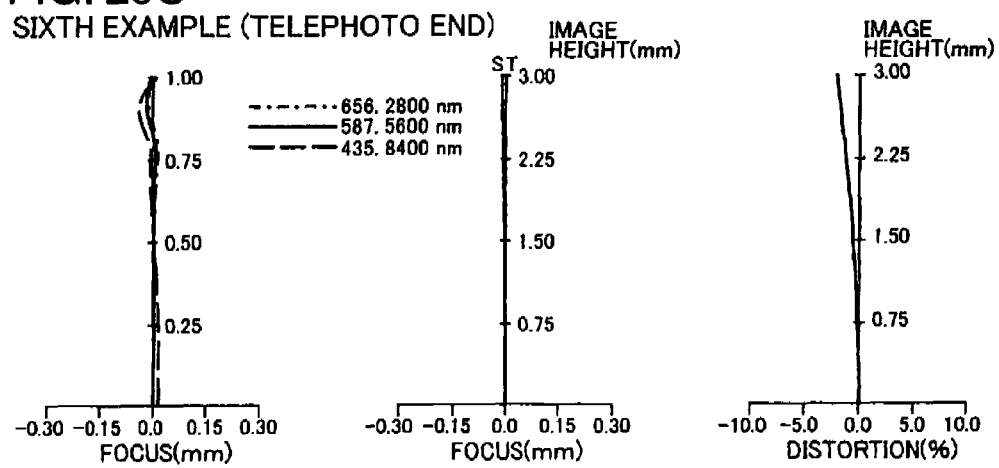
FIG. 29C SIXTH EXAMPLE (TELEPHOTO END)

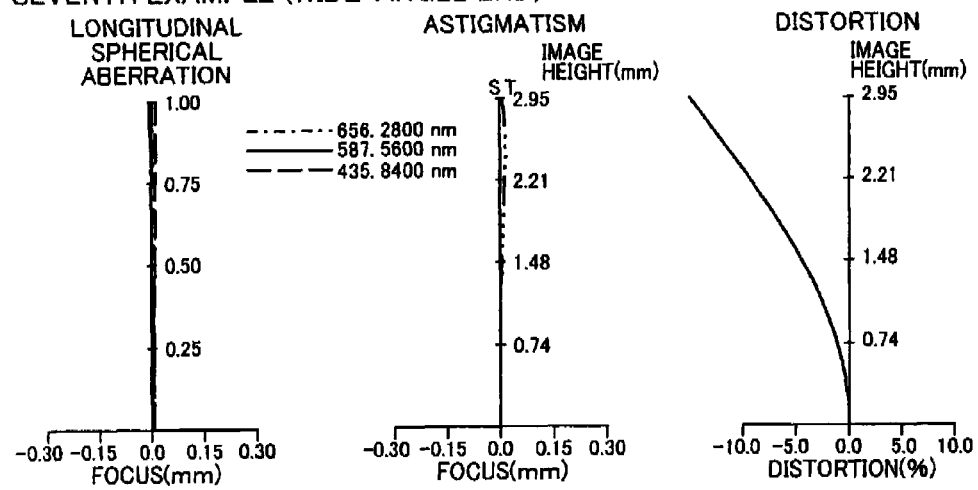
FIG. 30A SEVENTH EXAMPLE (WIDE-ANGLE END)
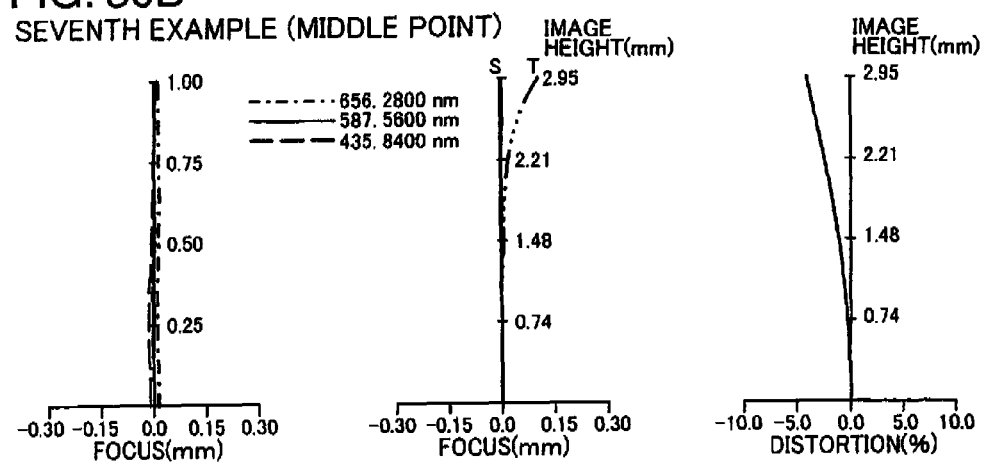
FIG. 30B SEVENTH EXAMPLE (MIDDLE POINT)
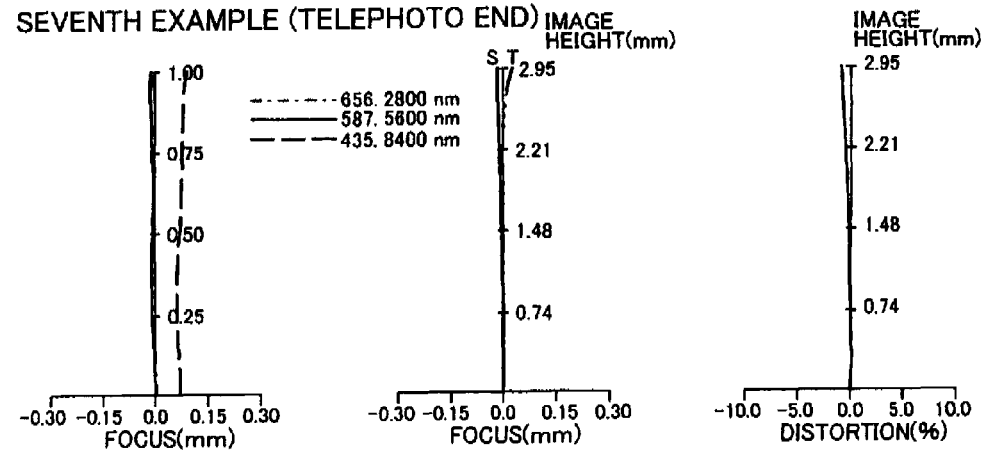
FIG. 30C SEVENTH EXAMPLE (TELEPHOTO END)

EIGHTH EXAMPLE (WIDE-ANGLE END)

EIGHTH EXAMPLE (MIDDLE POINT)

EIGHTH EXAMPLE (TELEPHOTO END)

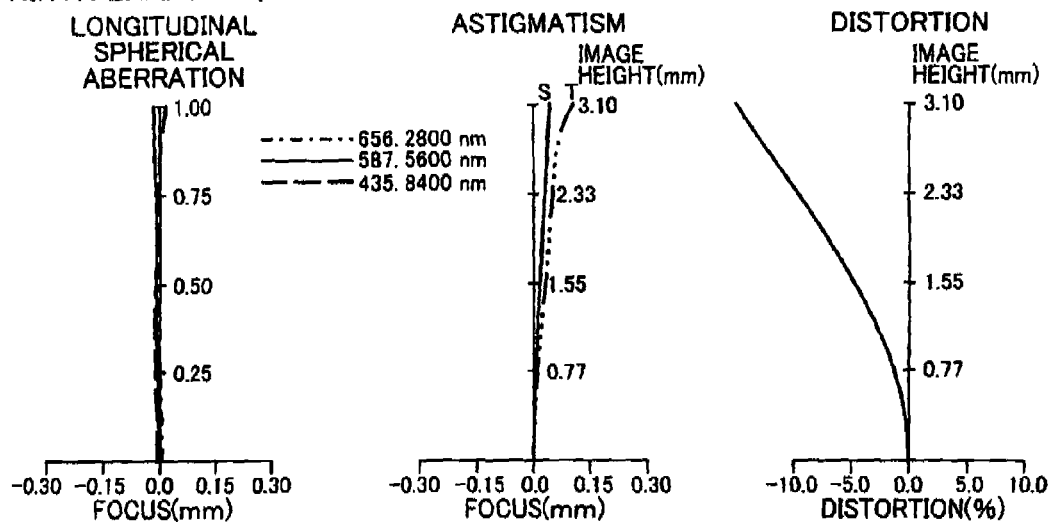
FIG. 32A NINTH EXAMPLE (WIDE-ANGLE END)
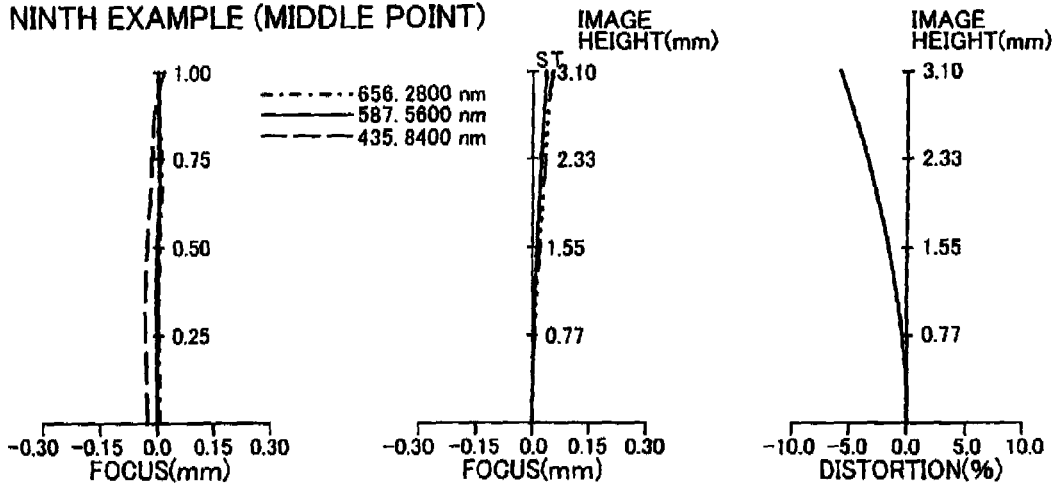
FIG. 32B NINTH EXAMPLE (MIDDLE POINT)
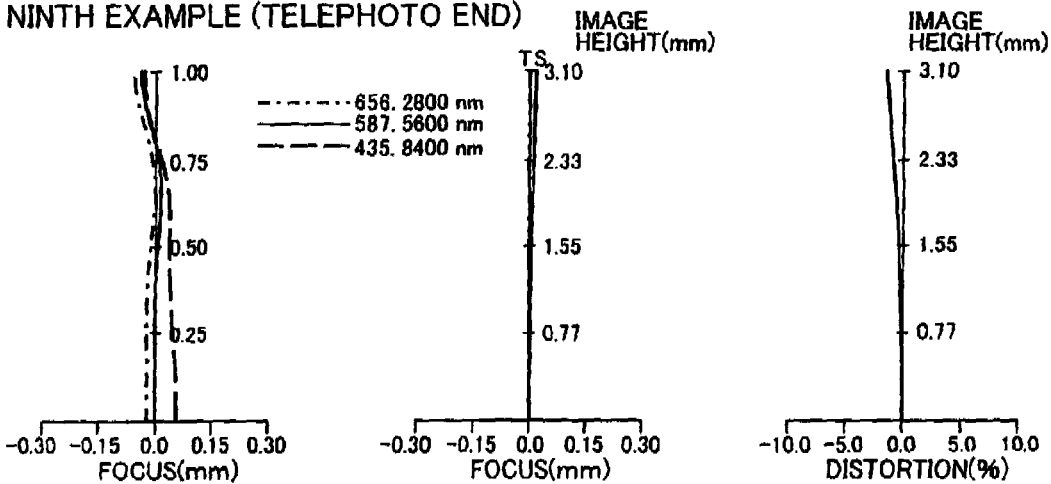
FIG. 32C NINTH EXAMPLE (TELEPHOTO END)

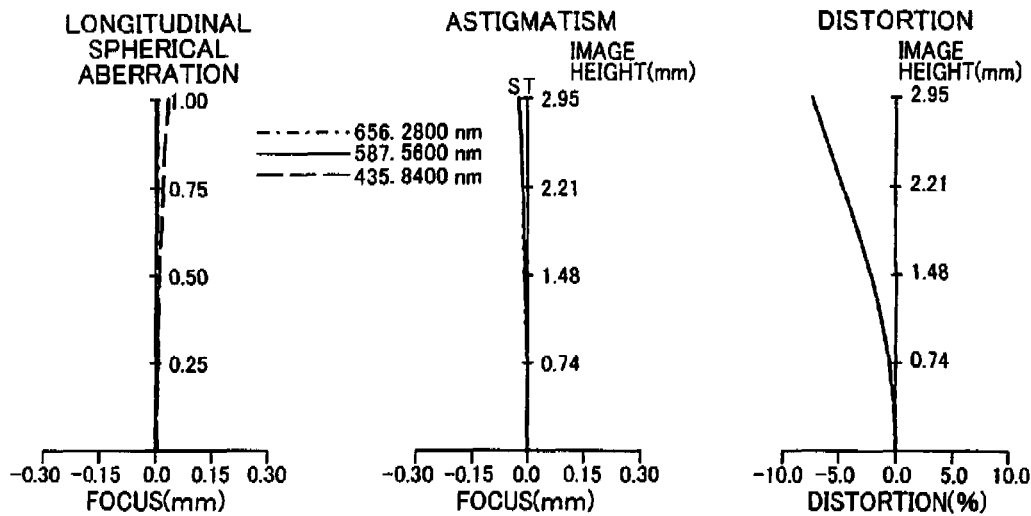
FIG. 33A TENTH EXAMPLE EXAMPLE (WIDE-ANGLE END)
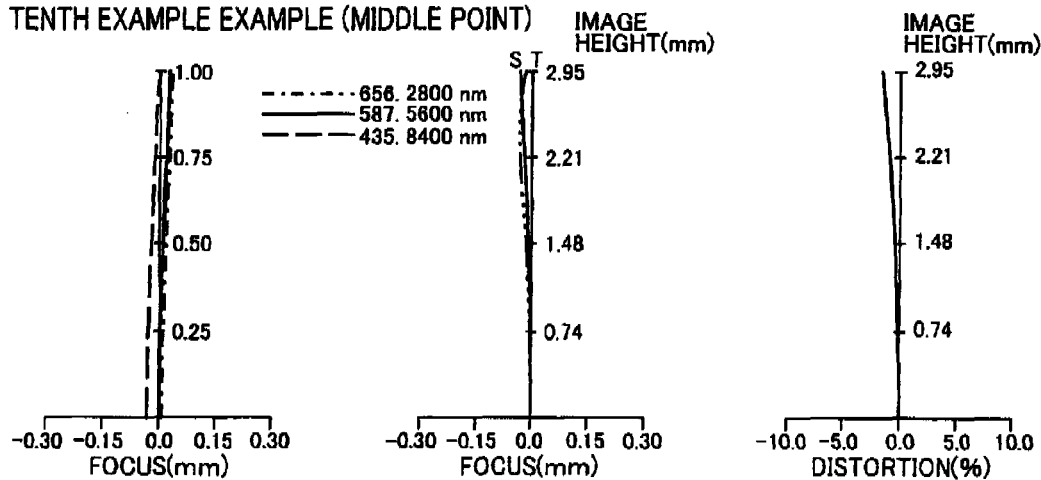
FIG. 33B TENTH EXAMPLE EXAMPLE (MIDDLE POINT)
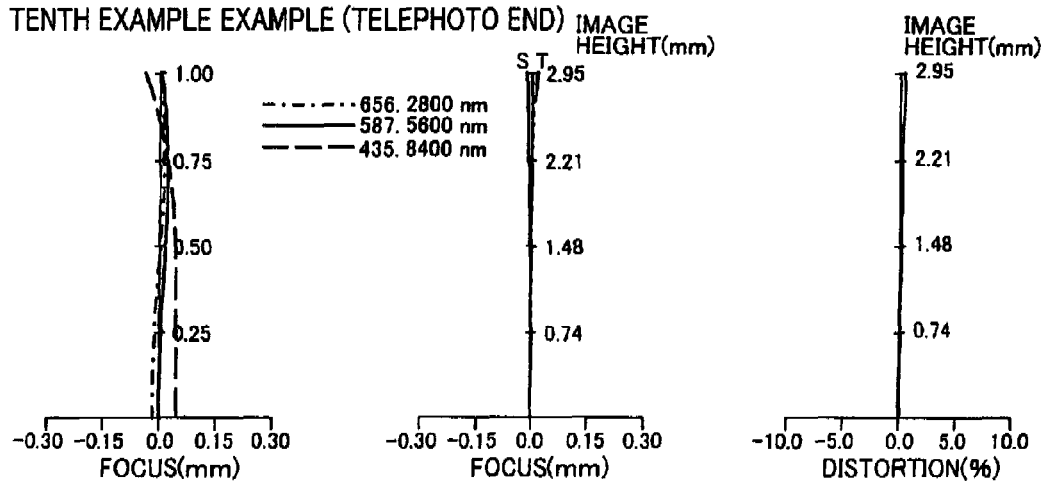
FIG. 33C TENTH EXAMPLE EXAMPLE (TELEPHOTO END)

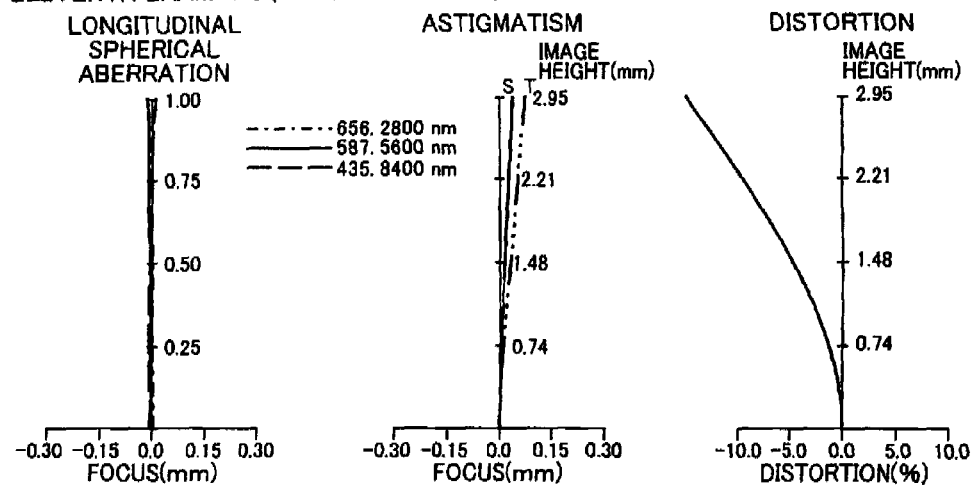
FIG. 34A ELEVENTH EXAMPLE (WIDE-ANGLE END)
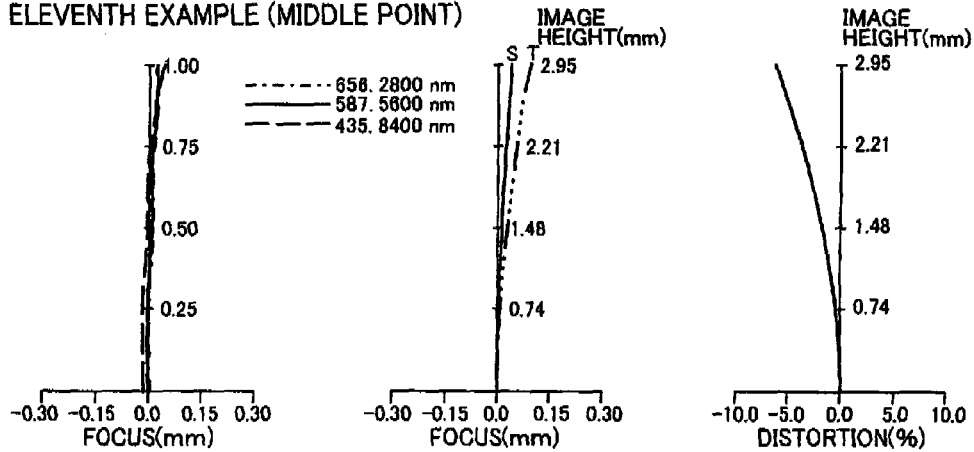
FIG. 34B ELEVENTH EXAMPLE (MIDDLE POINT)
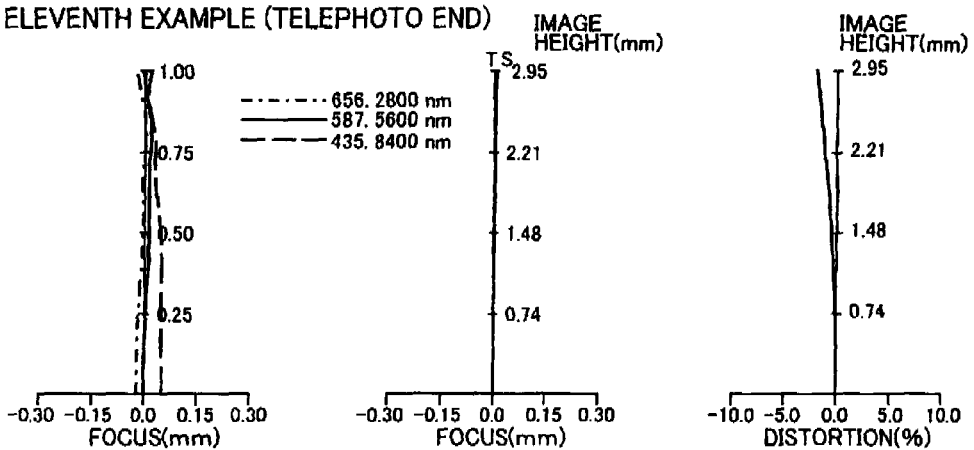
FIG. 34C ELEVENTH EXAMPLE (TELEPHOTO END)

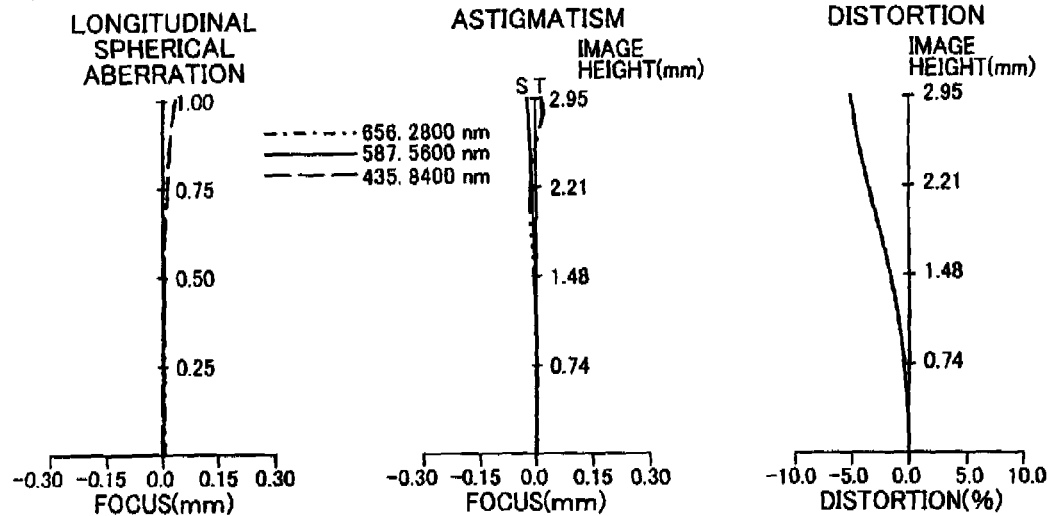
FIG. 35A TWELFTH EXAMPLE (WIDE-ANGLE END)
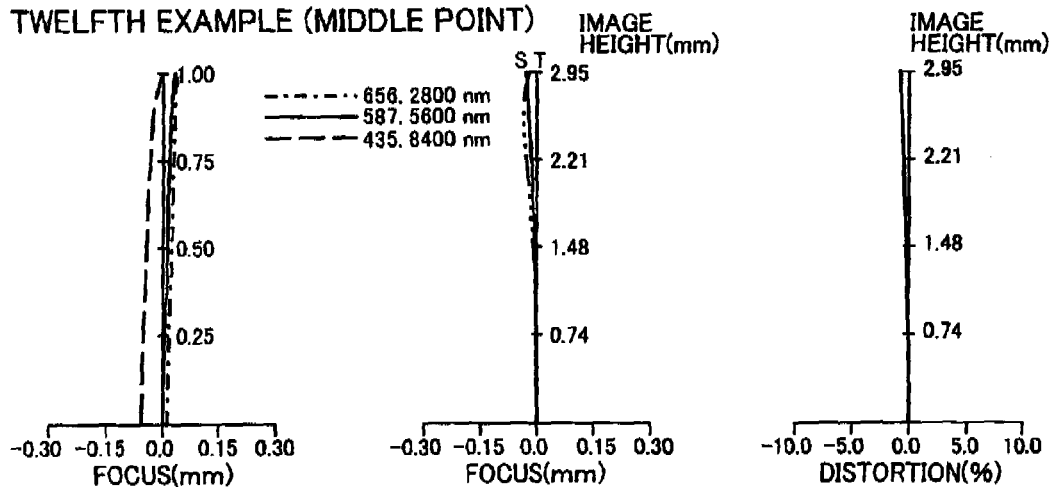
FIG. 35B TWELFTH EXAMPLE (MIDDLE POINT)
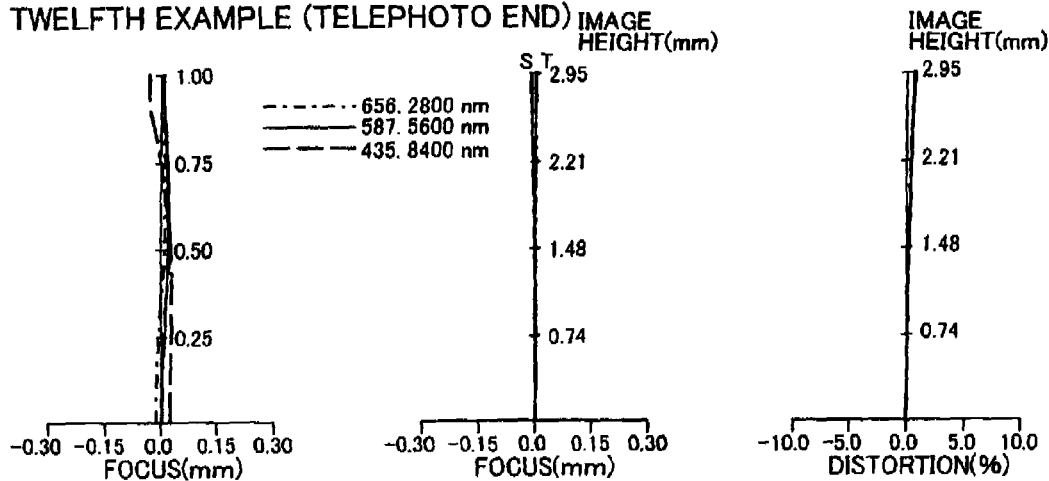
FIG. 35C TWELFTH EXAMPLE (TELEPHOTO END)

THIRTEENTH EXAMPLE (WIDE-ANGLE END)

THIRTEENTH EXAMPLE (MIDDLE POINT)

THIRTEENTH EXAMPLE (TELEPHOTO END)

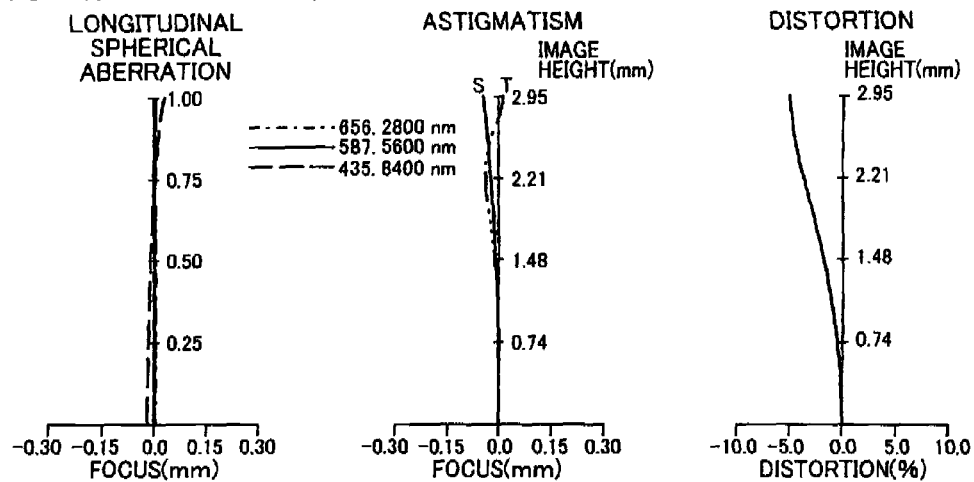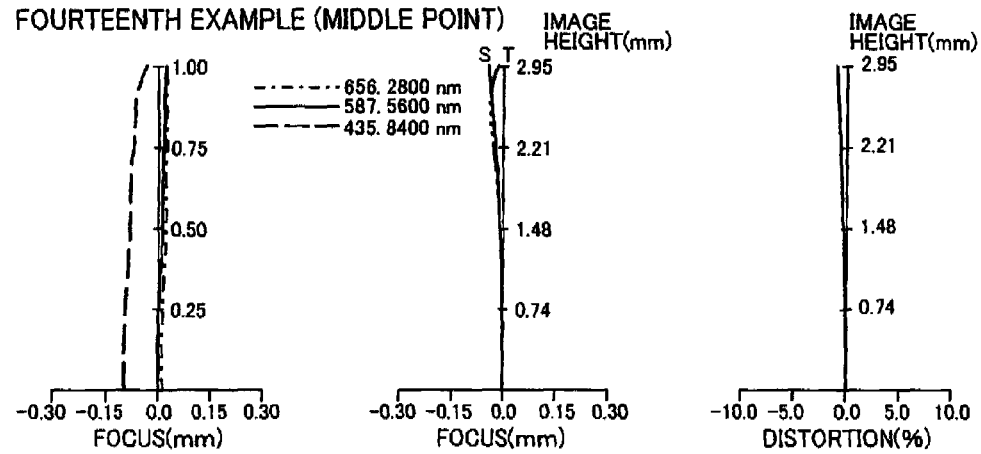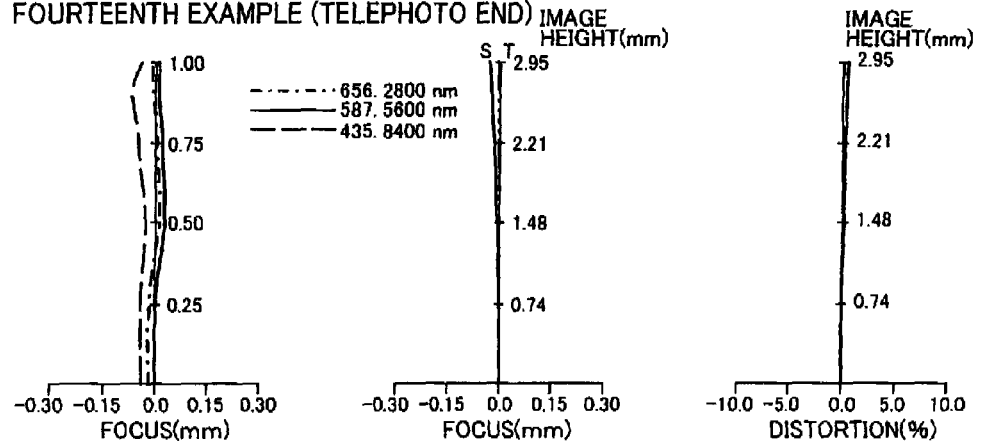

US 8,369,022 B2

VARIABLE MAGNIFICATION OPTICAL SYSTEM, IMAGE PICKUP DEVICE AND DIGITAL APPARATUS

This application is based on Japanese Patent Applications No. 2009-121137 filed on May 19, 2009 and No. 2010-100725 filed on Apr. 26, 2010, the contents of which are hereby incorporated by reference.

BACKGROUND OF THE INVENTION

1. Field of the Invention

The present invention relates to a variable magnification optical system, particularly a variable magnification optical system which can be downsized. The present invention also relates to an image pickup device including this variable magnification optical system and a digital apparatus incorporating this image pickup device.

2. Description of the Background Art

In recent years, there has been a remarkable increase in the use of mobile terminals provided with a mobile communication function such as mobile phones and PDAs (Personal Digital Assistants), and compact image pickup devices capable of still image recording and video recording such as digital still cameras and digital video cameras are built in these apparatuses in many cases. The image pickup devices incorporated in these apparatuses normally have strict size (volume) and cost restrictions. Thus, image pickup devices using a smaller image pickup element with a smaller number of pixels as compared with standalone so-called digital cameras and including a single-focus optical system composed of about one to three plastic lenses have been generally adopted. However, the image pickup devices incorporated in these apparatuses have also come to include more pixels and become more functional. Thus, there is a demand for a compact variable magnification optical system compatible with a high-pixel image pickup element and capable of recording an object distant from a photographer at a zoom ratio exceeding about 2.5× and being incorporated into these apparatuses.

A variable magnification optical system disclosed in Japanese Unexamined Patent Publication No. 2006-098962 (D1) can be, for example, cited as such a variable magnification optical system. The variable magnification optical system disclosed in this document D1 is a four-component optical system of negative-negative-positive-negative arrangement designed to be compact for a so-called digital camera, but is not sufficiently downsized in being incorporated into the above apparatuses such as the mobile phones.

SUMMARY OF THE INVENTION

In view of the above situation, an object of the present invention is to provide a variable magnification optical system which can be downsized and an image pickup device and a digital apparatus including this.

A variable magnification optical system according to the present invention and an image pickup device and a digital apparatus including this are provided with a four-component optical system of negative-negative-positive-negative arrangement, wherein a first lens group thereof includes only one negative lens as a lens having an optical power, and a third lens group thereof satisfies a conditional expression of $1.4 < \beta 3t/\beta 3w < 4$ when $\beta 3t$ and $\beta 3w$ respectively denote image magnifications of the third lens group at a telephoto end and at a wide-angle end. The variable magnification optical system, the image pickup device and the digital apparatus having such a construction can be further downsized.

Here, downsizing (miniaturization) mentioned in the present invention means such a level as to satisfy "TL/2Y'<5.2" in the entire variable magnification optical system when TL denotes a distance from a lens surface closest to an object to an image-side focus on an optical axis at a wide-angle end and 2Y' denotes the length of a diagonal of an imaging surface of a solid-state image pickup element (length of a diagonal of a rectangular effective pixel area of the solid-state image pickup element). This enables the downsizing of the entire variable magnification optical system, with the result that a reduction in size and weight of the entire image pickup device and that of the entire digital apparatus also become possible.

These and other objects, features and advantages of the present invention will become more apparent upon reading the following detailed description along with the accompanying drawings.

EMBODIMENTS OF THE INVENTION

Figure 1:
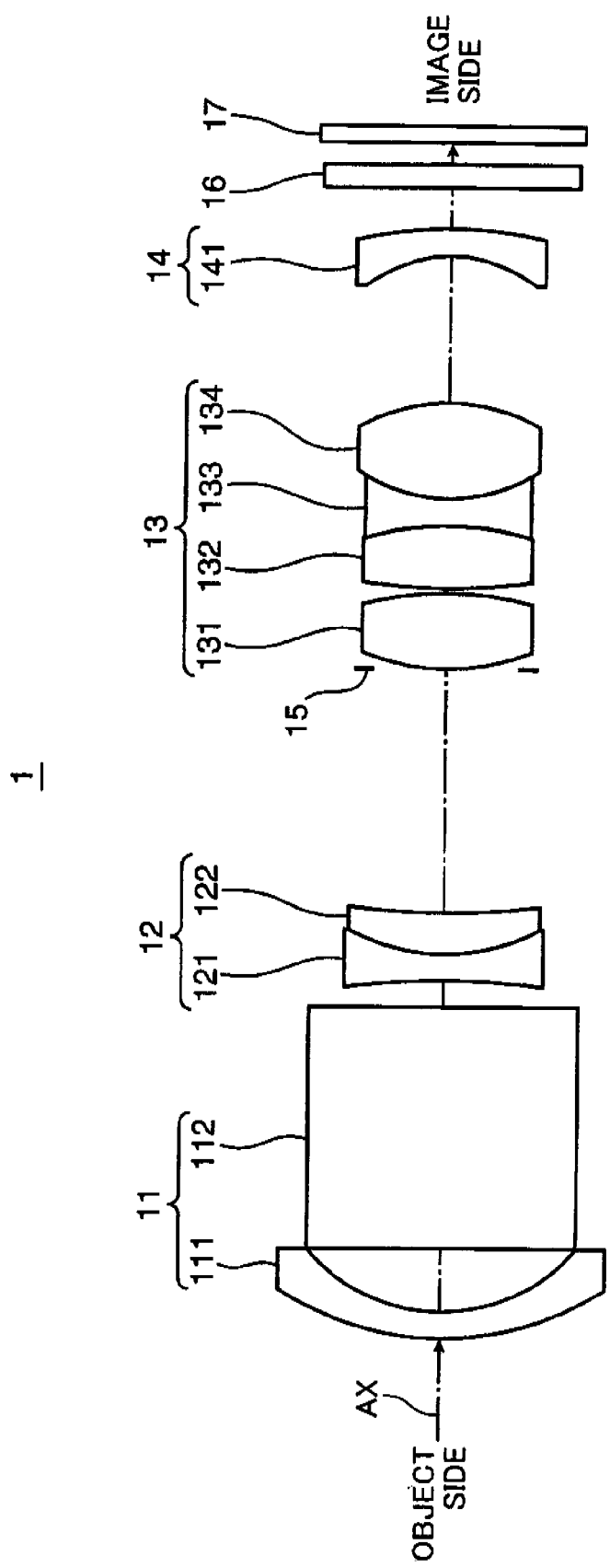
FIG. 1 is a section diagrammatically showing the construction of a variable magnification optical system according to a first embodiment of the present invention.

Hereinafter, embodiments of the present invention are described with reference to the drawings. Constructions identified by the same reference numerals in the respective drawings are the same constructions and not repeatedly described unless necessary.

Terms used in the following description are defined as follows in this specification.

(a) A refractive index is the one for a wavelength (587.56 nm) of a d-beam.

(b) An Abbe number is an Abbe number vd obtained by a definition equation:

$$vd=(nd-1)/(nF-nC)$$

when nd, nF, nC denote refractive indices for a d-beam, an F-beam (wavelength: 486.13 nm) and a C-beam (wavelength: 656.28 nm) and vd denotes an Abbe number.

(c) Expressions "concave", "convex" and "meniscus" used to describe lenses indicate lens shapes near an optical axis (near lens centers).

(d) Optical powers (inverses of focal lengths) of single lenses constituting a cemented lens are powers when there is air at the opposite sides of lens surfaces of the single lenses.

(e) Since a resin material used for a hybrid aspherical lens has only an additional function of a substrate glass material, it is not handled as a single optical member, but handled similar to the case where the substrate glass material has an aspherical surface and is considered to be one lens. A lens refractive index is also considered to be a refractive index of the glass material to become a substrate. The hybrid aspherical lens is a lens formed to have an aspherical surface shape by applying a thin layer of the resin material on the glass material to become the substrate.

(f) The number of lenses in the cemented lens is not counted as one as the entire cemented lens, but is counted as the number of the single lenses constituting the cemented lens.

First Embodiment

FIG. 1 is a section diagrammatically showing a lens construction of a variable magnification optical system according to a first embodiment of the present invention.

In FIG. 1, this variable magnification optical system 1 is for forming an optical image of an object (subject) on a light receiving surface (image plane) of an image pickup element 17 for converting the optical image into an electrical signal, and includes a first lens group 11 having a negative optical power, a second lens group 12 having a negative optical power, a third lens group 13 having a positive optical power and a fourth lens group 14 having a negative optical power successive from an object side to an image side, wherein the first lens group 11 includes only one negative lens as a lens having an optical power. The variable magnification optical system 1 shown in FIG. 1 has the same construction as a variable magnification optical system 1A (FIG. 4) of a first example to be described later.

In an example shown in FIG. 1, the first lens group 11 is fixed at the time of zooming from a wide-angle end to a telephoto end and composed of a negative meniscus lens 111 convex toward the object side as the one negative lens and a prism 112 in this order from the object side to the image side. The second lens group 12 is moved at the time of zooming and composed of a biconcave negative lens 121 and a positive meniscus lens 122 convex toward the object side in this order from the object side to the image side. The third lens group 13 is moved at the time of zooming and composed of a biconvex positive lens 131, a biconvex positive lens 132, a biconcave negative lens 133 and a biconvex positive lens 134 in this order from the object side to the image side. The fourth lens group 14 is moved at the time of zooming and composed of a negative meniscus lens 141 convex toward the image side.

Both surfaces of each of the positive lens 131 and the negative meniscus lens 141 are aspherical surfaces. These aspherical lenses, i.e. the positive lenses 131 and the negative meniscus lens 141 may be, for example, glass molded lenses or lenses made of a resin material such as a plastic. Particularly, the lenses made of the resin material are preferable in terms of weight saving in the case of incorporation into a mobile terminal. In the example shown in FIG. 1, the negative meniscus lens 141 is made of the resin material. The negative lens 121 and the positive meniscus lens 122, and the positive lens 132, the negative lens 133 and the positive lens 134 respectively form cemented lenses.

In the variable magnification optical system 1, an optical diaphragm ST is arranged at the object side of the positive lens 131 and moved together with the third lens group 13. The optical diaphragm ST may be a mechanical shutter.

The variable magnification optical system 1 according to this embodiment satisfies the following conditional expression (1) if β3t denotes an image magnification of the third lens group 13 at the telephoto end and β3w denotes an image magnification of the third lens group 13 at the wide-angle end. Alternatively, this variable magnification optical system 1 satisfies the following conditional expression (2) if Z denotes a zoom ratio of the entire system. This conditional expression (2) specifies the variable magnification optical system 1 in terms of the zoom ratio Z of the entire system.

$$1.4 < \beta 3t/\beta 3w < 4 \quad (1)$$

or $$0.5 < (\beta 3t/\beta 3w)/Z < 2 \quad (2)$$

A filter 16 and an image pickup element 17 are arranged at the image side of this variable magnification optical system 1. The filter 16 is an optical element in the form of a parallel plate and diagrammatically shows various optical filters, a cover glass of the image pickup element, and the like. An optical filter such as a low-pass filter or an infrared cut filter can be suitably arranged depending on the intended use, the constructions of the image pickup element and the camera, etc. The image pickup element 17 is an element for photoelectrically converting an optical image of a subject focused by the variable magnification optical system 1 into image signals of respective color components of R (red), G (green) and B (blue) according to the light quantity of the optical image and outputting the image signals to a specified image processing circuit (not shown). Thus, the optical image of the subject at the object side is introduced at a suitable zoom ratio to a light receiving surface of the image pickup element 17 along an optical axis AX of the variable magnification optical system 1 by the variable magnification optical system 1 and is picked up by the image pickup element 17.

The variable magnification optical system 1 thus constructed is a negative-lead optical system and is advantageous as a zoom lens whose zoom ratio is about 2 to 3× in terms of the entire length of the optical system, a front lens diameter size and error sensitivity. Further, in this variable magnification optical system 1, an optical axis adjustment between lenses in the first lens group 11 where decentration sensitivity tends to be strict becomes unnecessary and a relatively large cost reduction is possible by including only one negative lens as a lens having an optical power in the first lens group 11. Since the third lens group 13 mainly bears a zooming burden in this variable magnification optical system 1, the zooming burden of the third lens group 13 is large. By satisfying the conditional expression (1) or (2), the entire variable magnification optical system 1 (unit) can be downsized by shortening a movement amount for zooming. In other words, below the lower limit of the conditional expression (1) or (2), a moving distance at the time of zooming increases and the variable magnification optical system 1 cannot be downsized, which is not preferable.

On the other hand, above the upper limit of the conditional expression (1) or (2), the decentration sensitivity of the third lens group 13 becomes too high and an on-axis coma aberration and blurring asymmetric on a screen called one side blurring occur, thereby leading to a deteriorated image quality, which is not preferable.

In this variable magnification optical system 1, the first lens group 11 is fixed at the time of zooming. Such a construction can suppress a lens effective diameter of the first lens group 11. Further, in the case of making the first lens group 11 movable, a driving device for driving the first lens group 11 needs to be arranged outside the first lens group 11, which leads to an increased size in an outer diameter direction. Thus, it is very effective for the downsizing in the outer diameter direction to fix the first lens group 11 at the time of zooming.

In this variable magnification optical system 1, the first lens group 11 includes the prism 112 as a reflecting member. The prism 112 is a deviation prism for changing a direction of a beam and is a polygonal body made of a transparent medium and including planes not parallel to each other as an incident surface and an emergent surface for the beam. The prism 112 is, for example, a triangular prism whose bottom surface has an isosceles right triangular shape, and an optical path is bent by a slant surface of the prism. The slant surface includes a reflective film if necessary. In this way, the variable magnification optical system 1 is constructed as a so-called bending optical system. Thus, the variable magnification optical system 1 can be thinned in a direction from an object toward the incident surface of the variable magnification optical system 1. Therefore, a degree of freedom in the shape of an apparatus incorporating the variable magnification optical system 1 according to this embodiment can be increased.

In this variable magnification optical system 1, the first lens group 11 includes the prism 112 as the reflecting member and only one negative meniscus lens 111 at the object side of the reflecting member (prism 112). By providing only one negative lens (negative meniscus lens 111), the thickness of the lens unit can be suppressed in the case of arranging the negative lens closer to the object side than the reflecting member (prism 112) and a distance between the first lens group 11 and the second lens group 12 can be reduced in the case of arranging the negative lens at the image side of the reflecting member (prism 112). Thus, it is effective in shortening the entire length of the optical system to include only one negative lens.

In this variable magnification optical system 1, at the time of zooming from the wide-angle end to the telephoto end, the second lens group 12 is moved along a path convex toward the image side as described later. By such a movement path of the second lens group 12, a focus position deviation caused by movements of the other lens groups can be kept constant.

In this variable magnification optical system 1, the second lens group 12 is composed of the cemented lens formed by cementing the negative lens 121 and the positive lens 122. By this construction, it is possible to suppress production error sensitivity of each lens in the second lens group 12, particularly, decentration sensitivity.

In this variable magnification optical system 1, at least one aspherical surface is included in the third lens group 13. In the example shown in FIG. 1, the both surfaces of the positive lens 131 are aspherical surfaces. By including the aspherical surfaces in the third lens group 13 in this way, specified aberrations, e.g. a longitudinal spherical aberration and an astigmatism can be satisfactorily corrected. By this construction, a longitudinal spherical aberration and a coma aberration created by an increase in the optical power of the third lens group 13 accompanying the downsizing can also be satisfactorily corrected.

In this variable magnification optical system 1, at least one aspherical surface is included in the fourth lens group 14. In the example shown in FIG. 1, the both surfaces of the negative meniscus lens 141 are aspherical surfaces. By including the aspherical surfaces in the fourth lens group 14 in this way, it is possible to correct an off-axis coma aberration and satisfactorily maintain telecentricity for the image plane.

In this variable magnification optical system 1, focusing from an infinite object to a short-distance object is performed by moving the fourth lens group 14. By focusing the fourth lens group 14 in this way, it is possible to suppress a movement amount accompanying the focusing and make aberration variations smaller.

In this variable magnification optical system 1, the fourth lens group 14 is composed of only one negative lens. By composing the fourth lens group 14 of only one negative lens in this way, a load of a driving device for driving the fourth lens group 14 can be reduced. Further, a cost reduction can also be realized since an optical axis adjustment in the fourth lens group 14 becomes unnecessary.

This variable magnification optical system 1 includes the first lens group 11 composed of the negative meniscus lens 111 convex toward the object side and the prism 112, the second lens group 12 composed of the cemented lens of the biconcave negative lens 121 and the positive meniscus lens 122 convex toward the object side, the third lens group 13 composed of the biconvex positive lens 131 and the three-component cemented lens of the biconvex positive lens 132, the biconcave negative lens 133 and the biconvex positive lens 134, and the fourth lens group composed of the negative meniscus lens 141 convex toward the image side in this order from the object side to the image side. It is advantageous in downsizing to compose the first lens group 11 of one negative lens. By composing the second lens group 12 of the cemented lens, it is possible to correct a magnification color aberration and reduce decentration sensitivity. By composing the third lens group 13 of four lenses, error sensitivity can be reduced by using three positive lenses, an on-axis color aberration can be sufficiently corrected by using the three-component cemented lens and sensitivity to a lens interval error can be reduced. By composing the fourth lens group 14 of the negative meniscus lens, the telecentricity of a beam incident angle on the image plane can be maintained.

In the variable magnification optical system 1 thus constructed, the third lens group 13 preferably satisfies conditional expressions (3) and (4) if f3 denotes a combined focal length of the third lens group 13 and v3p denotes a maximum value of Abbe numbers of the positive lenses in the third lens group 13.

$$1.25 < f3/fw < 2 \quad (3)$$

$$71 \leq v3p \leq 100 \quad (4)$$

The conditional expression (3) specifies the variable magnification optical system 1 in terms of optical power. In other words, above the upper limit of the conditional expression (3), a moving distance at the time of zooming increases and the variable magnification optical system 1 cannot be downsized, which is not preferable. Below the lower limit of the conditional expression (3), the decentration sensitivity of the third lens group 13 becomes too high and an on-axis coma aberration and blurring asymmetric on a screen called one side blurring occur, thereby leading to a deteriorated image quality, which is not preferable.

The conditional expression (4) represents conditions for reducing an on-axis color aberration under the conditions defined by the conditional expression (3). In other words, below the lower limit of the conditional expression (4), it becomes difficult to correct the on-axis color aberration, which is not preferable. On the other hand, above the upper limit of the conditional expression (4), a radius of curvature becomes smaller and an uneven thickness ratio becomes larger if it is tried to obtain the same optical power. Thus, weld and birefringence occur in the case of resin lenses and a reduction in a refractive index distribution and surface accuracy occurs in the case of glass lenses, which is not preferable.

In the variable magnification optical system 1 thus constructed, the fourth lens group 14 preferably satisfies the following conditional expression (5) if f4 denotes a combined focal length of the fourth lens group 14 and fw denotes a focal length of the entire system at the wide-angle end.

$$1.1 < |f4/fw| < 9 \quad (5)$$

The conditional expression (5) defines a range necessary to realize a zoom ratio of about 2 to 3× under the conditions defined by the conditional expression (1) when the fourth lens group also bears a zooming burden. In other words, above the upper limit of the conditional expression (5), the zooming burden of the third lens group 13 becomes too large if it is tried to maintain compactness. Thus, the decentration sensitivity of the third lens group 13 increases, which is not preferable. Below the lower limit of the conditional expression (5), an exit pupil position variation becomes large in the fourth lens group 14, whereby a beam incident angle on the image pickup element 17 increases and a difference in the beam incident angle on the image pickup element between at the wide-angle end and at the telephoto end increases to create shading and deteriorate an image quality, which is not preferable.

In the variable magnification optical system 1 thus constructed, the fourth lens group 14 preferably satisfies the following conditional expression (6) if β4t denotes an image magnification of the fourth lens group 14 at the telephoto end, β4w denotes an image magnification of the fourth lens group 14 at the wide-angle end and Z denotes a zoom ratio of the entire system. The conditional expression (6) specifies the variable magnification optical system 1 in terms of the zoom ratio Z of the entire system.

$$0.3 < (\beta 4t/\beta 4w)/Z < 0.8 \quad (6)$$

Below the lower limit of the conditional expression (6), the zooming burden of the third lens group 13 becomes too large if it is tried to maintain compactness. Thus, the decentration sensitivity of the third lens group 13 increases, which is not preferable. On the other hand, above the upper limit of the conditional expression (6), relative positional accuracy of the third and fourth lens groups 13, 14 becomes too strict to necessitate an adjustment between the lens groups and a position error in an optical axis direction or decentration direction by the driving device becomes severe to lead to a cost increase of the driving device, which is not preferable.

In the variable magnification optical system 1 thus constructed, the following conditional expression (7) is preferably satisfied if T12 denotes an optical axis distance between the first and second lens groups 11 and 12 at the telephoto end, fw denotes a focal length of the entire system at the wide-angle end and ft denotes a focal length of the entire system at the telephoto end.

$$0.02 < T12/(fw \times ft)^{1/2} < 0.25 \quad (7)$$

Above the upper limit of the conditional expression (7), a front lens diameter increases and the entire length of the system increases, which is not preferable in miniaturization (downsizing). Below the lower limit of the conditional expression (7), a mechanical structure becomes complicated in order to avoid the interference of a lens barrel of the first lens group 11 and that of the second lens group 12, leading to a cost increase, which is not preferable.

In the variable magnification optical system 1 thus constructed, the prism 112 preferably satisfies the following conditional expression (8) if Npr denotes a d-beam refractive index of the prism 112.

$$Npr \geq 1.8 \quad (8)$$

Below the lower limit of the conditional expression (8), the thinning of the variable magnification optical system 1 is insufficient and the front lens diameter increases, which is not preferable.

The prism 112 of the variable magnification optical system 1 more preferably satisfies the following conditional expression (8').

$$Npr \geq 1.9 \quad (8')$$

The variable magnification optical system 1 can be further thinned by satisfying the conditional expression (8'). Thus, a degree of freedom in the shape of an apparatus, into which the variable magnification optical system 1 is to be incorporated, is further increased and incorporation into a terminal particularly required to be thin such as a foldable mobile terminal also becomes possible.

In the variable magnification optical system 1 thus constructed, the following conditional expression (9) is preferably satisfied if the lens closest to the object in the first lens group 11 is a negative lens, the negative meniscus lens 111 in the example shown in FIG. 1 and Nln denotes a d-beam refractive index of the negative lens (negative meniscus lens 111).

$$Nln \geq 1.7 \quad (9)$$

In such a construction, by arranging the negative lens as a lens closest to the object in the first lens group 11, the front lens diameter can be suppressed and a distortion can be satisfactorily corrected while a compact construction is realized. Below the lower limit of the conditional expression (9), the front lens diameter increases, which is not preferable.

In the variable magnification optical system 1 thus constructed, the following conditional expression (9') is more preferably satisfied.

$$Nln \geq 1.8 \quad (9')$$

Below the lower limit of the conditional expression (9'), the prism 112 becomes larger, wherefore it becomes difficult to thin the lens unit in the thickness direction, which is not preferable.

In the variable magnification optical system 1 thus constructed, the following conditional expression (9') is even more preferably satisfied.

$$Nln \geq 1.9 \quad (9'')$$

By satisfying the conditional expression (9''), a photographing angle of view can be increased without increasing the thickness of the lens unit, which is more preferable.

In the variable magnification optical system 1 thus constructed, the following conditional expression (10) is preferably satisfied if Y' denotes a maximum image height and TL denotes an optical axis distance from a surface vertex of the lens closest to the object to the image plane (where a back focus is an air-conversion length).

$$Y'/TL > 0.095 \quad (10)$$

By satisfying the conditional expression (10), the variable magnification optical system 1 can have a relatively compact construction.

In the variable magnification optical system 1 thus constructed, the following conditional expression (10') is more preferably satisfied.

$$Y'/TL > 0.1 \quad (10')$$

By satisfying the conditional expression (10'), a construction sufficiently compact for incorporation can be realized without reducing a degree of freedom in the shapes of apparatuses required to have ultra compactness such as mobile phones and personal digital assistants.

In the variable magnification optical system 1 thus construction, the fourth lens group 14 preferably satisfies the following conditional expression (11) if f4 denotes a combined focal length of the fourth lens group 14 and ft denotes a combined focal length of the entire system at the telephoto end.

$$0.4 < |f4/ft| < 1.2 \quad (11)$$

Above the upper limit of the conditional expression (11), the zooming burden of the third lens group 13 increases if it is tried to maintain compactness. Thus, the decentration sensitivity of the third lens group 13 increases, which is not preferable. Below the lower limit of the conditional expression (11), an exit pupil position variation becomes large in the fourth lens group 14, whereby a beam incident angle on the image pickup element 17 increases, a difference in the beam incident angle on the image pickup element 17 between at the wide-angle end and at the telephoto end increases and an oblique incident angle on a lens array arranged before the image pickup element 17 increases to create color shading and deteriorate an image quality, which is not preferable.

In the variable magnification optical system 1 thus constructed, the third lens group 13 preferably satisfies the following conditional expression (12) if f3 denotes a combined focal length of the third lens group 13 and ft denotes a combined focal length of the entire system at the telephoto end.

$$0.2 < f3/ft < 0.9 \quad (12)$$

Above the upper limit of the conditional expression (12), a moving distance at the time of zooming increases and the optical system cannot be downsized, which is not preferable. Further, below the lower limit of the conditional expression (12), the decentration sensitivity of the third lens group 13 becomes too high and an on-axis coma aberration and blurring asymmetric on a screen called one side blurring occur, thereby leading to a deteriorated image quality, which is not preferable.

Figure 2:
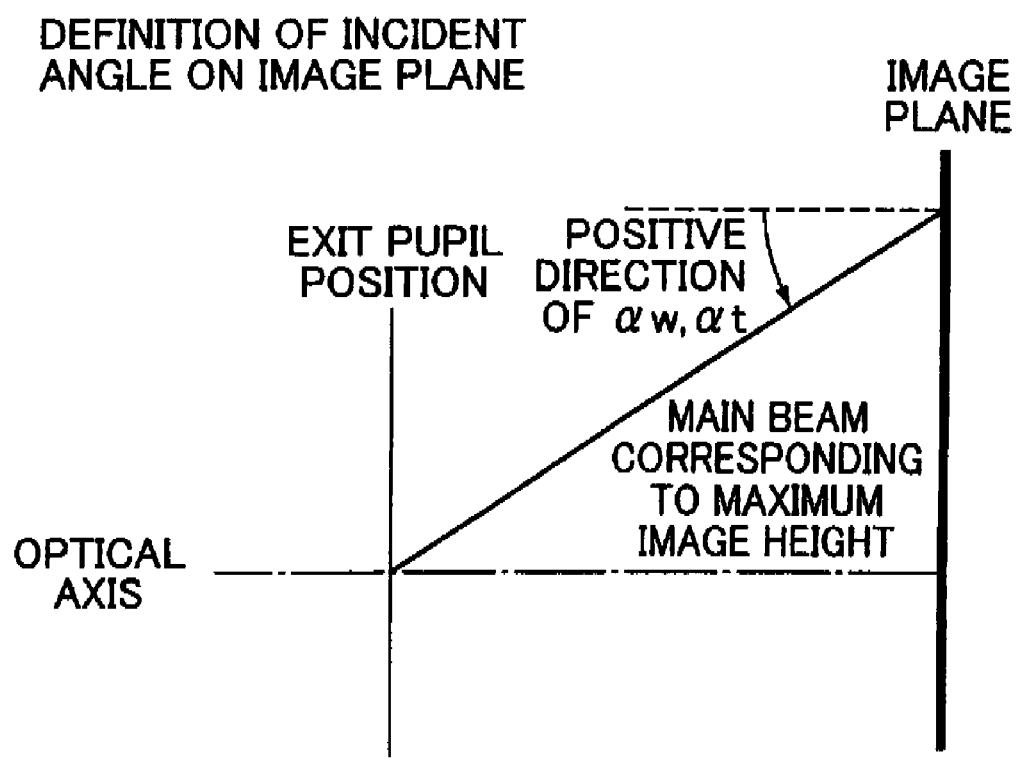
FIG. 2 is a diagram showing the definition of an incident angle of a main beam on an image plane.

In the variable magnification optical system 1 thus constructed, the following conditional expressions (13) and (14) are preferably satisfied if an image-side surface of the lens closest to the image in the fourth lens group 14 is an aspherical surface and αw and αt respectively denote an angle (°) of a main beam at a maximum angle of view out of incident beams on an imaging surface with respect to a perpendicular to the image plane at the wide-angle end and an angle of a main beam at a maximum angle of view out of incident beams on the imaging surface with respect to a perpendicular to the image plane at the telephoto end as shown in FIG. 2 which is a diagram showing the definition of an incident angle of a main beam on an image plane. αw and αt in the conditional expressions (13) and (13) are positive main beam angles when the pupil exit position is located closer to the object than the image plane.

$$\alpha w < 28 \quad (13)$$

$$|\alpha w - \alpha t| < 13 \quad (14)$$

By satisfying the conditional expression (13), downsizing is possible while a wide angle of view is ensured, and a good image quality with little shading can be obtained. Above the upper limit of the conditional expression (14), it becomes difficult to suppress a reduction in peripheral illuminance either at the wide-angle end or at the telephoto end even if the lens array is arranged before the imaging surface, which is not preferable.

In the variable magnification optical system 1 thus constructed, the following conditional expression (15) is preferably satisfied if Lb denotes a back focus (air-conversion length) at the telephoto end and fw denotes a combined focal length of the entire system at the telephoto end.

$$0.8<Lb/fw<1.6 \tag{15}$$

Above the upper limit of the conditional expression (15), the negative optical power of the first lens group 11 has to be drastically intensified and, in this embodiment where the first lens group 11 includes only one negative lens, it becomes difficult to correct an astigmatism and a magnification color aberration, which is not preferable. Below the lower limit of the conditional expression (15), a difference in the beam incident angle on the image plane between at the wide-angle end and at the telephoto end becomes excessively large and it becomes difficult to suppress a reduction in peripheral illuminance either at the wide-angle end or at the telephoto end even if the lens array is arranged before the imaging surface, which is not preferable.

The variable magnification optical system 1 thus constructed preferably includes at least one lens made of a resin material. The use of such a lens made of the resin material enables a mass production with a stable quality, thereby being able to drastically reduce cost.

In the variable magnification optical system 1 thus constructed, the at least one lens made of the resin material is preferably arranged in the fourth lens group 14. By arranging the lens made of the resin material in the fourth lens group 14, it is possible to realize a cost reduction while suppressing influence on optical performances to a minimum level.

In the variable magnification optical system 1 thus constructed, cams, a stepping motor and the like or a piezoelectric actuator may be used to drive the movable respective lens groups and optical diaphragm 15, a shutter (not shown) and the like. In the case of using a piezoelectric actuator, the respective groups can be independently driven while the volume of the driving device and an increase in power consumption are suppressed, wherefore the image pickup device can be further downsized.

In the variable magnification optical system 1 thus constructed, all the lens surfaces in contact with air are preferably aspherical surfaces. By this construction, both downsizing and higher image quality can be realized.

In the variable magnification optical system 1 thus constructed, the glass lens including an aspherical lens may be a glass molded aspherical lens, a ground aspherical glass lens, or a hybrid aspherical lens (obtained by forming a resin layer with an aspherical surface shape on a spherical glass lens). The glass molded aspherical lens is preferable because it is suitable for mass production, and the hybrid aspherical lens has a high degree of freedom in design because there are many kinds of glass materials which can become a substrate. Particularly, an aspherical lens using a high refractive index material is preferably a hybrid aspherical lens since it is not easy to mold. In the case of single-sided aspherical surface, the advantage of the hybrid aspherical lens can be maximally utilized.

In the variable magnification optical system 1 thus constructed, each of the first, second and fourth lens groups 11, 12 and 14 is preferably composed of three or less lenses, more preferably composed of two or less lenses. By such a construction, a cost reduction resulting from a reduction in the number of lenses can be accomplished. However, in the case of including a prism as a reflecting member, this prism is not counted as the lens.

In the variable magnification optical system 1 thus constructed, in the case of using a plastic lens, this lens is preferably the one formed of a material in which particles having a maximum diameter of 30 nm or shorter are dispersed in a plastic (resin material).

Generally, if fine particles are mixed into a transparent resin material, light is scattered to reduce a transmittance. Thus, it has been difficult to use such a material as an optical material. However, by setting the size of the fine particles to be smaller than the wavelength of transmitted light flux, light is not substantially scattered. As temperature increases, the refractive index of the resin material decreases. However, the refractive index of inorganic particles conversely increases as temperature increases. Thus, the refractive index can be made to hardly change with a temperature change by canceling out the refractive index changes, taking advantage of such temperature dependencies. More specifically, by dispersing the inorganic particles having a maximum diameter of 30 nm or shorter in the resin material as a base material, a resin material with a reduce temperature dependence of the refractive index can be obtained. For example, fine particles of niobium oxide ($Nb_2O_5$) are dispersed in acrylic. In the variable magnification optical system 1 thus constructed, a back focus deviation of the variable magnification optical system 1 resulting from an ambient temperature change can be suppressed by using at least one lens made of such a plastic material in which inorganic fine particles are dispersed.

The lens made of such a plastic material in which inorganic fine particles are dispersed is preferably molded as follows.

A refractive index change with temperature is described. A refractive index change with temperature n(T) is expressed by an equation (16) by differentiating a refractive index n by temperature T based on the Lorenz-Lorenz equation.

$$n(T)=((n^2+2)\times(n^2-1))/6n\times(-3\alpha+(1/[R])\times(\partial[R]/\partial T)) \tag{16}$$

Here, $\alpha$ denotes a linear expansion coefficient and [R] denotes a molecular refraction.

In the case of the resin material, contribution of the refractive index to the temperature dependence is generally smaller in the second term than in the first term of the equation (16) and can be substantially ignored. For example, in the case of a PMMA resin, the linear expansion coefficient $\alpha$ is $7\times10^{-5}$ and, if this is substituted into the equation (16), n(T)=$-12\times10^{-5}$ (/° C.) and substantially coincides with an actual measurement value.

Specifically, the refractive index change with temperature n(T), which has been conventionally about $-12\times10^{-5}$ [/° C.], is preferably suppressed to below $8\times10^{-5}$ [/° C.] in absolute value, more preferably suppressed to below $6\times10^{-5}$ [/° C.] in absolute value.

Thus, a resin material containing polyolefin, a resin material containing polycarbonate and a resin material containing polyester are preferably used as such a resin material. The refractive index change with temperature n(T) is about $-11\times10^{-5}$ (/° C.) in the resin material containing polyolefin, about $-14\times10^{-5}$ (/° C.) in the resin material containing polycarbonate and about $-13\times10^{-5}$ (/° C.) in the resin material containing polyester.

Second Embodiment

Description of a Digital Apparatus Incorporating a Variable Magnification Optical System Next, a digital apparatus having the above variable magnification optical system 1 incorporated therein is described.

Figure 3:
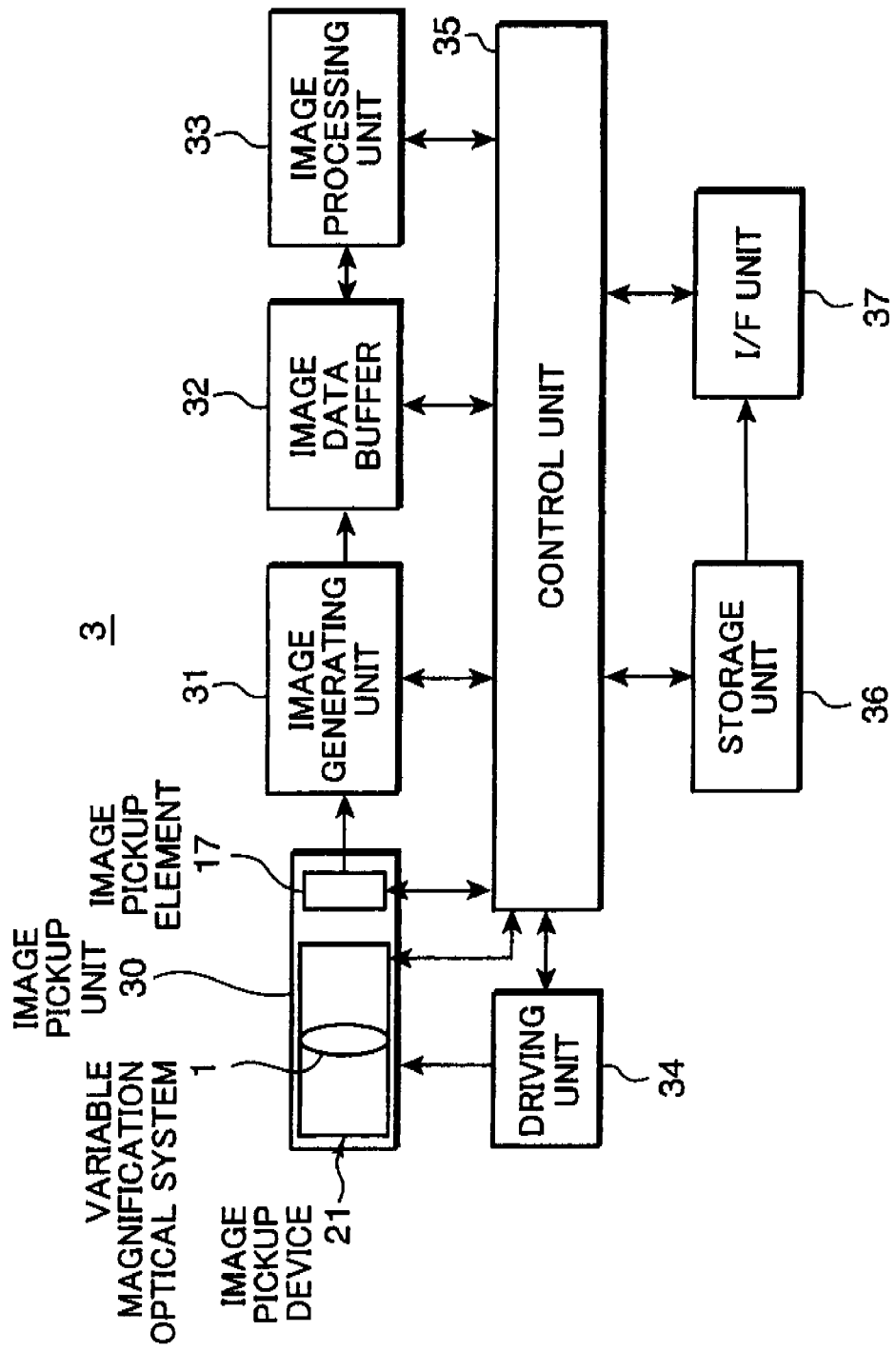
FIG. 3 is a block diagram showing the construction of a digital apparatus according to a second embodiment of the invention, FIG. 4 are external construction diagrams of a camera-equipped mobile phone as one mode of the digital apparatus.

FIG. 3 is a block diagram showing the construction of a digital apparatus according to a second embodiment of the present invention. The digital apparatus 3 includes an image pickup unit 30, an image generating unit 31, an image data buffer 32, an image processing unit 33, a driving unit 34, a control unit 35, a storage unit 36 and an I/F unit 37 for an image pickup function. For example, a digital still camera, a video camera, a surveillance camera (monitoring camera), a mobile terminal such as a mobile phone or a personal digital assistant (PDA), a personal computer and a mobile computer can be cited as the digital apparatus 3. The digital apparatus 3 may include peripheral devices of these (e.g. mouse, scanner, printer, etc.). Particularly, the variable magnification optical system 1 of this embodiment is suitably incorporated into a mobile terminal such as mobile phone or a personal digital assistant (PDA) since being sufficiently downsized.

The image pickup unit 30 includes an image pickup device 21 and an image pickup element 17. The image pickup device 21 includes the variable magnification optical system 1 as shown in FIG. 1 and an unillustrated lens driver or the like for driving the lenses in an optical axis direction for zooming and focusing. A beam from a subject is focused on a light receiving surface of the image pickup element 17 by the variable magnification optical system 1 to form an optical image of the subject.

The image pickup element 17 converts an optical image of a subject focused by the variable magnification optical system 1 into electrical signals (image signals) of respective color components of R, G and B and outputs these electrical signals as image signals of the respective color components of R, G and B as described above. An image pickup operation of the image pickup element 17 such as the image pickup of either a still image or moving images or the readout (horizontal synchronization, vertical synchronization, transfer) of output signals of the respective pixels of the image pickup element 17 is controlled by the control unit 35.

The image generating unit 31 performs an amplification processing, a digital conversion processing and the like to analog output signals from the image pickup element 17 and generates image data of the respective pixels from the image signals by performing known image processings such as the determination of a proper black level for the entire image, a γ-correction, a white balance adjustment (WB adjustment), an outline correction and a color unevenness correction. The image data generated by the image generating unit 31 are output to the image data buffer 32.

The image data buffer 32 is a memory adapted to temporarily store image data and functions as a memory used as a work area where processings to be described later are performed to image data by the image processing unit 31 and is, for example, a RAM (Random Access Memory) which is a volatile storage element.

The image processing unit 33 is a circuit for performing specified image processings such as a resolution conversion to the image data in the image data buffer 32.

If necessary, the image processing unit 33 may be so constructed as to correct aberrations, which could not be corrected by the variable magnification optical system 1, by performing a known distortion correction processing for correcting a distortion in an optical image of a subject formed on the light receiving surface of the image pickup element 17 and other processings. A distortion correction is for correcting an image distorted by aberrations into a natural image substantially free from distortion and having a similar shape as a scene seen by the naked eye. By such a construction, even if an optical image of a subject introduced to the image pickup element 17 by the variable magnification optical system 1 is distorted, a natural image substantially free from distortion can be generated. In a construction for correcting such a distortion by an image processing by means of an information processing, aberration burdens by the lenses close to the object and the image plane are drastically reduced, wherefore the number of the lenses is reduced and the control of a pupil exit position becomes easier and, hence, the lenses can be shaped to have a better workability. Particularly, if only one negative lens is included as the lens having the optical power in the first lens group 11 or if the fourth lens group 14 is composed of only one negative lens, it is particularly effective to correct a distortion of an image. Alternatively, in a construction for correcting a distortion by an image processing by means of an information processing, only various aberrations except the distortion have to be considered, wherefore a degree of freedom in the design of the variable magnification optical system 1 is increased and an easier design becomes possible.

If necessary, the image processing unit 33 may also perform a known peripheral illuminance reduction correction processing for correcting a reduction in peripheral illuminance in an optical image of a subject formed on the light receiving surface of the image pickup element 17. The peripheral illuminance reduction correction processing (shading correction) is performed by storing a correction data for the peripheral illuminance reduction correction beforehand and multiplying an image (pixels) after recording by the correction data. Since the reduction in peripheral illuminance mainly occurs due to an incident angle dependence of sensitivity in the image pickup element 17, lens vignetting, cosine fourth law and the like, the correction data is set at such a specified value as to correct an illuminance reduction caused by these factors. By employing such a construction, an image having a sufficient illuminance up to the periphery can be generated even if peripheral illuminance is reduced in an optical image of a subject introduced to the image pickup element 17 by the variable magnification optical system 1.

The driving unit 34 drives one or more lens groups in the variable magnification optical system 1 for desired zooming and focusing by operating the above unillustrated lens driver in accordance with a control signal output from the control unit 35.

The control unit 35 includes, for example, a microprocessor, its peripheral circuits and the like and controls the operations of the image pickup unit 30, the image generating unit 31, the image data buffer 32, the image processing unit 33, the driving unit 34, the storage unit 36 and the I/F unit 37 according to their functions. In other words, the image pickup device 21 is so controlled by this control unit 35 as to perform at least either one of still image recording and video recording of a subject.

The storage unit 36 is a storage circuit for storing an image data generated by still image recording or video recording of a subject and includes, for example, a ROM (Read Only Memory) which is a nonvolatile storage element, an EEPROM (Electrically Erasable Programmable Read Only Memory) which is a rewritable nonvolatile storage element, a RAM and the like. In other words, the storage unit 36 has a function as a memory for still images and moving images.

The I/F unit 37 is an interface for transmitting and receiving image data to and from an external apparatus and, for example, an interface in accordance with standards such as USB and IEEE1394.

An image pickup operation of the digital apparatus 3 thus constructed is described next.

In the case of still image recording, the control unit 35 controls the image pickup device 21 to perform still image recording and operates the unillustrated lens driver of the image pickup device 21 via the driving unit 34 for focusing. In this way, an in-focus optical image is cyclically and repeatedly focused on the light receiving surface of the image pickup element 17 and output to the image generating unit 31 after being converted into image signals of the respective color components of R, G and B. These image signals are temporarily stored in the image data buffer 32 and, after image processings are performed thereto by the image processing unit 33, an image based on the image signals is displayed on a display (not shown). A photographer can make such an adjustment as to locate a main subject at a desired position of the screen by seeing the display. If a so-called shutter button (not shown) is pressed in this state, the image data is stored in the storage unit 36 as a memory for still images, whereby a still image is obtained.

In this case, the control unit 35 performs lens driving for zooming to cause the variable magnification optical system 1 to continuously zoom in the case of zoom recording to enlarge a subject at a position distant from or close to the image pickup device 21. This enables an enlarged still image to be obtained by making such an adjustment as to locate a main subject at a desired position on the screen similar to normal recording at the same magnification by adjusting an enlargement rate even if the subject is distant from the photographer.

In the case of video recording, the control unit 35 controls the image pickup device 21 to perform video recording. Then, similar to the case of still image recording, the photographer can make such an adjustment as to locate an image of a subject obtained through the image pickup device 21 at a desired position of the screen by seeing the display (not shown). In this case, similar to the still image recording, the enlargement rate of the subject image can be adjusted, and video recording is started by pressing the above shutter button (not shown). During this recording, it is also possible to change the enlargement rate of the subject at any time.

At the time of video recording, the control unit 35 controls the image pickup device 21 to perform video recording and operates the unillustrated lens driver of the image pickup device 21 via the driving unit 34 for focusing. In this way, in-focus optical images are cyclically and repeated focused on the light receiving surface of the image pickup element 17 and converted into image signals of the respective color components of R, G and B, which are, thereafter, output to the image generating unit 31. The image signals are temporarily stored in the image data buffer 32, and images based on the image signals are displayed on the display (not shown) after the image processings are performed to the image signals. By pressing the shutter button (not shown) again, video recording is finished. The recorded moving images are introduced to the storage unit 36 as the memory for moving images to be stored therein.

Since the above image pickup device 21 and digital apparatus 3 include the variable magnification optical system 1 that can be downsized, the high-pixel image pickup element 17 can be employed while downsizing is realized. Particularly, since the variable magnification optical system 1 is applicable to a small-size high-pixel image pickup element, it is suitable for mobile terminals including more pixels and becoming more functional. A case of incorporating the image pickup device 21 into a mobile phone is described below as an example.

Figure 4A:
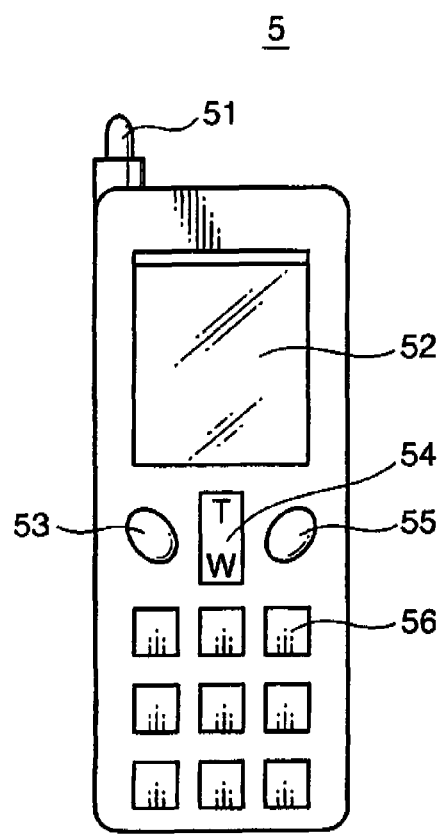
Figure 4B:
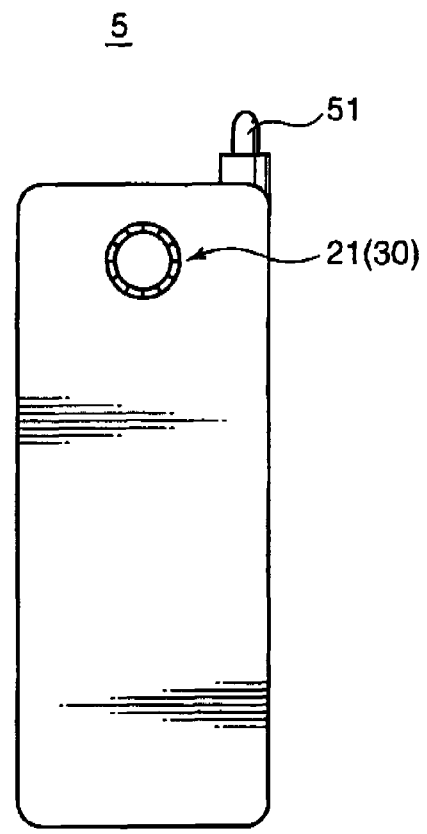

FIG. 4 are external construction diagrams of a camera-equipped mobile phone as one mode of the digital apparatus. FIG. 4A shows an operation surface of the mobile phone and FIG. 4B shows the other side, i.e. rear surface of the operation surface.

In FIG. 4, a mobile phone 5 includes an antenna 51 at its top, and a rectangular display 52, an image recording button 53 used to start an image recording mode and switch still image recording and video recording, a zooming button 54 for controlling zooming, a shutter button 55 and a dial button 56 are provided on the operating surface of the mobile phone 5 as shown in FIG. 4A.

This mobile phone 5 includes a built-in circuit for realizing a telephone function using a mobile telephone network and has also the above image pickup unit 30, image generating unit 31, image data buffer 32, image processing unit 33, driving unit 34, control unit 35 and storage unit 36 built therein, wherein the image pickup device 21 of the image pickup unit 30 is located on the rear surface.

When the image recording button 53 is operated, a control signal indicating its operation content is output to the control unit 35 and the control unit 35 performs an operation corresponding to the operation content. The zooming button 54 is, for example, a two-contact switch, wherein "T" indicating telephoto is printed on its upper end part and "W" indicating wide angle is printed on a lower end part. By pressing a printed position of the zooming button 54, a control signal indicating a corresponding zooming operation is output to the control unit 35 and the control unit 35 performs an operation corresponding to its zooming operation. When the shutter button 55 is operated, a control signal indicating its operation content is output to the control unit 35 and the control unit 35 performs an operation corresponding to the operation content.

<Description of More Specific Embodiments (Examples) of the Variable Magnification Optical System>

Specific constructions of the variable magnification optical system 1 as shown in FIG. 1, i.e. the variable magnification optical system 1 included in the image pickup device 21 incorporated in the digital apparatus 3 as shown in FIG. 3 are described with reference to the drawings.

First Example

Figure 5:
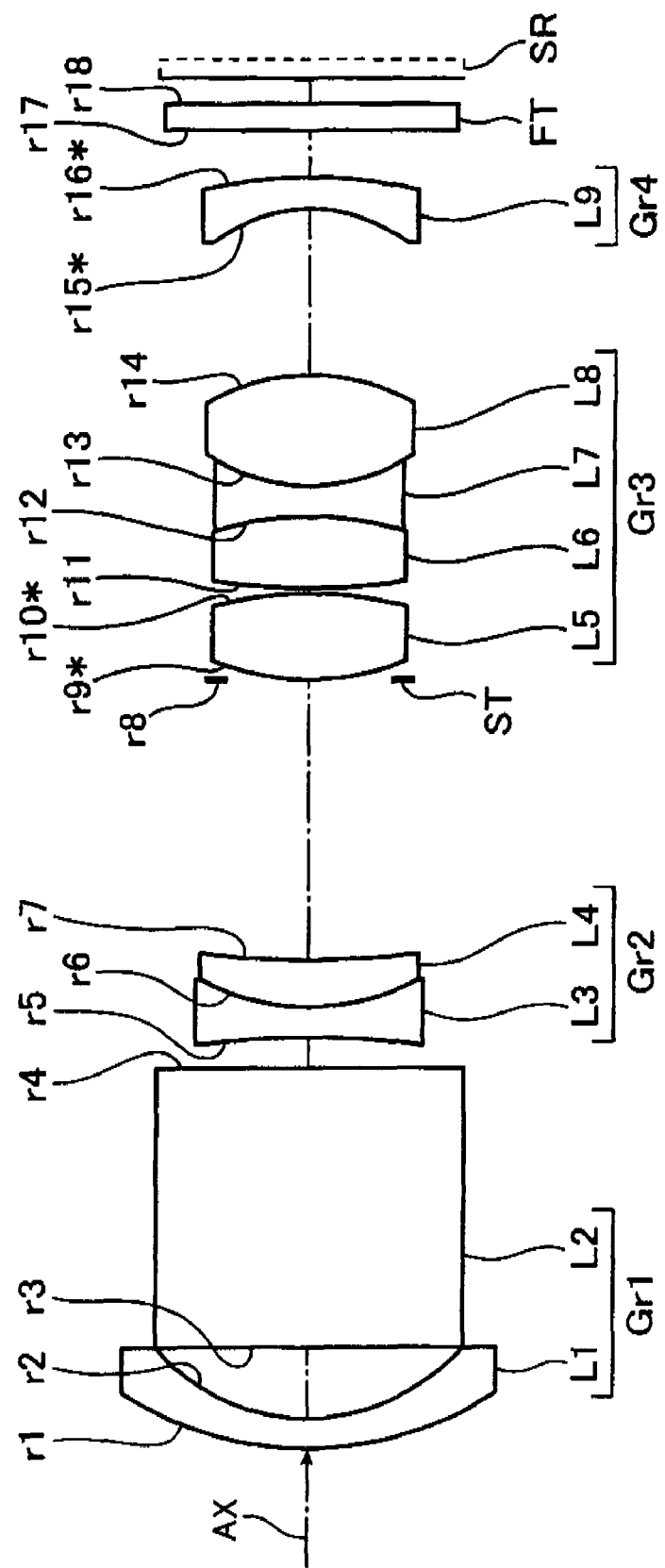
FIG. 5 is a section showing an arrangement of lens groups in a variable magnification optical system in a first example.

FIG. 5 is a section showing an arrangement of lens groups in a variable magnification optical system in a first example. FIG. 5 shows a case at a wide-angle end (WIDE). FIGS. 7, 8, 10 to 16, 18 to 20 and 22, which are sections showing arrangements of lens groups of variable magnification optical systems 1B to 1N according to second to fourteenth examples to be described later, also similarly show the case at the wide-angle end (WIDE).

Figure 6:
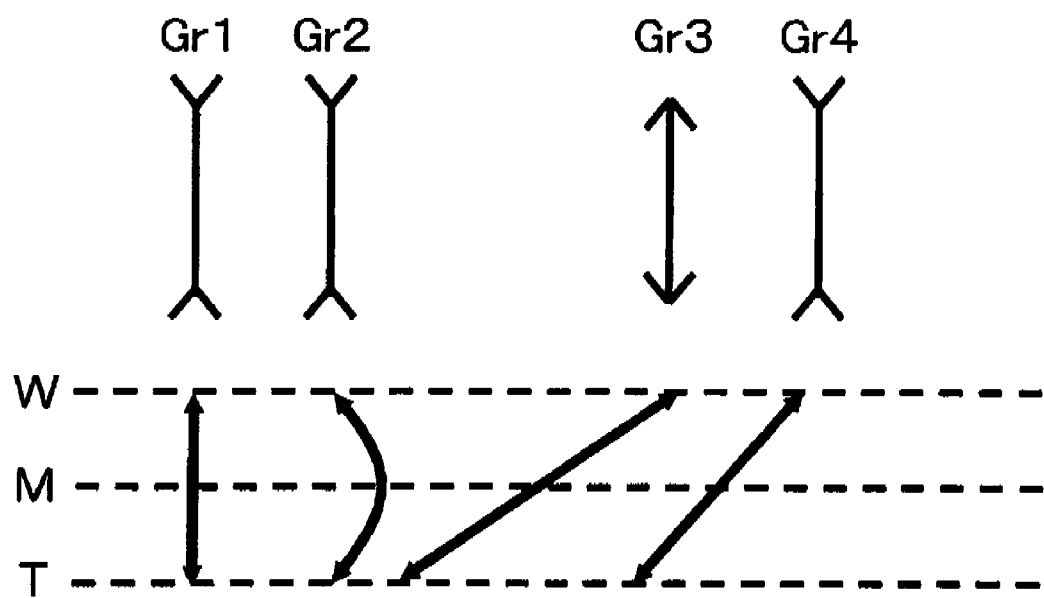
FIG. 6 is a diagram showing moving states of the respective lens groups during the zooming of the variable magnification optical system of the first example.

FIG. 6 is a diagram showing moving states of the respective lens groups during the zooming of the variable magnification optical system of the first example. "W" indicates a case at the wide-angle end, "M" indicates a case at a middle point between the wide-angle end and a telephoto end, and "T"

indicates a case at the telephoto end. Similar cases are also shown by "W", "M" and "T" in FIGS. 9, 17, 21 and 23 to be described later. FIG. 6 is the diagram also showing moving states of the respective lens groups during the zooming of variable magnification optical systems 1B, 1E, 1F, 1I of the second, fifth, sixth and ninth examples to be described later.

FIG. 24 are aberration diagrams of the variable magnification optical system in the first example. FIG. 24(A) shows the case at the wide-angle end (WIDE), FIG. 24B shows the case at the middle point (MIDDLE) and FIG. 24C shows the case at the telephoto end (TELE).

The variable magnification optical system 1A of the first example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 5. At the time of zooming (magnification variation), the first lens group (Gr1) is fixed, the second lens group (Gr2) is moved, the third lens group (Gr3) and the fourth lens group (Gr4) are so moved as to increase a distance between them, and the optical diaphragm ST is moved together with the third lens group (Gr3) as shown in FIG. 6.

More specifically, in the variable magnification optical system 1A of the first example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In FIG. 5, numbers ri (i=1, 2, 3, . . . ) assigned to the respective lens surfaces indicate the numbers of the lens surfaces counted from the object side (where a cemented surface of the lenses is counted as one surface), and the surfaces with "*" attached to ri are aspherical surfaces. It should be noted that the both surfaces of the optical diaphragm ST and the parallel plate FT and the light receiving surface of the image pickup element SR are also treated as surfaces. Such handling and meaning of reference numerals hold true in the second to fourteenth examples to be described later (FIGS. 7, 8, 10 to 16, 18 to 20 and 22), but it does not mean that they are completely identical. For example, the lens surface arranged closest to the object is identified by the same reference numeral (r1) in FIGS. 5, 7, 8, 10 to 16, 18 to 20 and 22 showing the first to fourteenth examples, but the curvatures and the like of these lenses are not identical in the respective first to fourteenth examples.

In such a construction, a beam incident from the object side successively passes through the first lens group (Gr1), the second lens group (Gr2), the third lens group (Gr3) (including the optical diaphragm ST on the way), the fourth lens group (Gr4) and the parallel plate FT along an optical axis AX and forms an optical image of an object on the light receiving surface of the image pickup element SR. In the image pickup element SR, the optical image is converted into an electrical signal. This electrical signal has specified digital image processing and the like performed thereto if necessary, and is stored as a digital video signal in a memory of a digital apparatus such as a digital camera or transmitted to another digital apparatus by wired or wireless communication.

In the variable magnification optical system 1A of this first example, during the zooming from the wide-angle end (WIDE) to the telephoto end (TELE) via the middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3) and the optical diaphragm ST is moved together with the third lens group (Gr3) as shown in FIG. 6. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

The optical diaphragm ST such as an aperture stop is arranged at the object side of the third lens group (Gr3), and this optical diaphragm ST is moved toward the object side together with the third lens group (Gr3) as shown in FIG. 6 during the zooming from the wide-angle end to the telephoto end. By arranging the optical diaphragm ST at the object side of the third lens group (Gr3) in this way, an increase in a front lens diameter can be prevented. Further, since the optical diaphragm ST is moved together with the third lens group (Gr3), a barrel construction can be simplified and a distance between the second lens group (Gr2) and the third lens group (Gr3) can be reduced to a very short distance. Since the distance between the second lens group (Gr2) and the third lens group (Gr3) has a considerably large influence on the entire length of the system, it is effective in downsizing to reduce the distance between the second lens group (Gr2) and the third lens group (Gr3).

During the zooming from the wide-angle end to the telephoto end, the distance between the third lens group (Gr3) and the fourth lens group (Gr4) increases as shown in FIG. 6.

Accordingly, it becomes possible to suppress a beam incident angle on the image pickup element SR and suppress a difference in the beam incident angle on the image pickup element SR between at the wide-angle end and the telephoto end.

Construction data of the respective lenses in the variable magnification optical system 1A of the first example are shown below.

Numerical Example 1

Unit: mm

Surface data

| Surface Number | r | d | nd | vd |
|---|---|---|---|---|
| Object Plane | ∞ | ∞ | | |
| 1 | 6.721 | 0.600 | 1.94595 | 17.98 |
| 2 | 3.949 | 1.433 | | |
| 3 | ∞ | 5.452 | 1.84666 | 23.78 |
| 4 | ∞ | Variable | | |
| 5 | −16.659 | 0.600 | 1.77250 | 49.65 |
| 6 | 4.547 | 0.918 | 1.92286 | 20.88 |
| 7 | 17.317 | Variable | | |
| 8 (Diaphragm) | ∞ | 0.000 | | |
| 9* | 4.715 | 1.695 | 1.58311 | 59.46 |
| 10* | −6.965 | 0.100 | | |
| 11 | 12.801 | 1.391 | 1.49700 | 81.61 |
| 12 | −6.327 | 0.600 | 1.83400 | 37.35 |
| 13 | 3.667 | 2.148 | 1.49700 | 81.61 |
| 14 | −4.136 | Variable | | |
| 15* | −2.786 | 0.600 | 1.53048 | 55.72 |
| 16* | −9.115 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −1.0044e−003, A6 = −1.2825e−003, A8 = 9.2072e−004, A10 = −3.6873e−004, A12 = 7.6630e−005, A14 = −6.5788e−006

Tenth Surface

K = 0.0000e+000, A4 = 2.8567e−003, A6 = −1.5447e−003, A8 = 1.1243e−003, A10 = −4.3896e−004, A12 = 8.6612e−005, A14 = −6.9291e−006

Fifteenth Surface

K = 0.0000e+000, A4 = 6.3242e−003, A6 = 5.0424e−004, A8 = −1.0047e−004, A10 = 6.9088e−005, A12 = −1.3025e−005, A14 = 3.6981e−007

Sixteenth Surface

K = 0.0000e+000, A4 = 8.2108e−004, A6 = 2.5420e−006, A8 = −9.3843e−006, A10 = −3.4472e−006, A12 = 2.8546e−006, A14 = −4.5345e−007

| | Wide-Angle End | Middle Point | Telephoto End |
|---|---|---|---|
| Variable Distance | | | |
| Between 4th and 5th Surfaces | 0.600 | 1.386 | 0.600 |
| Between 7th and 8th Surfaces | 5.503 | 2.461 | 0.500 |
| Between 14th and 15th Surfaces | 3.258 | 3.421 | 4.693 |
| Between 16th and 17th Surfaces | 0.902 | 2.994 | 4.470 |
| Various Data | | | |
| Zoom Data | | | |
| Zoom Ratio ft/fw: 2.75 | | | |
| Focal Length | 3.805 | 6.317 | 10.460 |
| F-Number | 2.875 | 3.872 | 5.013 |
| Angle of View | 38.254 | 25.404 | 16.003 |
| Image Height | 3.000 | 3.000 | 3.000 |
| Entire Lens Length | 26.630 | 26.630 | 26.630 |
| BF | 1.732 | 3.824 | 5.299 |

Zoom Lens Group Data

| Group | Start Surface | End Surface | Focal Length |
|---|---|---|---|
| 1 | 1 | 4 | −11.314 |
| 2 | 5 | 7 | −14.871 |
| 3 | 8 | 14 | 5.351 |
| 4 | 15 | 16 | −7.821 |

In the above surface data, the surface numbers correspond to the numbers i of the reference numerals ri (i=1, 2, 3, . . . ) assigned to the respective lens surfaces shown in FIG. 5. The surfaces having * attached to the numbers i indicate aspherical surfaces (refractive optical surfaces having aspherical surface shapes or surfaces having refractive actions equivalent to aspherical surfaces).

"r" denotes a radius of curvature (unit: mm) of each surface, "d" denotes a lens surface interval on an optical axis (on-axis surface interval) in an infinity in-focus condition, "nd" denotes a refractive index of each lens for a d-beam (wavelength: 587.56 nm), and "vd" denotes an Abbe number. Since the both surfaces of the prism, the optical diaphragm ST, the parallel plate FT and the light receiving surface of the image pickup element SR are flat surfaces, radii of curvature of these surfaces are ∞ (infinite).

The above aspherical surface data indicate values of a secondary curved surface parameter (conic constant K) of the surface assumed to be asymmetric (surface having * attached to the number i in the surface data) and an aspherical surface coefficient Ai (i=4, 6, 8, 10, 12, 14). An aspherical surface shape of an optical surface is defined by the following equation using a local orthogonal coordinate system (x, y, z) in which an origin is located at a surface vertex and a direction extending from the object toward the image pickup element is a positive direction along an z axis.

$$z(h) = ch^2/[1+\sqrt{\{1-(1+K)c^2h^2\}}] + \Sigma A_i \cdot h^i$$

where z(h): displacement amount in a z-axis direction at a height position h (surface vertex basis)

h: height ($h^2 = x^2 + y^2$) in a direction perpendicular to the z axis c: paraxial curvature (=1/radius of curvature)

$A_i$: $i^{th}$-order aspherical surface coefficient

K: secondary curved surface parameter (conic constant)

In the above aspherical surface data, "en" means "$n^{th}$ power of 10". For example, "e+001" means "+$1^{st}$ power of 10", "e−003" means −$3^{rd}$ power of 10".

Respective aberrations in the variable magnification optical system 1A of the first example under the above lens arrangement and construction are shown in FIG. 24. In FIGS. 24A, 24B and 24C, longitudinal spherical aberrations (sine conditions), astigmatisms (astigmatism field curvers) and distortions are successively shown from the left. A horizontal axis of longitudinal spherical aberrations represents a focus position deviation in mm, and a vertical axis thereof represents a normalized value at a maximum incident height. A horizontal axis of astigmatisms represents a focus position deviation in mm, and a vertical axis thereof represents an image height in mm. A horizontal axis of distortions represents a ratio (%) of an actual image height to an ideal image height, and a vertical axis thereof represents an image height in mm. In graphs of astigmatisms, broken line and solid line respectively indicate results on a tangential (meridional) surface and a sagittal (radial) surface.

In graphs of longitudinal spherical aberrations, solid line, broken line (- - -), and dashed-dotted line (-•-•-) indicate aberrations of three beams, i.e. a d-beam (wavelength: 587.56 nm), g-beam (435.84 nm) and C-beam (wavelength: 656.28 nm). The graphs of astigmatisms and distortions show results in the case of using the above d-beam (wavelength: 587.56 nm).

The above handling also holds true for construction data according to the second to fourteenth examples to be described below and FIGS. 25 to 37 showing the respective aberrations.

Second Example

Figure 7:
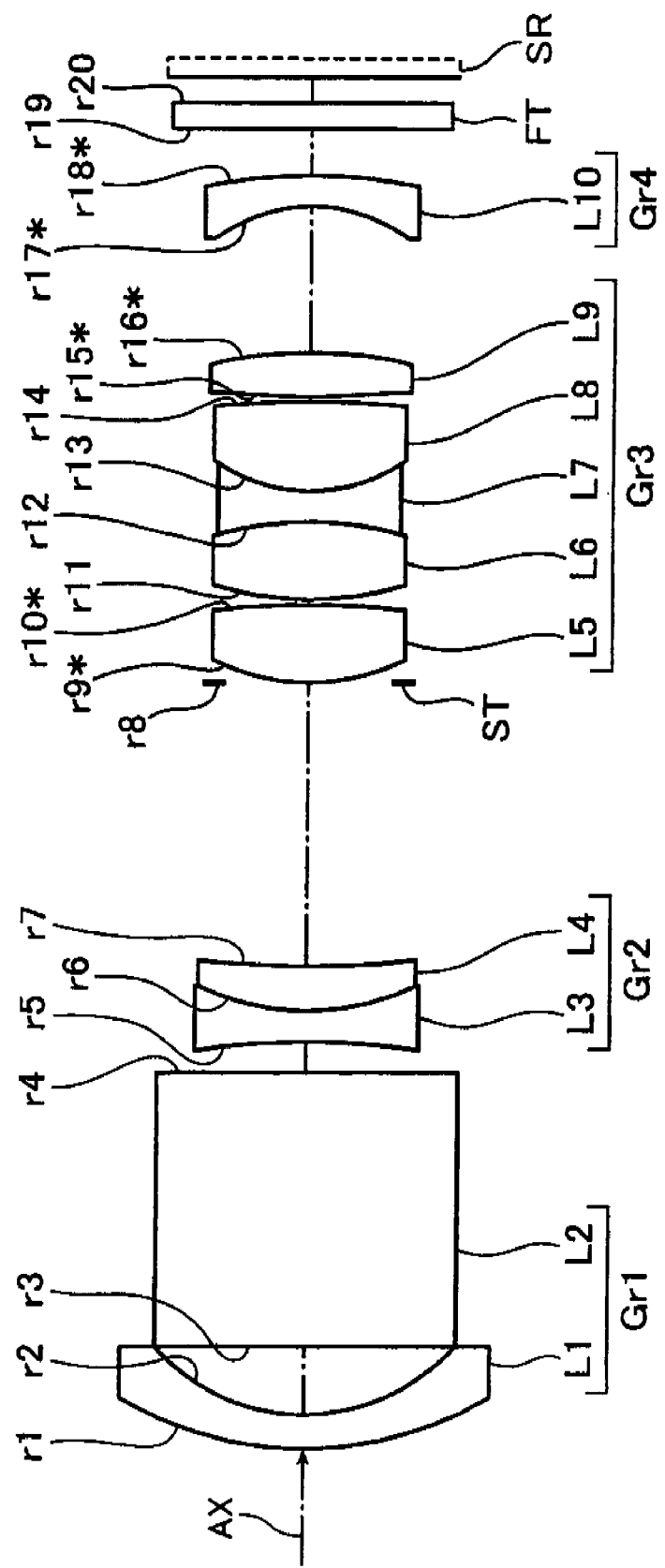
FIG. 7 is a section showing an arrangement of lens groups in the variable magnification optical system in a second example.

FIG. 7 is a section showing an arrangement of lens groups in a variable magnification optical system in a second example. FIG. 25 are aberration diagrams of the variable magnification optical system in the second example.

The variable magnification optical system 1B of the second example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 7. At the time of zooming (magnification variation), the first lens group (Gr1) is fixed, the second lens group (Gr2) is moved, the third lens group (Gr3) and the fourth lens group (Gr4) are so moved as to increase a distance between them, and the optical diaphragm ST is moved together with the third lens group (Gr3) as shown in FIG. 6.

More specifically, in the variable magnification optical system 1B of the second example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7), a biconvex positive lens (eighth lens L8) and a biconvex positive lens (ninth lens L9). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens. The ninth lens L9 is a lens, which is made of a resin material and both surfaces of which are aspherical surfaces.

The fourth lens group (Gr4) is composed of a negative meniscus lens (tenth lens L10) convex toward the image side. The tenth lens L10 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1B of this second example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3) and the optical diaphragm ST is moved together with the third lens group (Gr3) as shown in FIG. 6. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1B of the second example are shown below.

Numerical Example 2

| Unit: mm | | | | |
|---|---|---|---|---|
| Surface data | | | | |
| Surface Number | r | d | nd | vd |
| Object Plane | ∞ | ∞ | | |
| 1 | 7.304 | 0.670 | 1.98959 | 21.17 |
| 2 | 4.082 | 1.340 | | |
| 3 | ∞ | 5.367 | 1.84666 | 23.78 |
| 4 | ∞ | Variable | | |
| 5 | −14.849 | 0.600 | 1.75450 | 51.57 |
| 6 | 5.114 | 0.872 | 1.93187 | 21.15 |
| 7 | 19.758 | Variable | | |
| 8 (Diaphragm) | ∞ | 0.000 | | |
| 9* | 4.258 | 1.529 | 1.58311 | 59.46 |
| 10* | −14.877 | 0.100 | | |
| 11 | 6.653 | 1.498 | 1.49700 | 81.61 |
| 12 | −6.991 | 0.600 | 1.83797 | 36.26 |
| 13 | 3.354 | 1.751 | 1.49928 | 79.11 |
| 14 | −20.555 | 0.100 | | |
| 15* | 14.299 | 0.860 | 1.53048 | 55.72 |
| 16* | −10.295 | Variable | | |
| 17* | −3.069 | 0.600 | 1.53048 | 55.72 |
| 18* | −10.575 | Variable | | |
| 19 | ∞ | 0.500 | 1.51680 | 64.20 |
| 20 | ∞ | 0.500 | | |
| Image Plane | ∞ | | | |

Aspherical Surface Data

Ninth Surface

K = 0.0000e+000, A4 = −2.6253e−004, A6 = −1.082e−003,
A8 = 9.2455e−004, A10 = −3.9021e−004, A12 = 8.0870e−005,
A14 = −6.5788e−006

Tenth Surface

K = 0.0000e+000, A4 = 1.7692e−003, A6 = −1.1201e−003,
A8 = 9.6580e−004, A10 = −4.0981e−004, A12 = 8.5162e−005,
A14 = −6.9291e−006

-continued

Unit: mm

Fifteenth Surface

K = 0.0000e+000, A4 = −2.4645e−004, A6 = −5.7983e−004,
A8 = −3.7534e−005, A10 = −1.2560e−005
Sixteenth Surface K = 0.0000e+000, A4 = 5.1213e−004, A6 = −4.3529e−004,
A8 = −7.3927e−005, A10 = −6.2700e−007
Seventeenth Surface K = 0.0000e+000, A4 = 4.9310e−003, A6 = −2.0820−004,
A8 = −1.7118e−004, A10 = 1.0396e−004, A12 = −1.3025e−005,
A14 = 3.6981e−007
Eighteenth Surface K = 0.0000e+000, A4 = 1.0164e−003, A6 = −4.0033e−004,
A8 = −5.2341e−006, A10 = 9.2486e−006, A12 = 2.8546e−006,
A14 = −4.5345e−007

|  | Wide-Angle End | Middle Point | Telephoto End |
|---|---|---|---|
| Variable Distance | | | |
| Between $4^{th}$ and $5^{th}$ Surfaces | 0.600 | 1.431 | 0.600 |
| Between $7^{th}$ and $8^{th}$ Surfaces | 5.578 | 2.453 | 0.500 |
| Between $16^{th}$ and $17^{th}$ Surfaces | 2.813 | 3.107 | 4.734 |
| Between $18^{th}$ and $19^{th}$ Surfaces | 0.921 | 2.921 | 4.078 |
| Various Data | | | |
| Zoom Data | | | |
| Zoom Ratio ft/fw: 2.75 | | | |
| Focal Length | 3.804 | 6.316 | 10.459 |
| F-Number | 2.876 | 3.867 | 4.988 |
| Angle of View | 37.791 | 25.037 | 15.751 |
| Image Height | 2.950 | 2.950 | 2.950 |
| Entire Lens Length | 26.630 | 26.630 | 26.630 |
| BF | 1.750 | 3.751 | 4.907 |

Zoom Lens Group Data

| Group | Start Surface | End Surface | Focal Length |
|---|---|---|---|
| 1 | 1 | 4 | −10.428 |
| 2 | 5 | 7 | −15.664 |
| 3 | 8 | 16 | 5.405 |
| 4 | 17 | 18 | −8.382 |

Longitudinal spherical aberrations (sine conditions), astigmatisms and distortions in the variable magnification optical system 1B of the second example under the above lens arrangement and construction are shown in FIG. 25.

Third Example

Figure 8:
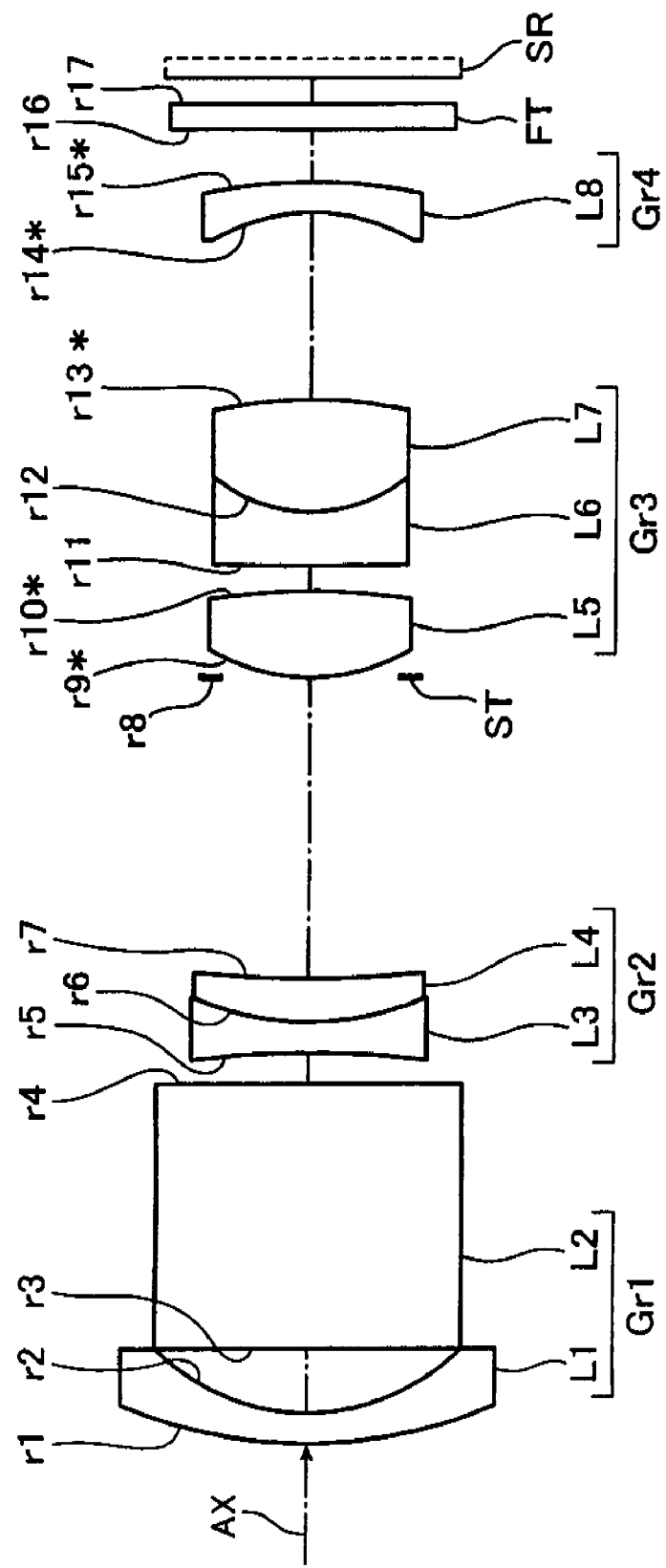
FIG. 8 is a section showing an arrangement of lens groups in a variable magnification optical system in a third example.
Figure 9:
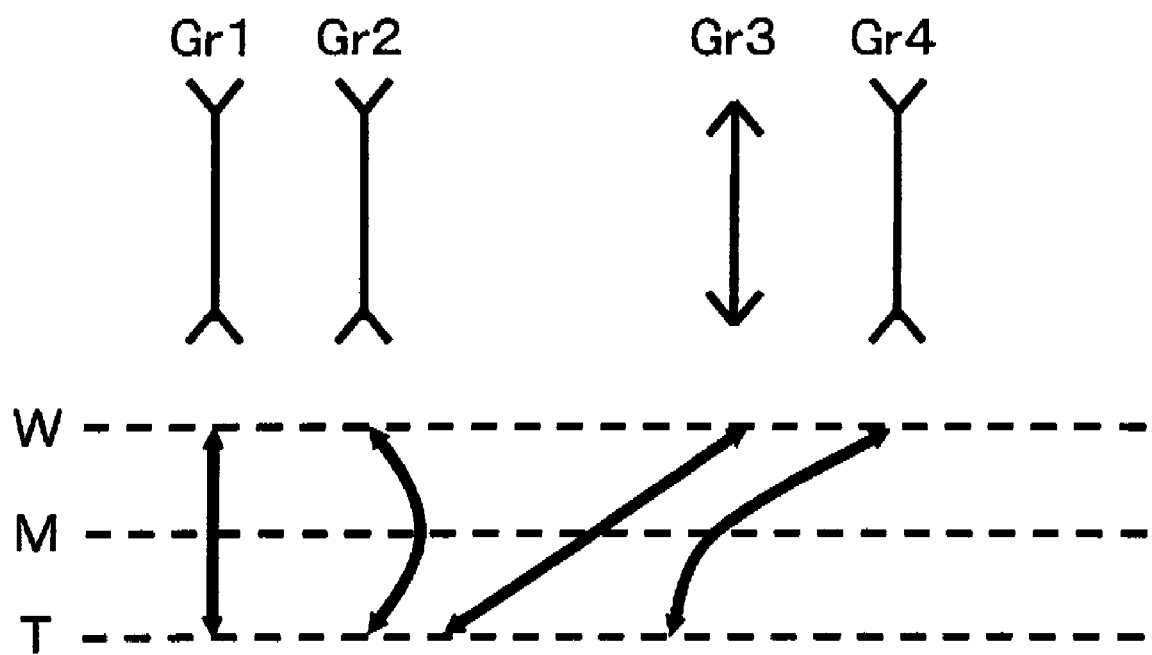
FIG. 9 is a diagram showing moving states of the respective lens groups during the zooming of the variable magnification optical system of the third example.
Figure 26A:
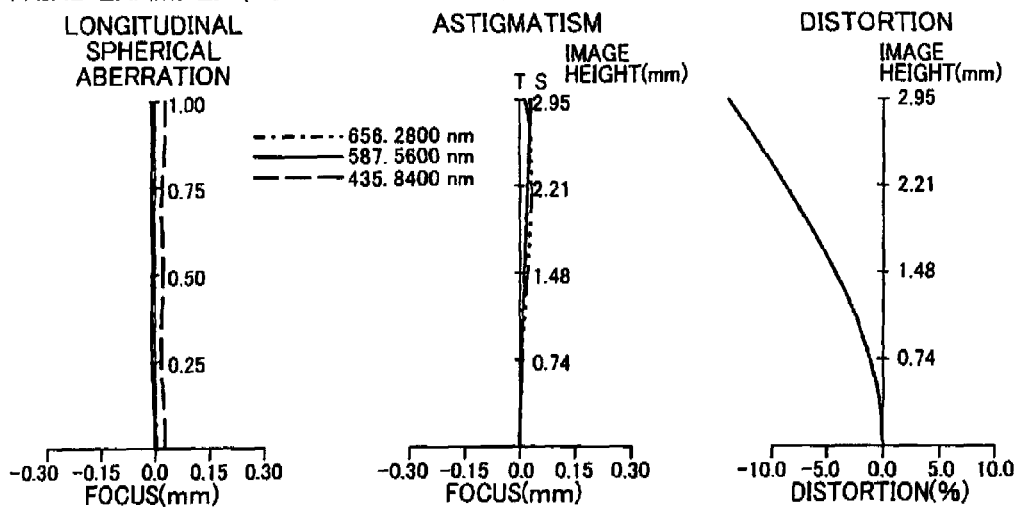
Figure 26B:
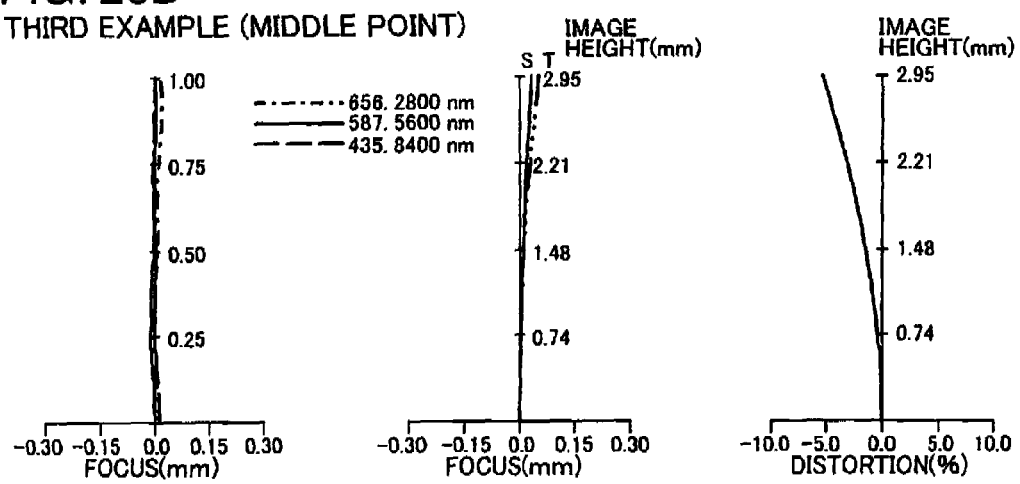
Figure 26C:
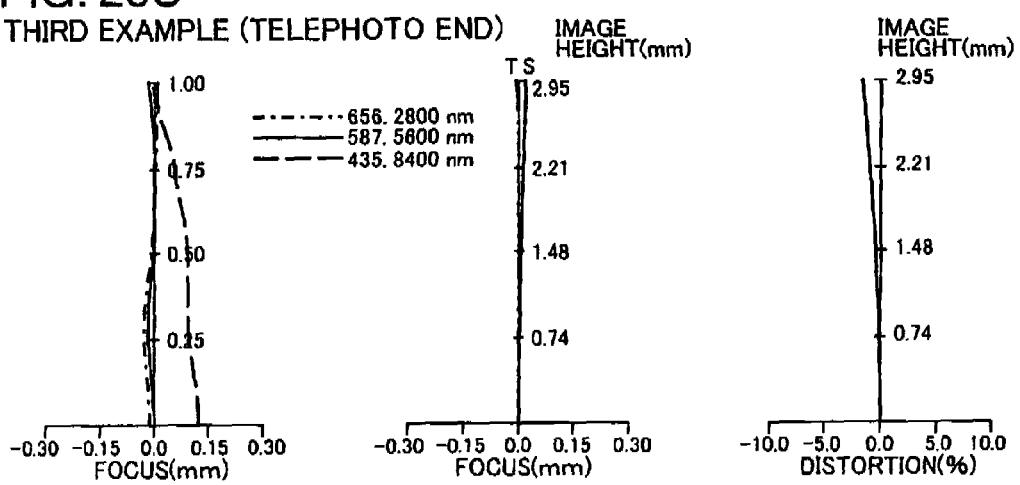

FIG. 8 is a section showing an arrangement of lens groups in a variable magnification optical system in a third example. FIG. 9 is a diagram showing moving states of the respective lens groups during the zooming of the variable magnification optical system of the third example. FIG. 9 is the diagram also showing moving states of lens groups during the zooming of variable magnification optical systems 1D, 1G, 1H, 1K and 1L of fourth, seventh, eighth, eleventh and twelfth examples to be described later. FIG. 26 are aberration diagrams of the variable magnification optical system in the third example.

The variable magnification optical system 1C of the third example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 8. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1C of the third example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a positive meniscus lens (sixth lens L6) convex toward the object side and a biconcave negative lens (seventh lens L7). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth and seventh lenses L6, L7 form a cemented lens. An image-side surface of the seventh lens L7 is an aspherical surface.

The fourth lens group (Gr4) is composed of a negative meniscus lens (eighth lens L8) convex toward the image side. The eighth lens L8 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1C of this third example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1C of the third example are shown below.

Numerical Example 3

Unit: mm

Surface data

| Surface Number | r | d | nd | vd |
|---|---|---|---|---|
| Object Plane | ∞ | ∞ | | |
| 1 | 9.395 | 0.600 | 1.93755 | 23.80 |
| 2 | 4.142 | 1.310 | | |
| 3 | ∞ | 5.153 | 1.84666 | 23.78 |
| 4 | ∞ | Variable | | |
| 5 | −18.943 | 0.600 | 1.72364 | 47.58 |
| 6 | 5.683 | 0.857 | 2.00170 | 20.60 |
| 7 | 21.138 | Variable | | |
| 8 (Diaphragm) | ∞ | 0.000 | | |
| 9* | 3.772 | 1.685 | 1.58311 | 59.46 |
| 10* | −10.142 | 0.498 | | |
| 11 | 106.601 | 1.067 | 1.87254 | 28.95 |
| 12 | 3.000 | 2.193 | 1.58311 | 59.46 |
| 13* | −8.420 | Variable | | |
| 14* | −3.684 | 0.600 | 1.53048 | 55.72 |
| 15* | −10.407 | Variable | | |
| 16 | ∞ | 0.500 | 1.51680 | 64.20 |
| 17 | ∞ | 0.500 | | |
| Image Plane | ∞ | | | |

Aspherical Surface Data

Ninth Surface

K = 0.0000e+000, A4 = −7.0686e−004, A6 = −1.4195-003,
A8 = 1.0492e−003, A10 = −3.9987e−004, A12 = 7.5284e−005,
A14 = −5.5970e−006

Tenth Surface

K = 0.0000e+000, A4 = 3.2708e−003, A6 = −1.3975e−003,
A8 = 1.0920e−003, A10 = −4.3907e−004, A12 = 8.6928e−005,
A14 = −6.7744e−006

Thirteenth Surface

K = 0.0000e+000, A4 = 3.0074e−004, A6 = 1.7234e−004,
A8 = 6.1177e−006, A10 = 4.0308e−006

Fourteenth Surface

K = 0.0000e+000, A4 = 1.1139e−003, A6 = −1.2713e−004,
A8 = 2.5909e−004, A10 = 3.9583e−006, A12 = −1.3025e−005,
A14 = 3.6982e−007

Fifteenth Surface

K = 0.0000e+000, A4 = −6.0157e−004, A6 = −2.0635e−004,
A8 = 2.0617e−004, A10 = −3.4752e−005, A12 = 2.8546e−006,
A14 = −4.5344e−007

| | Wide-Angle End | Middle Point | Telephoto End |
|---|---|---|---|
| Variable Distance | | | |
| Between 4th and 5th Surfaces | 0.600 | 1.635 | 0.600 |
| Between 7th and 8th Surfaces | 5.915 | 2.402 | 0.500 |
| Between 13th and 14th Surfaces | 3.605 | 3.473 | 5.087 |
| Between 15th and 16th Surfaces | 1.027 | 3.638 | 4.961 |
| Various Data | | | |
| Zoom Data | | | |
| Zoom Ratio ft/fw: 2.75 | | | |
| Focal Length | 3.804 | 6.316 | 10.458 |
| F-Number | 2.876 | 3.920 | 5.109 |
| Angle of View | 37.791 | 25.036 | 15.752 |

Unit: mm

| | | | |
|---|---|---|---|
| Image Height | 2.950 | 2.950 | 2.950 |
| Entire Lens Length | 26.539 | 26.540 | 26.540 |
| BF | 1.857 | 4.468 | 5.791 |

Zoom Lens Group Data

| Group | Start Surface | End Surface | Focal Length |
|---|---|---|---|
| 1 | 1 | 4 | −8.365 |
| 2 | 5 | 7 | −27.465 |
| 3 | 8 | 13 | 5.632 |
| 4 | 14 | 15 | −11.095 |

Longitudinal spherical aberrations (sine conditions), astigmatisms and distortions in the variable magnification optical system 1C of the third example under the above lens arrangement and construction are shown in FIG. 26.

Fourth Example

Figure 10:
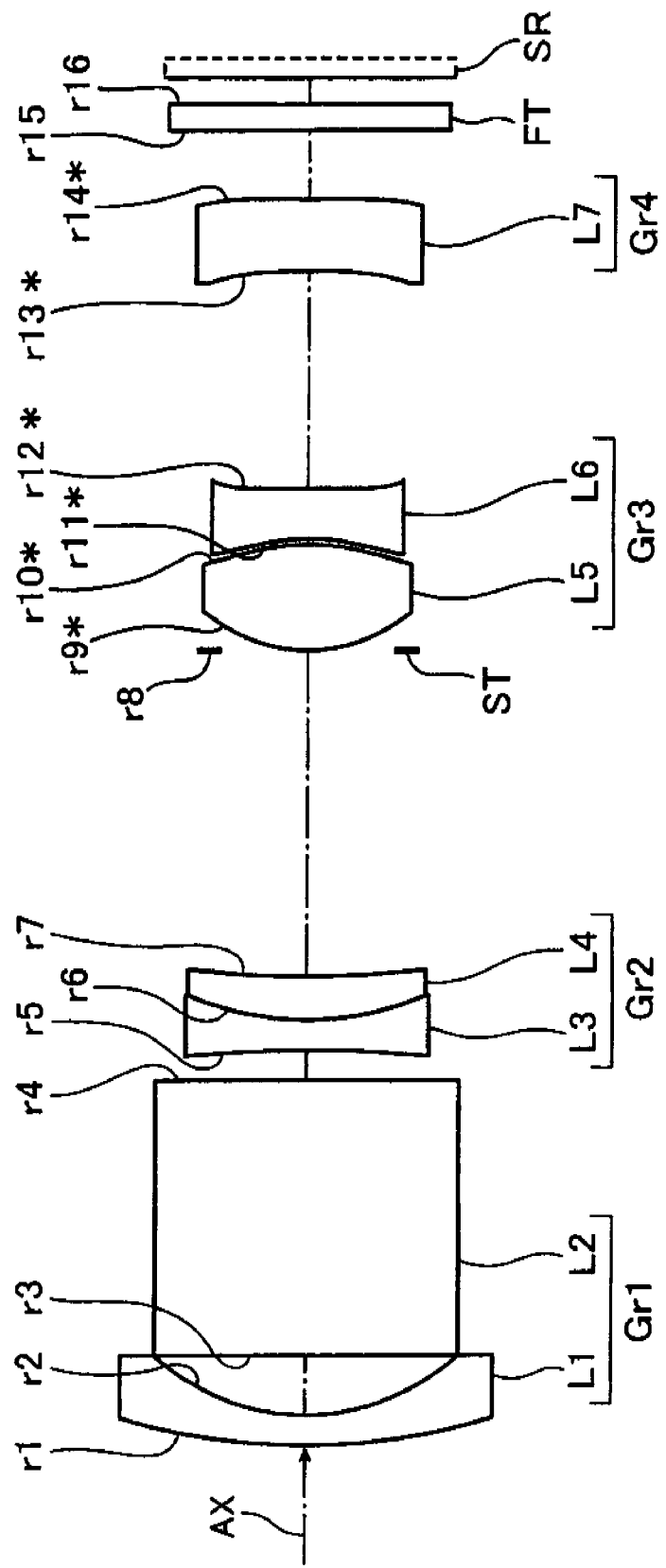
FIG. 10 is a section showing an arrangement of lens groups in the variable magnification optical system in a fourth example.

FIG. 10 is a section showing an arrangement of lens groups in a variable magnification optical system in a fourth example. FIG. 27 are aberration diagrams of the variable magnification optical system in the fourth example.

The variable magnification optical system 1D of the fourth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 10. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1D of the fourth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5) and a negative meniscus lens (sixth lens L6) convex toward the image side. The optical diaphragm ST is arranged at the object side of the fifth lens L5 and moved together with the third lens group (Gr3). The optical diaphragm ST may be a mechanical shutter. Both surfaces of the fifth and sixth lenses L5, L6 are aspherical surfaces.

The fourth lens group (Gr4) is composed of a biconcave negative lens (seventh lens L7). The seventh lens L7 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1D of this fourth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1D of the fourth example are shown below.

Numerical Example 4

Unit: mm

Surface data

| Surface Number | r | d | nd | vd |
|---|---|---|---|---|
| Object Plane | ∞ | ∞ | | |
| 1 | 12.669 | 0.600 | 1.80958 | 40.41 |
| 2 | 4.374 | 1.215 | | |
| 3 | ∞ | 5.317 | 1.84666 | 23.78 |
| 4 | ∞ | Variable | | |
| 5 | −24.560 | 0.600 | 1.70986 | 34.56 |
| 6 | 5.962 | 0.848 | 2.00170 | 20.60 |
| 7 | 19.523 | Variable | | |
| 8 (Diaphragm) | ∞ | 0.000 | | |
| 9* | 3.084 | 2.075 | 1.58311 | 59.46 |
| 10* | −4.254 | 0.100 | | |
| 11* | −4.404 | 0.971 | 1.80542 | 26.13 |
| 12* | −39.174 | Variable | | |
| 13* | −19.330 | 1.402 | 1.53048 | 55.72 |
| 14* | 47.041 | Variable | | |
| 15 | ∞ | 0.500 | 1.51680 | 64.20 |
| 16 | ∞ | 0.500 | | |
| Image Plane | ∞ | | | |

Aspherical Surface Data

Ninth Surface

K = 0.0000e+000, A4 = −1.0156e−005, A6 = −1.3311−003,
A8 = 9.3195e−004, A10 = −3.7651e−004, A12 = 7.1993e−005,
A14 = −5.4617e−006

Tenth Surface

K = 0.0000e+000, A4 = 5.3824e−003, A6 = −1.6516e−004,
A8 = 1.0221e−003, A10 = −4.1301e−004, A12 = 7.9565e−005,
A14 = −6.9753e−006

Eleventh Surface

K = 0.0000e+000, A4 = 4.5913e−003, A6 = 1.4999e−003,
A8 = 3.0809e−004, A10 = −7.8389e−005

Twelfth Surface

K = 0.0000e+000, A4 = 6.9369e−003, A6 = 1.2281e−003,
A8 = 2.8508e−004, A10 = −7.3909e−006

Thirteenth Surface

K = 0.0000e+000, A4 = −9.4339e−003, A6 = −1.7534e−004,
A8 = 1.8831e−004, A10 = 7.7955e−006, A12 = −1.2145e−005,
A14 = 4.0258e−007

Fourteenth Surface

K = 0.0000e+000, A4 = −8.5347e−003, A6 = 7.2150e−005,
A8 = 1.8312e−004, A10 = −4.5277e−005, A12 = 5.2398e−006,
A14 = −4.4296e−007

| | Wide-Angle End | Middle Point | Telephoto End |
|---|---|---|---|
| Variable Distance | | | |
| Between 4th and 5th Surfaces | 0.600 | 2.553 | 0.600 |
| Between 7th and 8th Surfaces | 6.362 | 1.765 | 0.500 |
| Between 12th and 13h Surfaces | 4.199 | 3.976 | 5.730 |
| Between 14th and 15th Surfaces | 1.327 | 4.194 | 5.658 |
| Various Data Zoom Data Zoom Ratio ft/fw: 2.75 | | | |
| Focal Length | 3.802 | 6.315 | 10.454 |
| F-Number | 2.877 | 3.856 | 5.049 |
| Angle of View | 37.805 | 25.039 | 15.758 |
| Image Height | 2.950 | 2.950 | 2.950 |
| Entire Lens Length | 26.444 | 26.444 | 26.444 |
| BF | 2.156 | 5.024 | 6.487 |

Zoom Lens Group Data

| Group | Start Surface | End Surface | Focal Length |
|---|---|---|---|
| 1 | 1 | 4 | −8.528 |
| 2 | 5 | 7 | −32.422 |
| 3 | 8 | 12 | 5.778 |
| 4 | 13 | 14 | −25.639 |

Longitudinal spherical aberrations (sine conditions), astigmatisms and distortions in the variable magnification optical system 1D of the fourth example under the above lens arrangement and construction are shown in FIG. 27.

Fifth Example

Figure 11:
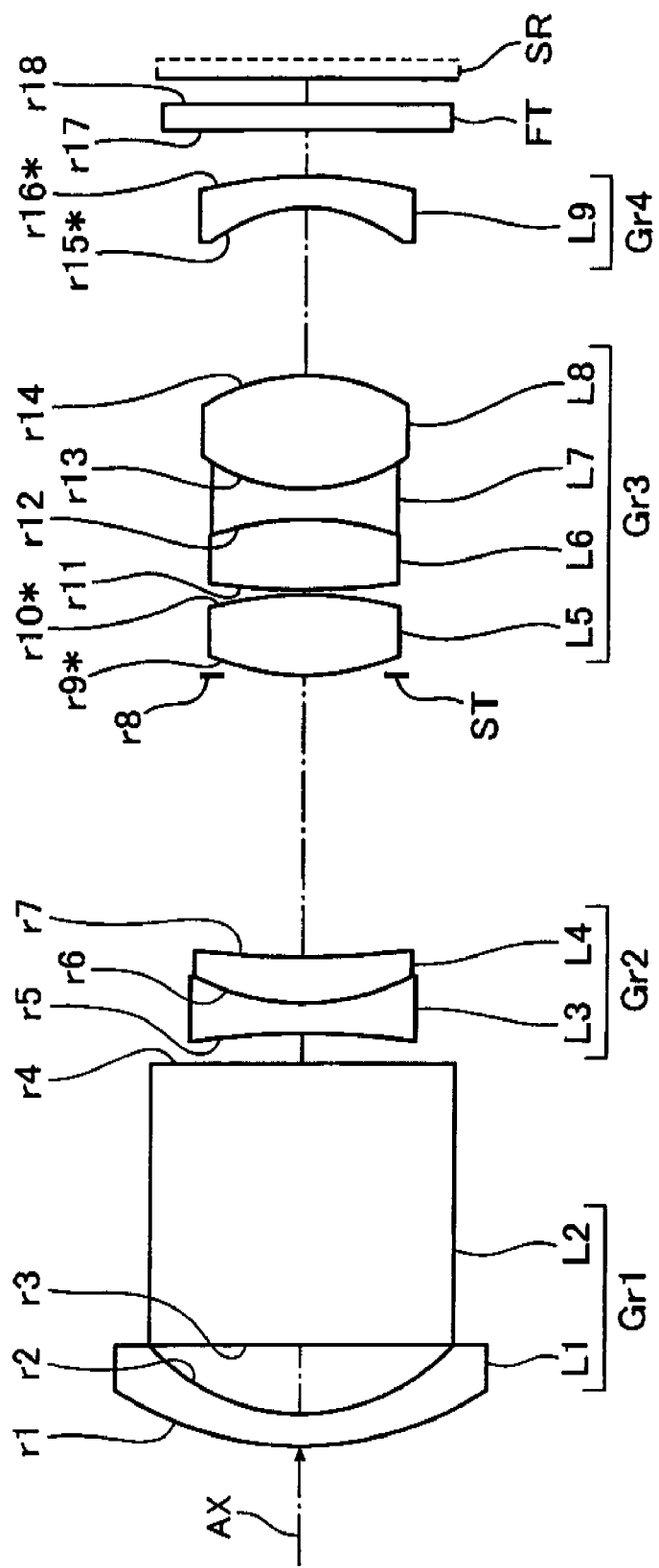
FIG. 11 is a section showing an arrangement of lens groups in a variable magnification optical system in a fifth example.
Figure 28A:
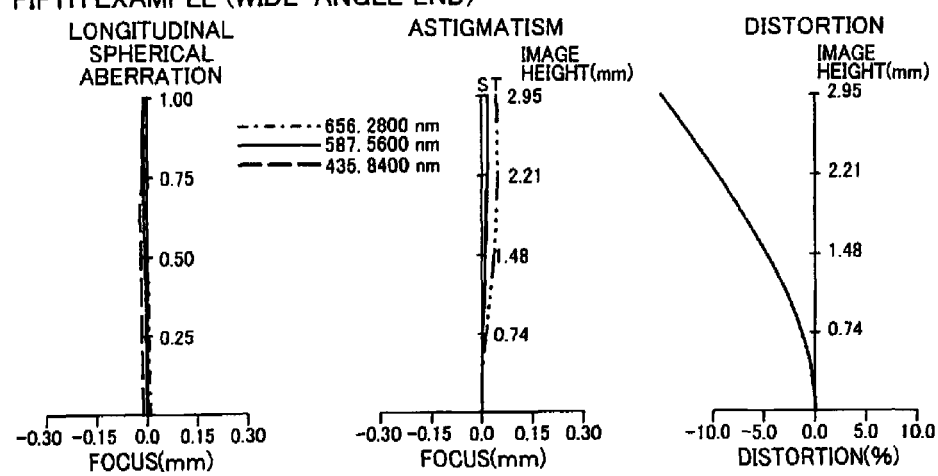
Figure 28B:
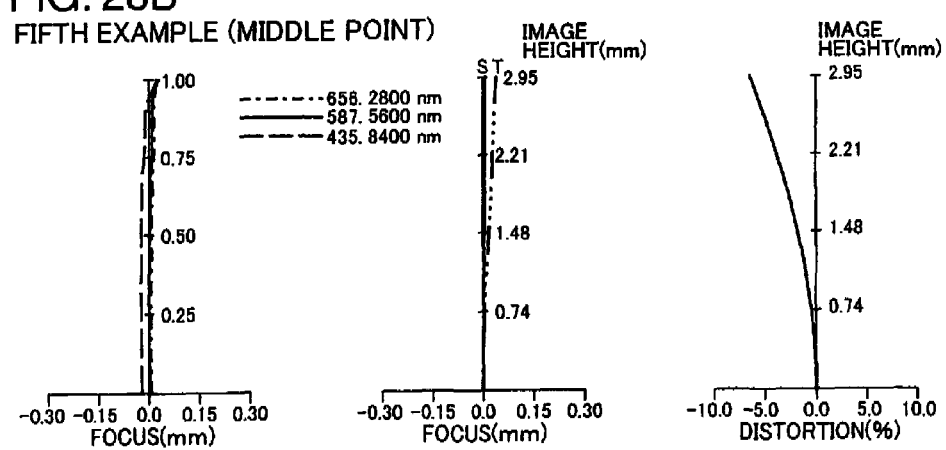
Figure 28C:
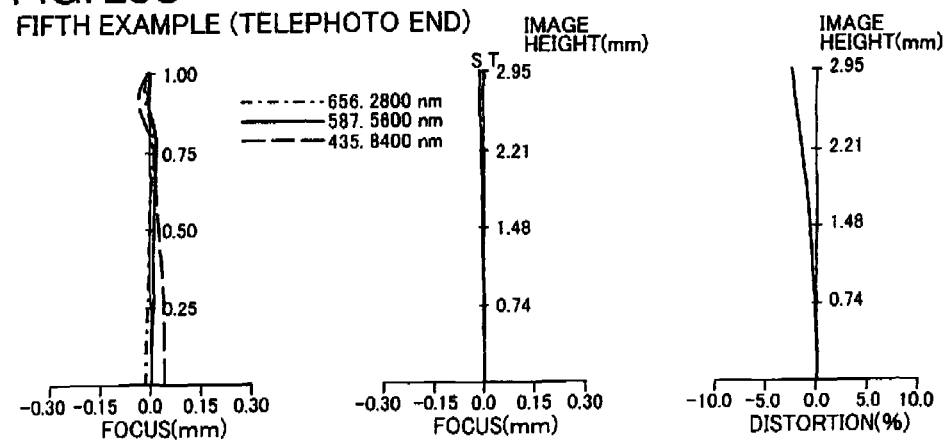

FIG. 11 is a section showing an arrangement of lens groups in a variable magnification optical system in a fifth example. FIG. 28 are aberration diagrams of the variable magnification optical system in the fifth example.

The variable magnification optical system 1E of the fifth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 11. At the time of zooming (magnification variation), the first lens group (Gr1) is fixed, the second lens group (Gr2) is moved, the third lens group (Gr3) and the fourth lens group (Gr4) are so moved as to increase a distance between them, and the optical diaphragm ST is moved together with the third lens group (Gr3) as shown in FIG. 6.

More specifically, in the variable magnification optical system 1E of the fifth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1E of this fifth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3) and the optical diaphragm ST is moved together with the third lens group (Gr3) as shown in FIG. 6. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1E of the fifth example are shown below.

Numerical Example 5

Unit: mm

Surface data

| Surface Number | r | d | nd | vd |
|---|---|---|---|---|
| Object Plane | ∞ | ∞ | | |
| 1 | 6.714 | 0.635 | 1.94595 | 17.98 |
| 2 | 3.955 | 1.415 | | |
| 3 | ∞ | 5.468 | 1.84666 | 23.78 |
| 4 | ∞ | Variable | | |
| 5 | −16.384 | 0.600 | 1.77250 | 49.65 |
| 6 | 4.606 | 0.911 | 1.92286 | 20.88 |
| 7 | 17.472 | Variable | | |
| 8 (Diaphragm) | ∞ | 0.000 | | |
| 9* | 4.620 | 1.600 | 1.58311 | 59.46 |
| 10* | −6.632 | 0.100 | | |
| 11 | 14.580 | 1.391 | 1.48749 | 70.45 |
| 12 | −5.825 | 0.600 | 1.83400 | 37.35 |
| 13 | 3.645 | 2.171 | 1.49700 | 81.61 |
| 14 | −3.987 | Variable | | |
| 15* | −2.710 | 0.600 | 1.53048 | 55.72 |
| 16* | −8.172 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface $K = 0.0000e+000$, $A4 = -1.0042e-003$, $A6 = -1.3530e-003$, $A8 = 9.4547e-004$, $A10 = -3.7128e-004$, $A12 = 7.6462e-005$, $A14 = -6.5788e-006$ Tenth Surface $K = 0.0000e+000$, $A4 = 3.0978e-003$, $A6 = -1.5630e-003$, $A8 = 1.1148e-003$, $A10 = -4.3162e-004$, $A12 = 8.5384e-005$, $A14 = -6.9291e-006$ Fifteenth Surface $K = 0.0000e+000$, $A4 = 6.7923e-003$, $A6 = 5.9300e-004$, $A8 = -9.4708e-005$, $A10 = 6.2272e-005$, $A12 = -1.0587e-005$, $A14 = 3.6981e-007$ Sixteenth Surface $K = 0.0000e+000$, $A4 = 8.5225e-004$, $A6 = 2.3866e-005$, $A8 = -1.2788e-005$, $A10 = -4.9293e-006$, $A12 = 3.2924e-006$, $A14 = -4.5345e-007$

| | Wide-Angle End | Middle Point | Telephoto End |
|---|---|---|---|
| Variable Distance | | | |
| Between 4th and 5th Surfaces | 0.600 | 1.380 | 0.600 |
| Between 7th and 8th Surfaces | 5.524 | 2.477 | 0.500 |
| Between 14th and 15th Surfaces | 3.283 | 3.441 | 4.736 |
| Between 16th and 17th Surfaces | 0.902 | 3.010 | 4.473 |
| Various Data | | | |
| Zoom Data | | | |
| Zoom Ratio ft/fw: 2.75 | | | |
| Focal Length | 3.818 | 6.339 | 10.497 |
| F-Number | 2.875 | 3.868 | 5.001 |
| Angle of View | 37.691 | 24.955 | 15.697 |
| Image Height | 2.950 | 2.950 | 2.950 |
| Entire Lens Length | 26.630 | 26.630 | 26.630 |
| BF | 1.732 | 3.840 | 5.303 |

-continued

Unit: mm

Zoom Lens Group Data

| Group | Start Surface | End Surface | Focal Length |
|---|---|---|---|
| 1 | 1 | 4 | −11.454 |
| 2 | 5 | 7 | −14.707 |
| 3 | 8 | 14 | 5.359 |
| 4 | 15 | 16 | −7.945 |

Longitudinal spherical aberrations (sine conditions), astigmatisms and distortions in the variable magnification optical system 1E of the fifth example under the above lens arrangement and construction are shown in FIG. 28.

Sixth Example

Figure 12:
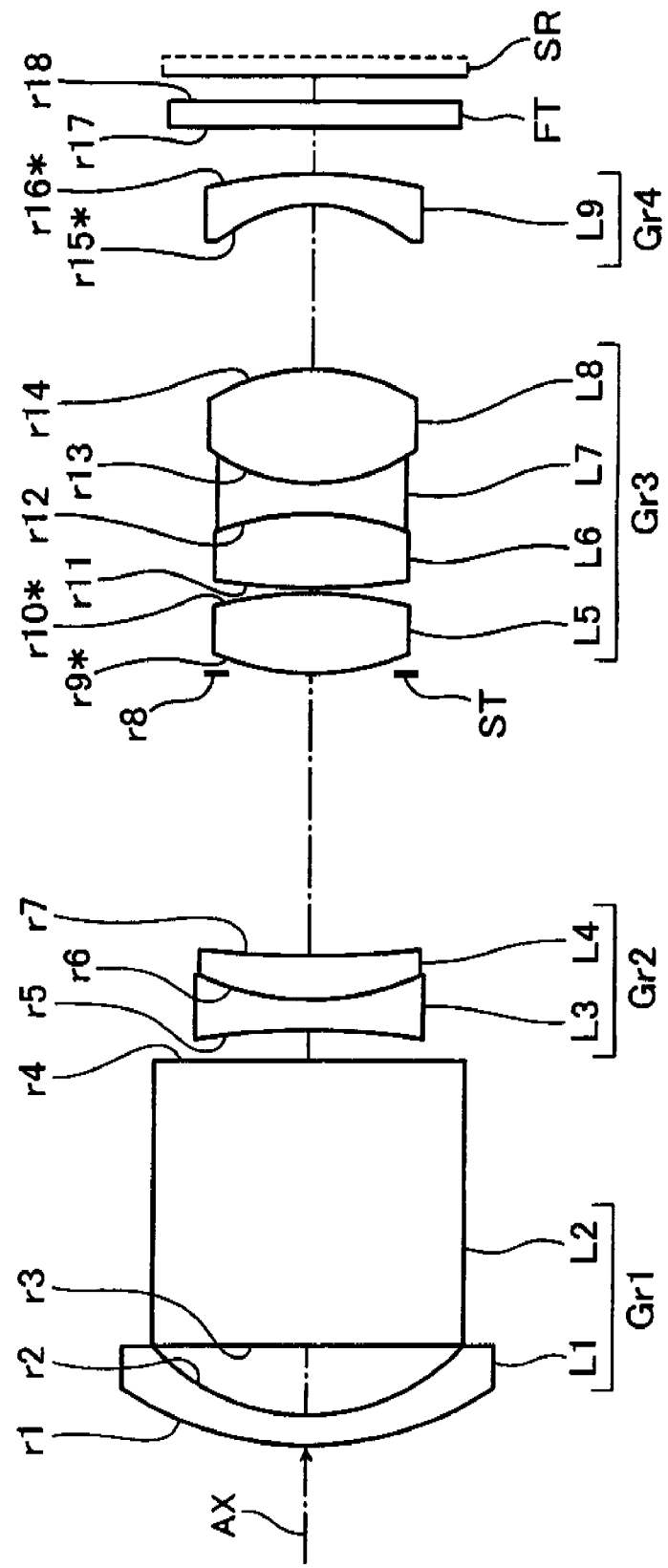
FIG. 12 is a section showing an arrangement of lens groups in the variable magnification optical system in a sixth example.

FIG. 12 is a section showing an arrangement of lens groups in a variable magnification optical system in a sixth example. FIG. 29 are aberration diagrams of the variable magnification optical system in the sixth example.

The variable magnification optical system 1F of the sixth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 12. At the time of zooming (magnification variation), the first lens group (Gr1) is fixed, the second lens group (Gr2) is moved, the third lens group (Gr3) and the fourth lens group (Gr4) are so moved as to increase a distance between them, and the optical diaphragm ST is moved together with the third lens group (Gr3) as shown in FIG. 6.

More specifically, in the variable magnification optical system 1F of the sixth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1F of this sixth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3) and the optical diaphragm ST is moved together with the third lens group (Gr3) as shown in FIG. 6. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1F of the sixth example are shown below.

Numerical Example 6

Unit: mm

Surface data

| Surface Number | r | d | nd | vd |
|---|---|---|---|---|
| Object Plane | ∞ | ∞ | | |
| 1 | 6.556 | 0.600 | 1.94595 | 17.98 |
| 2 | 4.105 | 1.412 | | |
| 3 | ∞ | 5.536 | 1.84666 | 23.78 |
| 4 | ∞ | Variable | | |
| 5 | −14.518 | 0.600 | 1.77250 | 49.65 |
| 6 | 5.141 | 0.875 | 1.92286 | 20.88 |
| 7 | 20.333 | Variable | | |
| 8 (Diaphragm) | ∞ | 0.000 | | |
| 9* | 4.614 | 1.608 | 1.58311 | 59.46 |
| 10* | −6.878 | 0.100 | | |
| 11 | 12.150 | 1.439 | 1.48749 | 70.45 |
| 12 | −5.583 | 0.600 | 1.83600 | 37.35 |
| 13 | 3.566 | 2.194 | 1.48749 | 70.45 |
| 14 | −3.896 | Variable | | |
| 15* | −2.569 | 0.600 | 1.53048 | 55.72 |
| 16* | −8.134 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −8.4639e−004, A6 = −1.4187e−003,
A8 = 9.8164e−004, A10 = −3.7988e−004, A12 = 7.6940e−005,
A14 = −6.4648e−006

Tenth Surface

K = 0.0000e+000, A4 = 2.9861e−003, A6 = −1.6327e−003,
A8 = 1.1524e−003, A10 = −4.3849e−004, A12 = 8.5304e−005,
A14 = −6.7900e−006

Fifteenth Surface

K = 0.0000e+000, A4 = 7.8069e−003, A6 = 7.8259e−004,
A8 = −9.5094e−005, A10 = 6.0600e−005, A12 = −7.6162e−006,
A14 = 3.6981e−007

-continued

Unit: mm

Sixteenth Surface

K = 0.0000e+000, A4 = 1.0540e−003, A6 = 5.7727e−005,
A8 = −2.8773e−005, A10 = −3.6698e−006, A12 = 3.7330e−006,
A14 = −4.5310e−007

|  | Wide-Angle End | Middle Point | Telephoto End |
|---|---|---|---|
| Variable Distance | | | |
| Between 4th and 5th Surfaces | 0.600 | 1.347 | 0.600 |
| Between 7th and 8th Surfaces | 5.516 | 2.516 | 0.500 |
| Between 14th and 15th Surfaces | 3.208 | 3.355 | 4.532 |
| Between 16th and 17th Surfaces | 0.911 | 3.017 | 4.604 |
| Various Data | | | |
| Zoom Data | | | |
| Zoom Ratio ft/fw: 2.75 | | | |
| Focal Length | 4.113 | 6.830 | 11.309 |
| F-Number | 2.875 | 3.888 | 5.060 |
| Angle of View | 36.105 | 23.713 | 14.856 |
| Image Height | 3.000 | 3.000 | 3.000 |
| Entire Lens Length | 26.630 | 26.630 | 26.630 |
| BF | 1.741 | 3.847 | 5.434 |

| Zoom Lens Group Data | | | |
|---|---|---|---|
| Group | Start Surface | End Surface | Focal Length |
| 1 | 1 | 4 | −13.175 |
| 2 | 5 | 7 | −14.261 |
| 3 | 8 | 14 | 5.397 |
| 4 | 15 | 16 | −7.354 |

Longitudinal spherical aberrations (sine conditions), astigmatisms and distortions in the variable magnification optical system 1F of the sixth example under the above lens arrangement and construction are shown in FIG. 29.

Seventh Example

Figure 13:
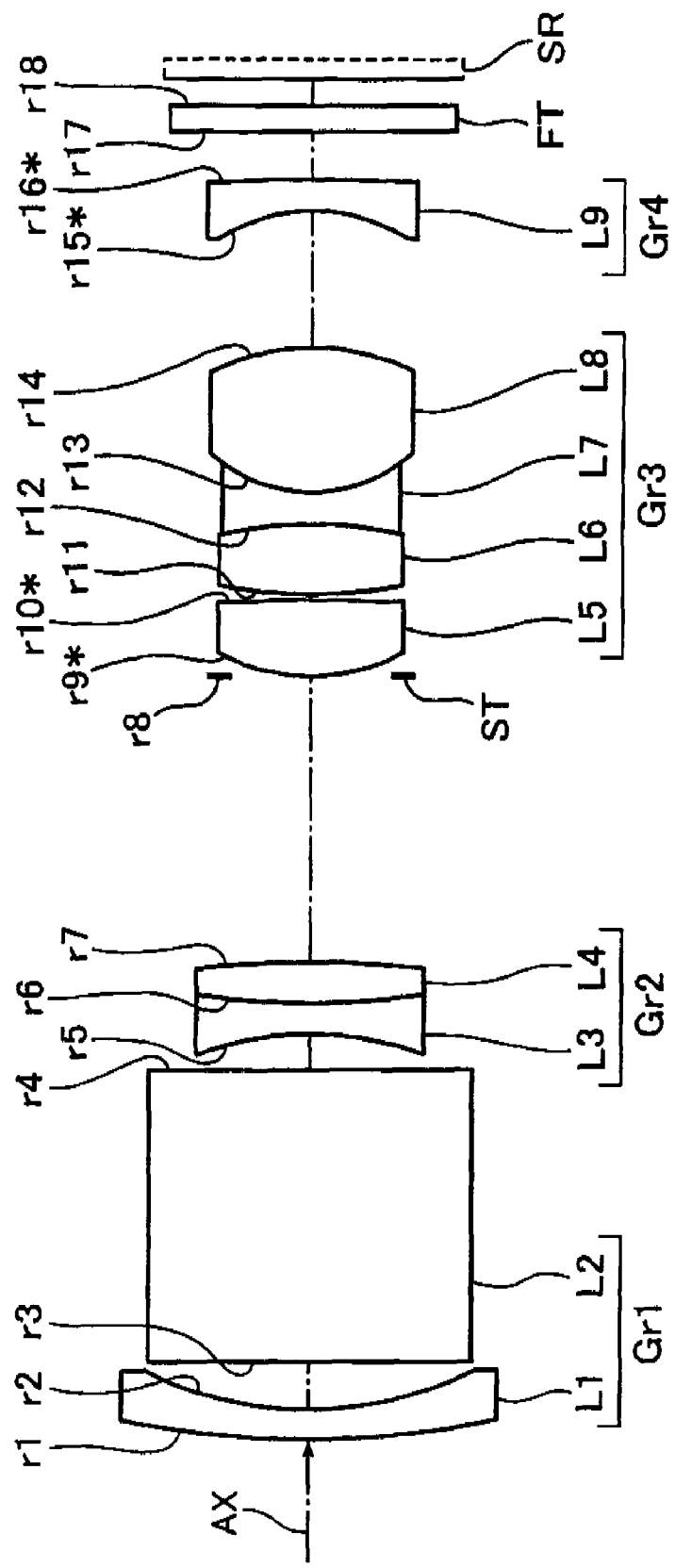
FIG. 13 is a section showing an arrangement of lens groups in a variable magnification optical system in a seventh example.

FIG. 13 is a section showing an arrangement of lens groups in a variable magnification optical system in a seventh example. FIG. 30 are aberration diagrams of the variable magnification optical system in the seventh example.

The variable magnification optical system 1G of the seventh example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 13. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1G of the seventh example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a biconvex positive lens (fourth lens L4). The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1G of this seventh example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1G of the seventh example are shown below.

Numerical Example 7

| Unit: mm | | | | |
|---|---|---|---|---|
| Surface data | | | | |
| Surface Number | r | d | nd | vd |
| Object Plane | ∞ | ∞ | | |
| 1 | 17.857 | 0.600 | 1.92742 | 25.01 |
| 2 | 7.085 | 0.961 | | |
| 3 | ∞ | 5.635 | 1.84666 | 23.78 |
| 4 | ∞ | Variable | | |
| 5 | −6.303 | 0.600 | 1.75450 | 51.57 |
| 6 | 15.328 | 0.790 | 1.93474 | 21.13 |
| 7 | −20.008 | Variable | | |

-continued

Unit: mm

| | | | | |
|---|---|---|---|---|
| 8 (Diaphragm) | ∞ | 0.000 | | |
| 9* | 3.944 | 1.504 | 1.58311 | 59.46 |
| 10* | −14.661 | 0.100 | | |
| 11 | 9.665 | 1.348 | 1.51732 | 76.48 |
| 12 | −7.997 | 0.600 | 1.85067 | 31.39 |
| 13 | 3.000 | 2.780 | 1.55428 | 47.60 |
| 14 | −4.608 | Variable | | |
| 15* | −3.421 | 0.600 | 1.53048 | 55.72 |
| 16* | −48.746 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = 4.4282e−004, A6 = −4.8632e−004,
A8 = 6.8537e−004, A10 = −2.8750e−004, A12 = 6.4564e−005,
A14 = −5.4895e−006

Tenth Surface

K = 0.0000e+000, A4 = 4.3209e−003, A6 = −2.7881e−004,
A8 = 6.9385e−004, A10 = −3.0948e−004, A12 = 7.6525e−005,
A14 = −6.7892e−006

Fifteenth Surface

K = 0.0000e+000, A4 = −6.9383e−004, A6 = −9.1395e−004,
A8 = 7.2264e−004, A10 = −4.3800e−005, A12 = −1.3025e−005,
A14 = 3.6982e−007

Sixteenth Surface

K = 0.0000e+000, A4 = −1.6588e−003, A6 = −6.3951e−004,
A8 = 4.4235e−004, A10 = −5.5174e−005, A12 = 2.8545e−006,
A14 = −4.5342e−007

| | Wide-Angle End | Middle Point | Telephoto End |
|---|---|---|---|
| Variable Distance | | | |
| Between 4th and 5th Surfaces | 0.704 | 2.054 | 0.600 |
| Between 7th and 8th Surfaces | 5.567 | 2.004 | 0.500 |
| Between 14th and 15th Surfaces | 2.657 | 2.500 | 2.613 |
| Between 16th and 17th Surfaces | 0.915 | 3.285 | 6.129 |
| Various Data | | | |
| Zoom Data | | | |
| Zoom Ratio ft/fw: 2.75 | | | |
| Focal Length | 4.020 | 6.674 | 11.050 |
| F-Number | 2.876 | 3.958 | 5.348 |
| Angle of View | 36.275 | 23.846 | 14.947 |
| Image Height | 2.950 | 2.950 | 2.950 |
| Entire Lens Length | 26.191 | 26.191 | 26.191 |
| BF | 1.745 | 4.114 | 6.959 |

Zoom Lens Group Data

| Group | Start Surface | End Surface | Focal Length |
|---|---|---|---|
| 1 | 1 | 4 | −13.012 |
| 2 | 5 | 7 | −17.611 |
| 3 | 8 | 14 | 5.499 |
| 4 | 15 | 16 | −6.968 |

Longitudinal spherical aberrations (sine conditions), astigmatisms and distortions in the variable magnification optical system 1G of the seventh example under the above lens arrangement and construction are shown in FIG. 30.

Eighth Example

Figure 14:
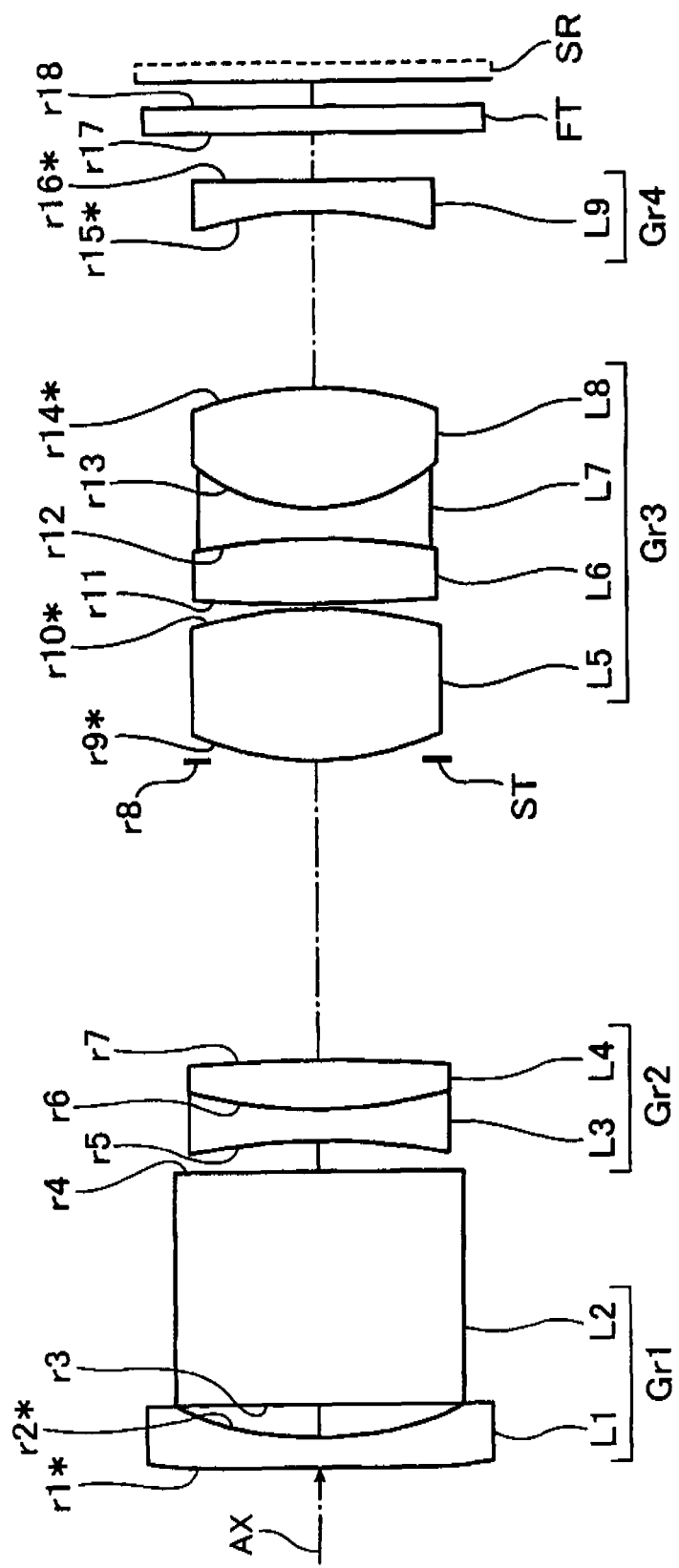
FIG. 14 is a section showing an arrangement of lens groups in the variable magnification optical system in an eighth example.
Figure 31A:
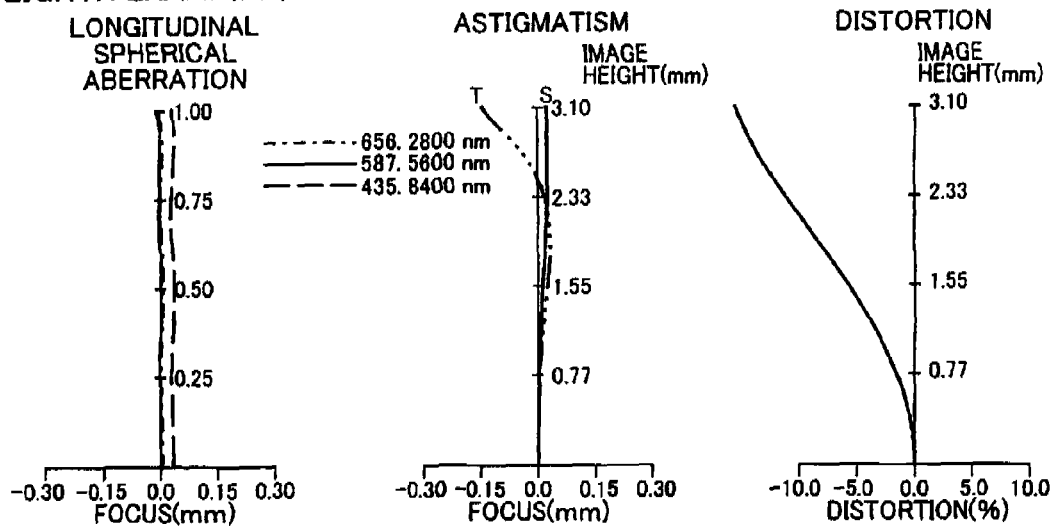
Figure 31B:
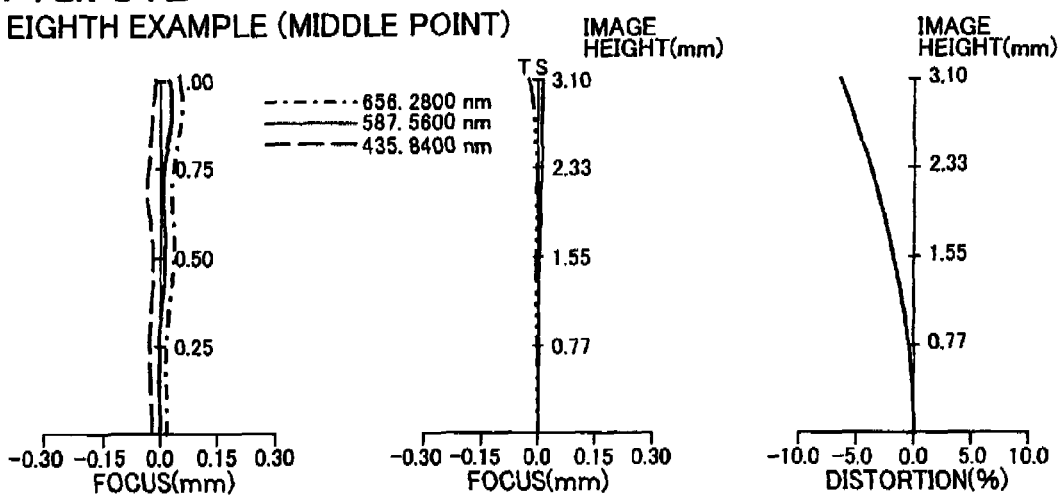
Figure 31C:
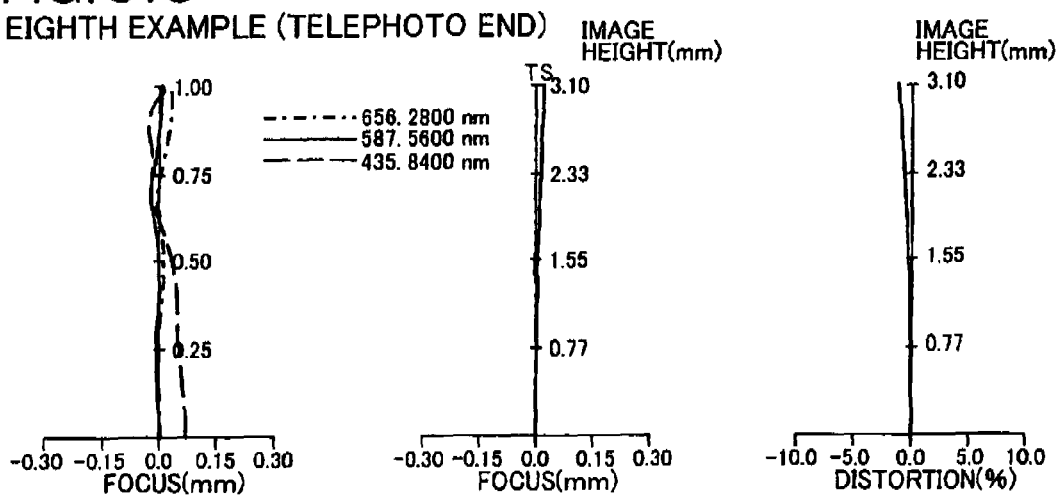

FIG. 14 is a section showing an arrangement of lens groups in a variable magnification optical system in an eighth example. FIG. 31 are aberration diagrams of the variable magnification optical system in the eighth example.

The variable magnification optical system 1H of the eighth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 14. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1H of the eighth example, the respective lens groups (Gr1, Gr2, Gr3, Gr4) are constructed as follows successively from the object side to the image side.

The first lens group (Gr1) is composed of a biconcave negative lens (first lens L1) and a prism (L2). Both surfaces of the first lens L1 are aspherical surfaces.

The second lens group (Gr2) is composed of a biconcave negative lens (third lens L3) and a biconvex positive lens (fourth lens L4). The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens. An image-side surface (one surface) of the eighth lens L8 is an aspherical surface.

The fourth lens group (Gr4) is composed of a biconcave negative lens (ninth lens L9). Both surfaces of the ninth lens L9 are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1H of this eighth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1H of the eighth example are shown below.

Numerical Example 8

Unit: mm

Surface data

| Surface Number | r | d | nd | vd |
|---|---|---|---|---|
| Object Plane | ∞ | ∞ | | |
| 1* | −49.349 | 0.600 | 2.00170 | 20.60 |
| 2* | 7.047 | 0.623 | | |
| 3 | ∞ | 4.577 | 1.90366 | 31.31 |
| 4 | ∞ | Variable | | |
| 5 | −10.199 | 0.600 | 1.75108 | 51.74 |
| 6 | 7.571 | 0.946 | 1.93116 | 21.25 |
| 7 | −25.026 | Variable | | |
| 8 (Diaphragm) | ∞ | 0.000 | | |
| 9* | 4.353 | 2.964 | 1.52328 | 75.17 |
| 10* | −5.632 | 0.100 | | |
| 11 | 28.150 | 12.79 | 1.53243 | 73.28 |
| 12 | −9.757 | 0.600 | 1.85634 | 32.97 |
| 13 | 3.022 | 2.293 | 1.54776 | 51.69 |
| 14* | −5.619 | Variable | | |
| 15* | −5.949 | 0.600 | 1.83300 | 37.30 |
| 16* | 168.560 | Variable | | |
| 17 | ∞ | 0.500 | 1.51680 | 64.20 |
| 18 | ∞ | 0.500 | | |
| Image Plane | ∞ | | | |

Aspherical Surface Data

First Surface

K = 0.0000e+000, A4 = 3.8795e−003, A6 = −4.4174e−004, A8 = 4.2557e−005, A10 = −1.3452e−006
Second Surface K = 0.0000e+000, A4 = 4.6087e−003, A6 = −3.1818e−004, A8 = 2.0676e−005, A10 = 3.3597e−006
Ninth Surface K = 0.0000e+000, A4 = −1.7079e−003, A6 = −7.9026e−004, A8 = 5.4668e−004, A10 = −2.0447e−004, A12 = 3.7139e−005, A14 = −2.6386e−006
Tenth Surface K = 0.0000e+000, A4 = 3.4784e−003, A6 = −7.9376e−004, A8 = 4.5710e−004, A10 = −1.5745e−004, A12 = 2.6853e−005, A14 = −1.7985e−006
Fourteenth Surface K = 0.0000e+000, A4 = −1.5118e−003, A6 = 9.4054e−005, A8 = −4.1334e−006, A10 = −4.1633e−006
Fifteenth Surface K = 0.0000e+000, A4 = 2.7199e−004, A6 = 2.3089e−004, A8 = −2.2298e−004, A10 = 1.1298e−004, A12 = −2.3869e−005, A14 = 3.0251e−007
Sixteenth Surface K = 0.0000e+000, A4 = 2.3722e−004, A6 = 1.0177e−004, A8 = −1.4866e−004, A10 = 6.7275e−005, A12 = −1.3722e−005, A14 = 7.0138e−007

-continued

Unit: mm

| | Wide-Angle End | Middle Point | Telephoto End |
|---|---|---|---|
| Variable Distance | | | |
| Between 4th and 5th Surfaces | 0.600 | 1.461 | 0.600 |
| Between 7th and 8th Surfaces | 5.834 | 2.566 | 0.500 |
| Between 14th and 15th Surfaces | 3.412 | 2.938 | 4.074 |
| Between 16th and 17th Surfaces | 0.912 | 3.792 | 5.584 |
| Various Data | | | |
| Zoom Data | | | |
| Zoom Ratio ft/fw: 2.75 | | | |
| Focal Length | 3.805 | 6.314 | 10.456 |
| F-Number | 2.875 | 4.084 | 5.356 |
| Angle of View | 39.168 | 26.150 | 16.514 |
| Image Height | 3.100 | 3.100 | 3.100 |
| Entire Lens Length | 26.770 | 26.770 | 26.770 |
| BF | 1.742 | 4.622 | 6.413 |

Zoom Lens Group Data

| Group | Start Surface | End Surface | Focal Length |
|---|---|---|---|
| 1 | 1 | 4 | −6.123 |
| 2 | 5 | 7 | −97.952 |
| 3 | 8 | 14 | 6.072 |
| 4 | 15 | 16 | −6.888 |

Longitudinal spherical aberrations (sine conditions), astigmatisms and distortions in the variable magnification optical system 1H of the eighth example under the above lens arrangement and construction are shown in FIG. 31.

Ninth Example

Figure 15:
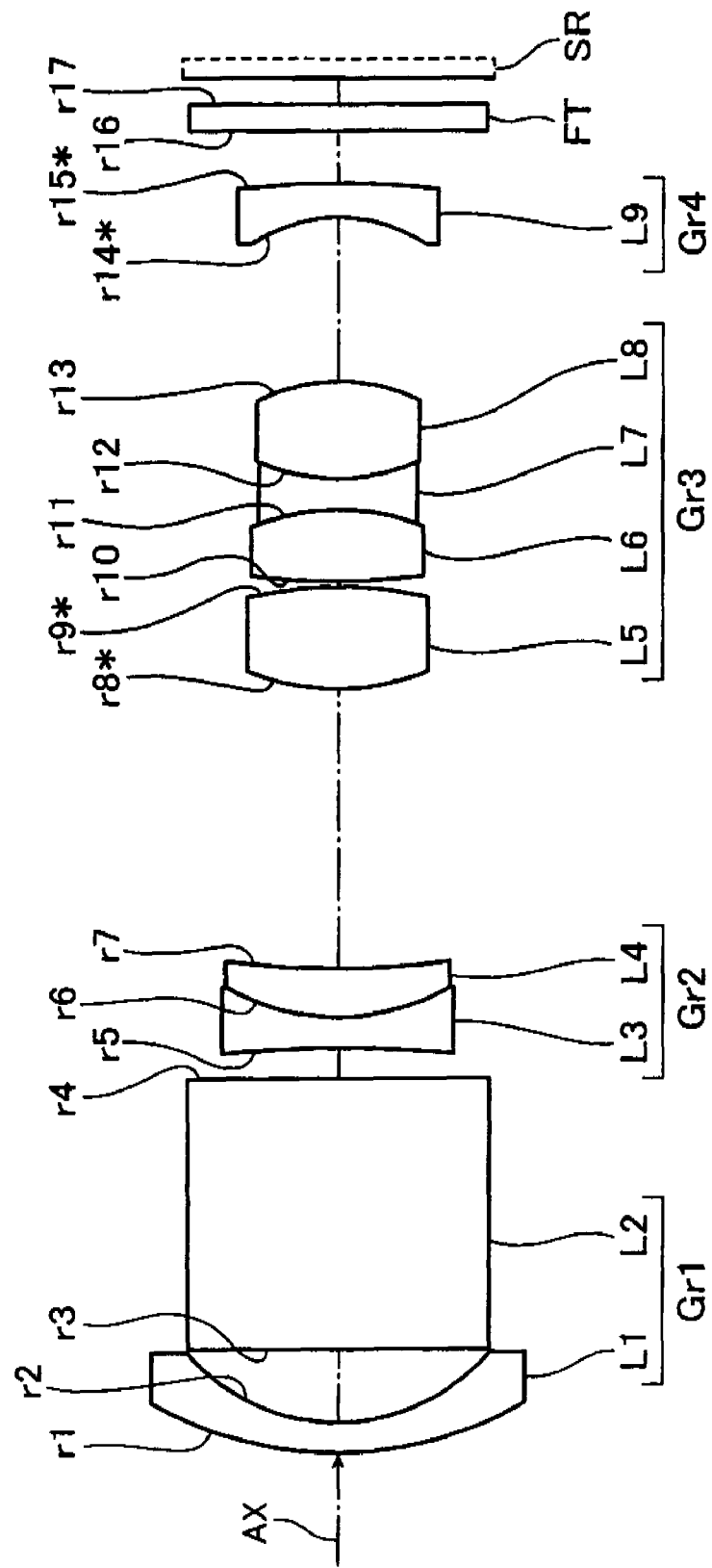
FIG. 15 is a section showing an arrangement of lens groups in a variable magnification optical system in a ninth example.

FIG. 15 is a section showing an arrangement of lens groups in a variable magnification optical system in a ninth example. FIG. 32 are aberration diagrams of the variable magnification optical system in the ninth example.

The variable magnification optical system 1I of the ninth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 15. At the time of zooming (magnification variation), the first lens group (Gr1) is fixed, the second lens group (Gr2) is moved, the third lens group (Gr3) and the fourth lens group (Gr4) are so moved as to increase a distance between them, and the optical diaphragm ST is moved together with the third lens group (Gr3) as shown in FIG. 6.

More specifically, in the variable magnification optical system 1I of the ninth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1I of this ninth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3) and the optical diaphragm ST is moved together with the third lens group (Gr3) as shown in FIG. 6. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1I of the ninth example are shown below.

Numerical Example 9

| Unit: mm | | | | |
|---|---|---|---|---|
| Surface data | | | | |
| Surface Number | r | d | nd | vd |
| Object Plane | ∞ | ∞ | | |
| 1 | 7.395 | 0.600 | 1.94595 | 17.98 |
| 2 | 3.902 | 1.467 | | |
| 3 | ∞ | 5.256 | 1.84666 | 23.78 |
| 4 | ∞ | Variable | | |
| 5 | −23.542 | 0.600 | 1.77250 | 49.65 |
| 6 | 4.404 | 0.954 | 1.92286 | 20.88 |
| 7 | 16.808 | Variable | | |
| 8* (Diaphragm) | 4.542 | 2.019 | 1.58311 | 59.46 |
| 9* | −6.814 | 0.100 | | |
| 10 | 13.804 | 1.379 | 1.48749 | 70.45 |
| 11 | −4.533 | 0.600 | 1.83400 | 37.35 |
| 12 | 3.841 | 1.886 | 1.49700 | 81.61 |
| 13 | −3.648 | Variable | | |
| 14* | −2.866 | 0.663 | 1.53048 | 55.72 |
| 15* | −16.761 | Variable | | |
| 16 | ∞ | 0.500 | 1.51680 | 64.20 |
| 17 | ∞ | 0.500 | | |
| Image Plane | ∞ | | | |

-continued

| Unit: mm |
|---|
| Aspherical Surface Data |

Eighth Surface

K = 0.0000e+000, A4 = −7.3532e−004, A6 = −9.2831e−004,
A8 = 6.6891e−004, A10 = −2.3898e−004, A12 = 4.3303e−005,
A14 = −3.1119e−006

Ninth Surface

K = 0.0000e+000, A4 = 3.3520e−003, A6 = −9.9724e−004,
A8 = 8.2758e−004, A10 = −3.3539e−004, A12 = 6.8770e−005,
A14 = −5.5550e−006

Fourteenth Surface

K = 0.0000e+000, A4 = 5.7776e−003, A6 = 4.6291e−004,
A8 = 3.4948e−005, A10 = −3.6599e−005,
A12 = 9.5771e−006, A14 = 3.6981e−007

Fifteenth Surface

K = 0.0000e+000, A4 = 8.7199e−004, A6 = 7.9339e−005,
A8 = −3.1943e−005, A10 = 3.9834e−006,
A12 = −1.7621e−006, A14 = 5.1061e−007

| | Wide-Angle End | Middle Point | Telephoto End |
|---|---|---|---|
| Variable Distance | | | |
| Between 4$^{th}$ and 5$^{th}$ Surfaces | 0.600 | 1.417 | 0.600 |
| Between 7$^{th}$ and 8$^{th}$ Surfaces | 5.471 | 2.405 | 0.500 |
| Between 13$^{th}$ and 14$^{th}$ Surfaces | 3.186 | 3.342 | 4.435 |
| Between 15$^{th}$ and 16$^{th}$ Surfaces | 1.019 | 3.113 | 4.741 |
| Various Data | | | |
| Zoom Data | | | |
| Zoom Ratio ft/fw: 2.75 | | | |
| Focal Length | 3.805 | 6.317 | 10.460 |
| F-Number | 2.874 | 3.931 | 5.163 |
| Angle of View | 39.171 | 26.140 | 16.508 |
| Image Height | 3.100 | 3.100 | 3.100 |
| Entire Lens Length | 26.630 | 26.630 | 26.630 |
| BF | 1.849 | 3.942 | 5.571 |

| Zoom Lens Group Data | | | |
|---|---|---|---|
| Group | Start Surface | End Surface | Focal Length |
| 1 | 1 | 4 | −9.528 |
| 2 | 5 | 7 | −18.601 |
| 3 | 8 | 13 | 5.381 |
| 4 | 14 | 15 | −6.626 |

Longitudinal spherical aberrations (sine conditions), astigmatisms and distortions in the variable magnification optical system 1I of the ninth example under the above lens arrangement and construction are shown in FIG. 32.

Tenth Example

Figure 16:
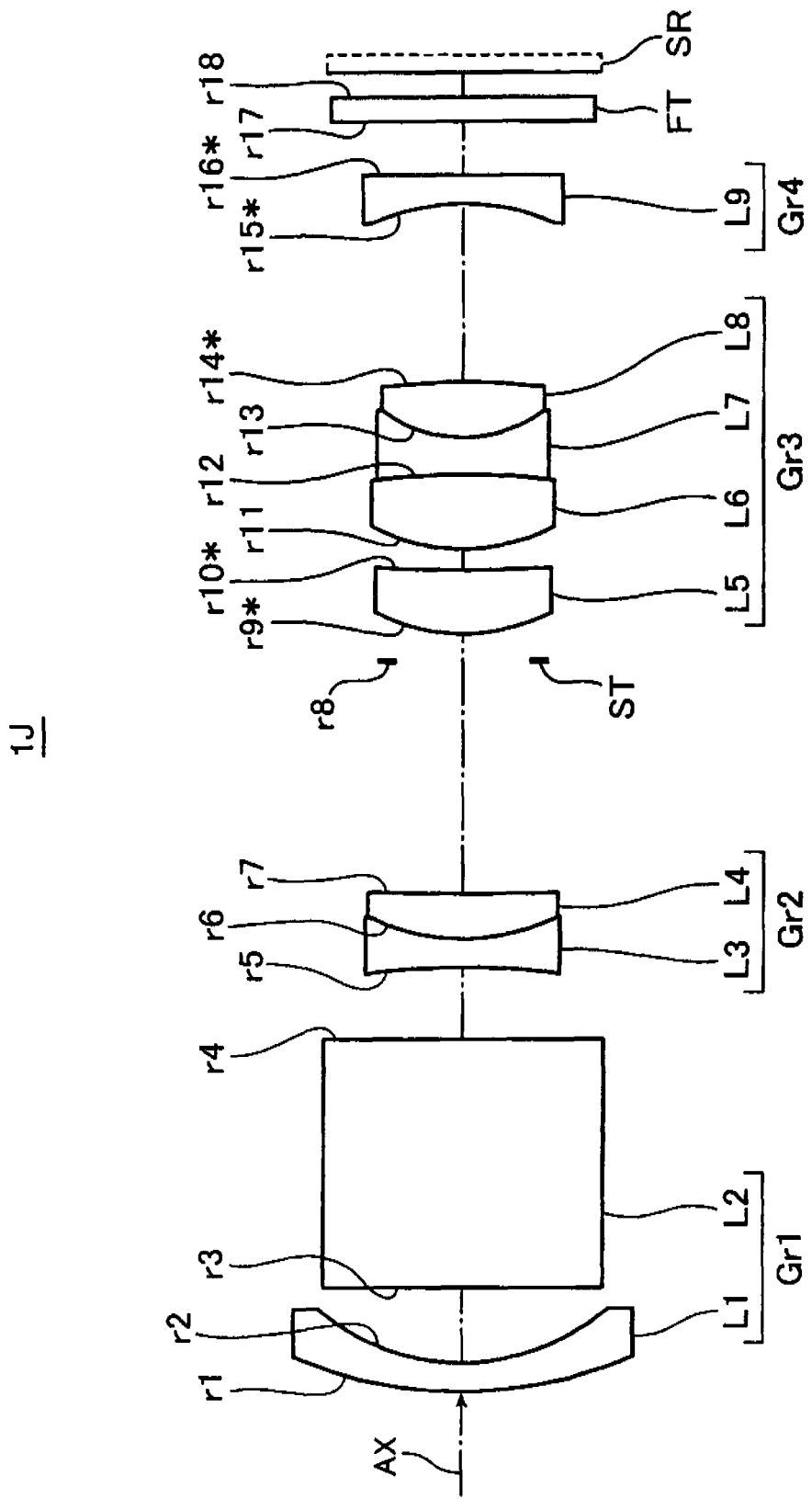
FIG. 16 is a section showing an arrangement of lens groups in the variable magnification optical system in a tenth example.
Figure 17:
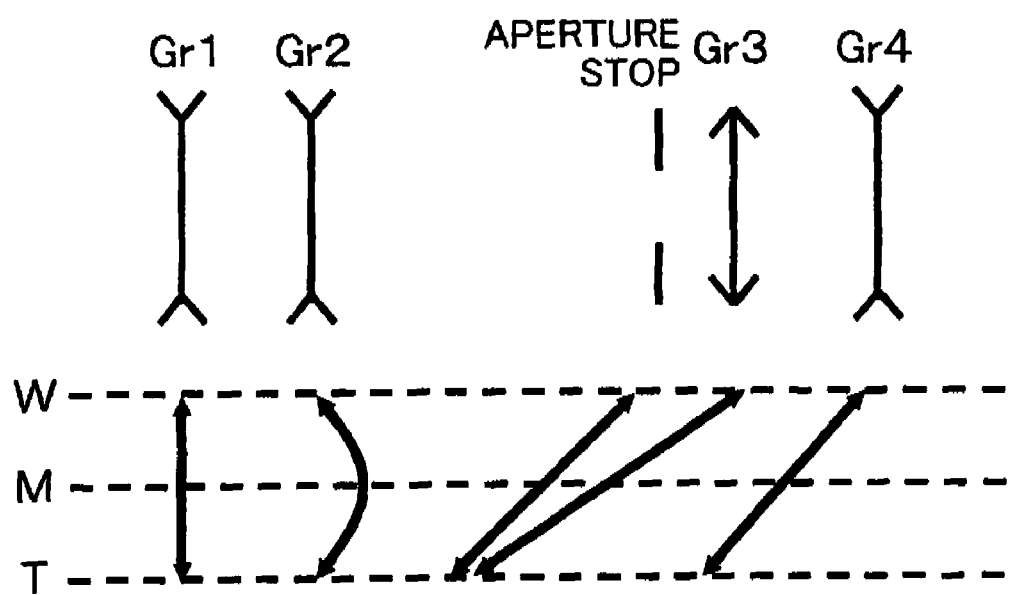
FIG. 17 is a diagram showing moving states of the respective lens groups during the zooming of the variable magnification optical system of the tenth example.

FIG. 16 is a section showing an arrangement of lens groups in a variable magnification optical system in a tenth example. FIG. 17 is a diagram showing moving states of the respective lens groups during the zooming of the variable magnification optical system of the tenth example. FIG. 33 are aberration diagrams of the variable magnification optical system in the tenth example.

The variable magnification optical system 1J of the tenth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 16. At the time of zooming (magnification variation), the first lens group (Gr1) is fixed, the second lens group (Gr2) is moved, the optical diaphragm ST is moved and the third lens group (Gr3) and the fourth lens group (Gr4) are so moved as to increase a distance between them as shown in FIG. 17.

More specifically, in the variable magnification optical system 1J of the tenth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a positive meniscus lens (fifth lens L5) convex toward the object side, a biconvex positive lens (sixth lens L6), a biconcave negative lens (seventh lens L7) and a biconvex positive lens (eighth lens L8). The optical diaphragm ST is arranged at the object side of the fifth lens L5 and independently moved. The optical diaphragm ST may be a mechanical shutter. Both surfaces of the fifth lens L5 are aspherical surfaces. The sixth to eighth lenses L6, L7 and L8 form a cemented lens. An image-side surface (one surface) of the eighth lens L8 is an aspherical surface.

The fourth lens group (Gr4) is composed of a biconcave negative lens (ninth lens L9). The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1J of this tenth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the optical diaphragm ST is substantially linearly moved in a direction toward the object at a moderate rate as compared with a movement amount of the third lens group (Gr3), the third lens group (Gr3) is substantially linearly moved in the direction toward the object and the fourth lens group (Gr4) is substantially linearly moved in the direction toward the object at a moderate rate as compared with the movement amount of the third lens group (Gr3) as shown in FIG. 17. In this way, during the zooming from the wide-angle end (WIDE) to the telephoto end (TELE), the second to fourth lens groups (Gr2, Gr3, Gr4) and the optical diaphragm ST are so moved as to reduce distances between the first lens group (Gr1) and the optical diaphragm ST and between the third lens group (Gr3) and the fourth lens group (Gr4).

Construction data of the respective lenses in the variable magnification optical system 1J of the tenth example are shown below.

Numerical Example 10

| Unit: mm | | | | |
|---|---|---|---|---|
| Surface data | | | | |
| Surface Number | r | d | nd | vd |
| Object Plane | ∞ | ∞ | | |
| 1 | 9.649 | 0.600 | 1.94595 | 17.98 |
| 2 | 4.964 | 1.591 | | |
| 3 | ∞ | 5.177 | 1.84666 | 23.78 |
| 4 | ∞ | Variable | | |
| 5 | −16.407 | 0.600 | 1.80610 | 40.73 |
| 6 | 4.812 | 0.940 | 1.92286 | 20.88 |
| 7 | 93.567 | Variable | | |
| 8 (Diaphragm) | ∞ | Variable | | |
| 9* | 4.108 | 1.357 | 1.49700 | 81.36 |
| 10* | 32.658 | 0.436 | | |
| 11 | 4.393 | 1.555 | 1.56883 | 56.04 |
| 12 | −16.498 | 0.767 | 1.90366 | 31.31 |
| 13 | 3.029 | 1.152 | 1.58313 | 59.46 |
| 14* | −10.065 | Variable | | |
| 15* | −5.006 | 0.600 | 1.53048 | 55.72 |
| 16* | 317.282 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −1.2757e−003, A6 = 3.7837e−004,
A8 = −2.6104e−004, A10 = 4.8339e−005, A12 = 9.9700e−007,
A14 = −1.2330e−006
Tenth Surface K = 0.0000e+000, A4 = −1.4507e−004, A6 = 5.7765e−004,
A8 = −4.8633e−004, A10 = 1.4399e−004, A12 = −2.0475e−005,
A14 = 6.6314e−007
Fourteenth Surface K = 0.0000e+000, A4 = 4.4975e−003, A6 = 2.5486e−005,
A8 = 2.8987e−004, A10 = −9.1099e−005,
A12 = 1.8387e−005, A14 = −6.8066e−007
Fifteenth Surface K = 0.0000e+000, A4 = 1.6271e−004, A6 = −7.8239e−005,
A8 = −2.3702e−004, A10 = 1.0493e−004, A12 = −9.7374e−006,
A14 = 4.1925e−008
Sixteenth Surface K = 0.0000e+000, A4 = −6.7212e−004, A6 = 9.6635e−006,
A8 = −1.9218e−004, A10 = 9.0403e−005, A12 = −1.4616e−005,
A14 = 9.5536e−007

| | Wide-Angle End | Middle Point | Telephoto End |
|---|---|---|---|
| Variable Distance | | | |
| Between 4th and 5th Surfaces | 1.524 | 2.013 | 0.724 |
| Between 7th and 8th Surfaces | 4.847 | 2.073 | 0.500 |
| Between 8th and 9th Surfaces | 0.574 | 0.366 | 0.100 |
| Between 14th and 15th Surfaces | 3.693 | 3.087 | 3.722 |
| Between 16th and 17th Surfaces | 1.088 | 4.186 | 6.678 |
| Various Data | | | |
| Zoom Data | | | |
| Zoom Ratio ft/fw: 2.75 | | | |
| Focal Length | 4.619 | 7.670 | 12.676 |
| F-Number | 3.500 | 4.961 | 6.794 |

-continued

| Unit: mm | | | |
|---|---|---|---|
| Angle of View | 32.563 | 21.036 | 13.101 |
| Image Height | 2.950 | 2.950 | 2.950 |
| Entire Lens Length | 27.331 | 27.334 | 27.313 |
| BF | 1.918 | 5.019 | 7.491 |

Zoom Lens Group Data

| Group | Start Surface | End Surface | Focal Length |
|---|---|---|---|
| 1 | 1 | 4 | −11.528 |
| 2 | 5 | 7 | −28.889 |
| 3 | 9 | 14 | 5.828 |
| 4 | 15 | 16 | −9.285 |

Longitudinal spherical aberrations (sine conditions), astigmatisms and distortions in the variable magnification optical system 1J of the tenth example under the above lens arrangement and construction are shown in FIG. 33.

Eleventh Example

Figure 18:
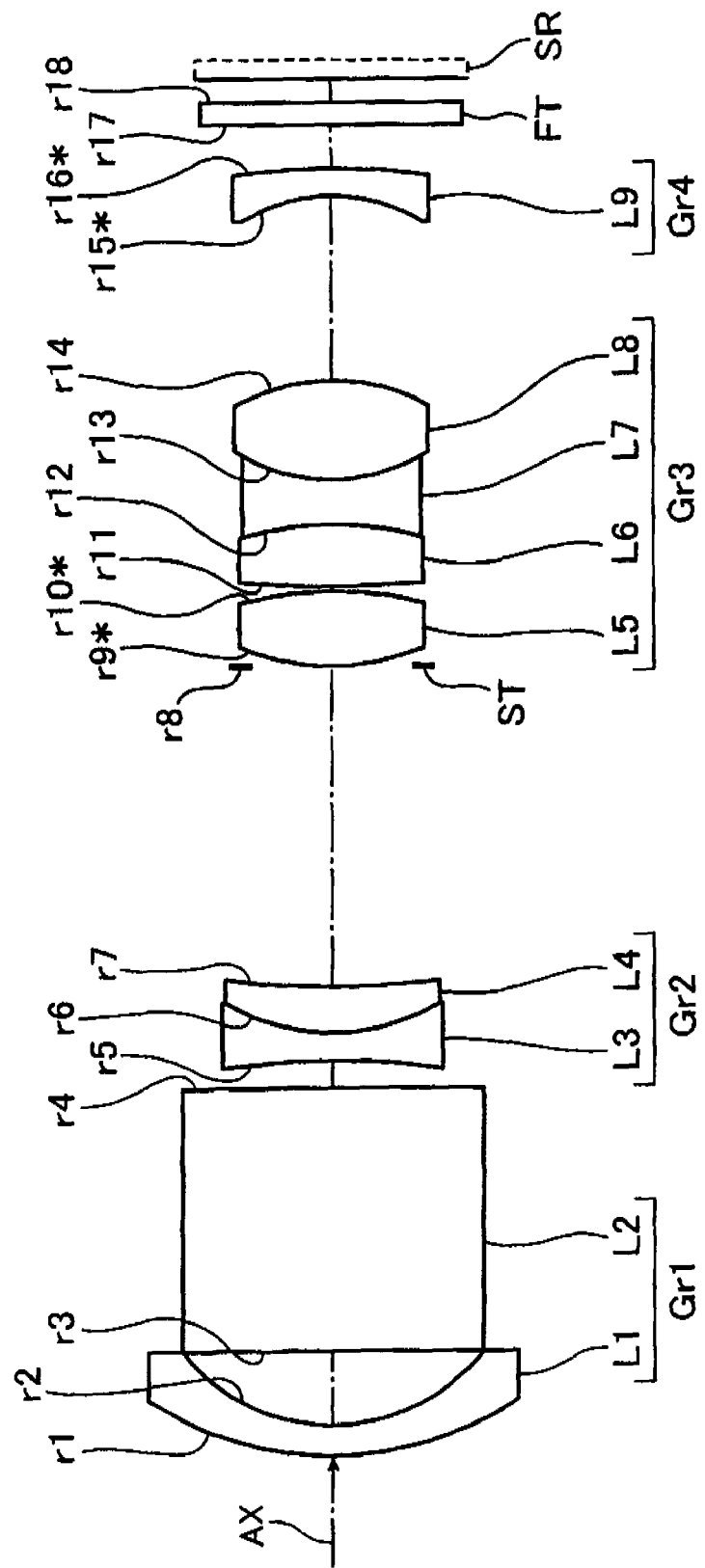
FIG. 18 is a section showing an arrangement of lens groups in a variable magnification optical system in an eleventh example.

FIG. 18 is a section showing an arrangement of lens groups in a variable magnification optical system in an eleventh example. FIG. 34 are aberration diagrams of the variable magnification optical system in the eleventh example.

The variable magnification optical system 1K of the eleventh example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 18. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1K of the eleventh example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens.

The fourth lens group (Gr4) is composed of a negative meniscus lens (ninth lens L9) convex toward the image side.

The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1K of this eleventh example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1K of the eleventh example are shown below.

Numerical Example 11

| Unit: mm | | | | |
|---|---|---|---|---|
| Surface data | | | | |
| Surface Number | r | d | nd | vd |
| Object Plane | ∞ | ∞ | | |
| 1 | 7.471 | 0.670 | 1.94595 | 17.98 |
| 2 | 4.268 | 1.613 | | |
| 3 | ∞ | 5.761 | 1.84666 | 23.78 |
| 4 | ∞ | Variable | | |
| 5 | −17.119 | 0.600 | 1.77250 | 49.65 |
| 6 | 4.703 | 0.993 | 1.92286 | 20.88 |
| 7 | 18.795 | Variable | | |
| 8 (Diaphragm) | ∞ | 0.000 | | |
| 9* | 4.930 | 1.631 | 1.58311 | 59.46 |
| 10* | −7.700 | 0.100 | | |
| 11 | 23.452 | 1.328 | 1.49700 | 81.61 |
| 12 | −7.613 | 0.992 | 1.83400 | 37.35 |
| 13 | 3.941 | 2.155 | 1.49700 | 81.61 |
| 14 | −4.634 | Variable | | |
| 15* | −3.654 | 0.600 | 1.53048 | 55.72 |
| 16* | −15.902 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −2.3753e−004, A6 = −1.7313e−003,
A8 = 1.1402e−003, A10 = −3.9249e−004, A12 = 6.7619e−005,
A14 = −4.6683e−006

-continued

Unit: mm

Tenth Surface

K = 0.0000e+000, A4 = 2.9277e−003, A6 = −1.8481e−003,
A8 = 1.2048e−003, A10 = −4.0835e−004, A12 = 6.8793e−005,
A14 = −4.6242e−006

Fifteenth Surface

K = 0.0000e+000, A4 = 2.5542e−003, A6 = 3.5971e−004,
A8 = −2.1384e−004, A10 = 8.3478e−005, A12 = −1.3025e−005,
A14 = 3.6981e−007

Sixteenth Surface

K = 0.0000e+000, A4 = 1.0286e−004, A6 = 1.4591e−004,
A8 = −8.2314e−005, A10 = 1.3598e−005, A12 = 1.6052e−006,
A14 = −4.5345e−007

|  | Wide-Angle End | Middle Point | Telephoto End |
|---|---|---|---|
| Variable Distance | | | |
| Between 4th and 5th Surfaces | 0.600 | 1.496 | 0.600 |
| Between 7th and 8th Surfaces | 7.039 | 3.663 | 1.500 |
| Between 14th and 15th Surfaces | 3.968 | 3.949 | 5.166 |
| Between 16th and 17th Surfaces | 0.951 | 3.450 | 5.291 |
| Various Data | | | |
| Zoom Data | | | |
| Zoom Ratio ft/fw: 2.74 | | | |
| Focal Length | 3.819 | 6.338 | 10.477 |
| F-Number | 2.880 | 3.924 | 5.133 |
| Angle of View | 37.682 | 24.960 | 15.725 |
| Image Height | 2.950 | 2.950 | 2.950 |
| Entire Lens Length | 29.833 | 29.833 | 29.816 |
| BF | 1.784 | 4.283 | 6.107 |

| Zoom Lens Group Data | | | |
|---|---|---|---|
| Group | Start Surface | End Surface | Focal Length |
| 1 | 1 | 4 | −11.717 |
| 2 | 5 | 7 | −15.914 |
| 3 | 8 | 14 | 5.999 |
| 4 | 15 | 16 | −9.097 |

Longitudinal spherical aberrations (sine conditions), astigmatisms and distortions in the variable magnification optical system 1K of the eleventh example under the above lens arrangement and construction are shown in FIG. 34.

Twelfth Example

Figure 19:
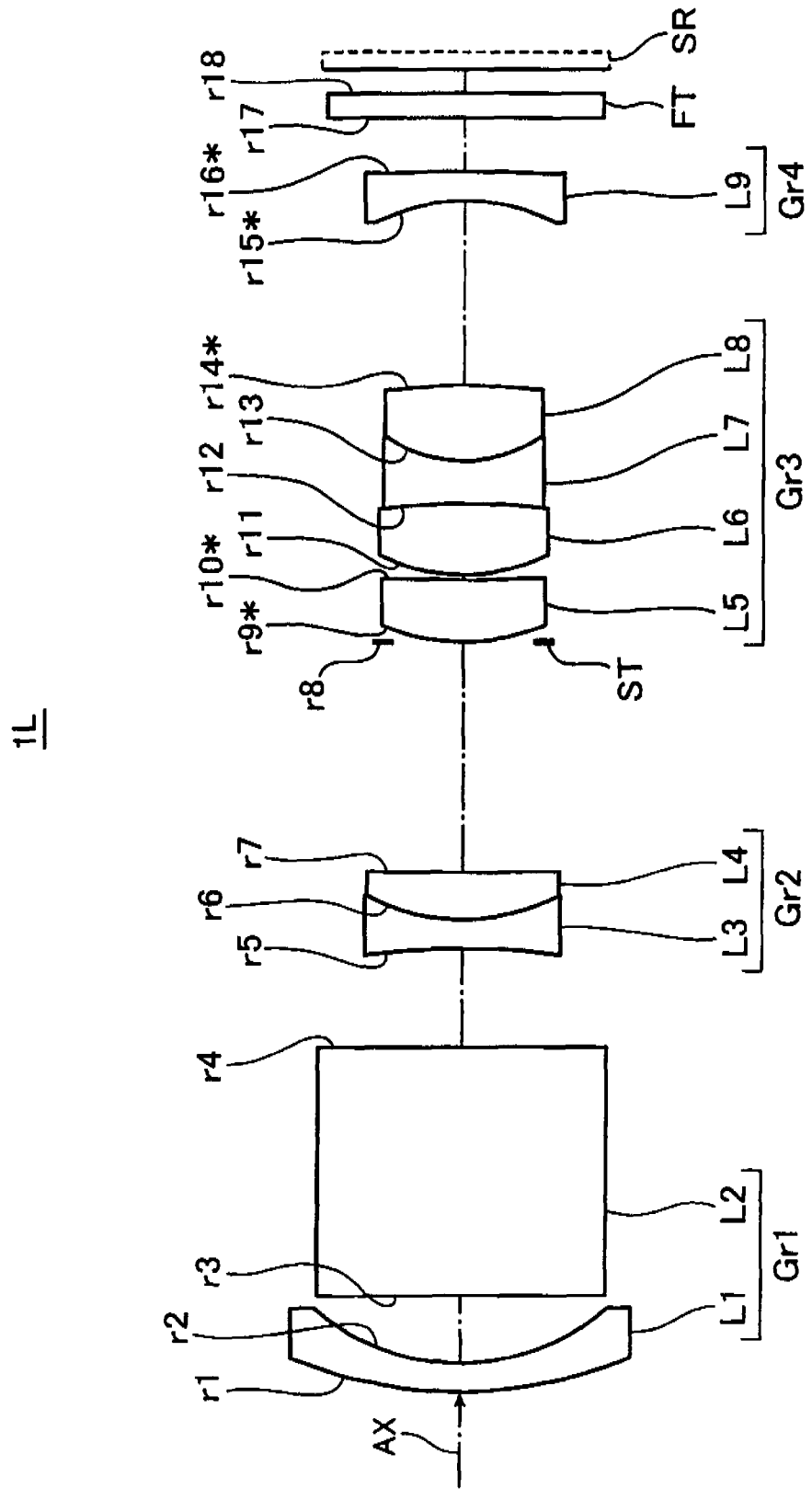
FIG. 19 is a section showing an arrangement of lens groups in the variable magnification optical system in a twelfth example.

FIG. 19 is a section showing an arrangement of lens groups in a variable magnification optical system in a twelfth example. FIG. 35 are aberration diagrams of the variable magnification optical system in the twelfth example.

The variable magnification optical system 1L of the twelfth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 19. At the time of zooming (magnification variation), the first lens group (Gr1) is fixed, the second lens group (Gr2) is moved, the third lens group (Gr3) and the fourth lens group (Gr4) are so moved as to keep a distance between them substantially constant or increase this distance, and the optical diaphragm ST is moved together with the third lens group (Gr3) as shown in FIG. 9.

More specifically, in the variable magnification optical system 1L of the twelfth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a positive meniscus lens (fifth lens L5) convex toward the object side, a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens. An image-side surface (one surface) of the eighth lens L8 is an aspherical surface.

The fourth lens group (Gr4) is composed of a negative meniscus lens (ninth lens L9) convex toward the image side. The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1L of this twelfth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved substantially up to the middle point in the direction toward the object and then moved up to the telephoto end at a considerably moderate rate as compared with a movement amount of the third lens group (Gr3) and the optical diaphragm ST is moved together with the third lens group (Gr3) as shown in FIG. 9. In this way, during the zooming from the wide-angle end (WIDE) to the telephoto end (TELE), the second to fourth lens groups (Gr2, Gr3, Gr4) are moved, the first lens group (Gr1) and the third lens group (Gr3) are so relatively moved as to reduce a distance between them, and the first lens group (Gr1) and the fourth lens group (Gr4) are so relatively moved as to reduce a distance between them substantially up to the middle point and then keep this distance substantially constant or slightly increase it up to the telephoto end.

Construction data of the respective lenses in the variable magnification optical system 1L of the twelfth example are shown below.

Numerical Example 12

| Unit: mm | | | | |
|---|---|---|---|---|
| Surface data | | | | |
| Surface Number | r | d | nd | vd |
| Object Plane | ∞ | ∞ | | |
| 1 | 9.709 | 0.600 | 1.94595 | 17.98 |
| 2 | 5.023 | 1.400 | | |
| 3 | ∞ | 5.216 | 1.84666 | 23.78 |
| 4 | ∞ | Variable | | |
| 5 | −16.691 | 0.600 | 1.80610 | 40.73 |
| 6 | 4.653 | 0.977 | 1.92286 | 20.88 |
| 7 | 110.009 | Variable | | |
| 8 (Diaphragm) | ∞ | 0.000 | | |
| 9* | 4.562 | 1.290 | 1.49700 | 81.36 |
| 10* | 51.813 | 0.100 | | |
| 11 | 4.167 | 1.497 | 1.56883 | 56.04 |
| 12 | −15.599 | 0.894 | 1.90366 | 31.31 |
| 13 | 3.000 | 1.573 | 1.58313 | 59.46 |
| 14* | −10.321 | Variable | | |
| 15* | −4.290 | 0.600 | 1.53048 | 55.72 |
| 16* | −41.325 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −7.8223e−004, A6 = 3.9597e−004, A8 = −2.5020e−004, A10 = 3.5524e−005, A12 = 6.0437e−006, A14 = −1.8615e−006

Tenth Surface

K = 0.0000e+000, A4 = 1.3061e−004, A6 = 5.5237e−004, A8 = −4.9345e−004, A10 = 1.6429e−004, A12 = −2.9066e−005, A14 = 1.8773e−006

Fourteenth Surface

K = 0.0000e+000, A4 = 3.9014e−003, A6 = −3.8298e−006, A8 = 2.8963e−004, A10 = −8.1309e−005, A12 = 1.3710e−005, A14 = −6.8066e−007

Fifteenth Surface

K = 0.0000e+000, A4 = 7.8516e−004, A6 = 6.5290e−004, A8 = −5.9548e−004, A10 = 2.4475e−004, A12 = −2.9396e−005, A14 = 4.1924e−008

Sixteenth Surface

K = 0.0000e+000, A4 = 2.0884e−004, A6 = 4.6350e−004, A8 = −3.4046e−004, A10 = 9.9118e−005, A12 = −4.1401e−006, A14 = −7.6327e−007

| | Wide-Angle End | Middle Point | Telephoto End |
|---|---|---|---|
| Variable Distance | | | |
| Between 4$^{th}$ and 5$^{th}$ Surfaces | 2.035 | 2.165 | 0.600 |
| Between 7$^{th}$ and 8$^{th}$ Surfaces | 4.817 | 2.138 | 0.500 |
| Between 14$^{th}$ and 15$^{th}$ Surfaces | 3.785 | 3.120 | 3.682 |
| Between 16$^{th}$ and 17$^{th}$ Surfaces | 1.115 | 4.328 | 6.969 |
| Various Data | | | |
| Zoom Data | | | |
| Zoom Ratio ft/fw: 2.74 | | | |
| Focal Length | 4.929 | 8.186 | 13.525 |
| F-Number | 3.500 | 4.943 | 6.670 |
| Angle of View | 30.903 | 19.818 | 12.304 |
| Image Height | 2.950 | 2.950 | 2.950 |
| Entire Lens Length | 27.332 | 27.337 | 27.315 |
| BF | 1.946 | 5.165 | 7.784 |

| Zoom Lens Group Data | | | |
|---|---|---|---|
| Group | Start Surface | End Surface | Focal Length |
| 1 | 1 | 4 | −11.731 |
| 2 | 5 | 7 | −31.828 |
| 3 | 8 | 14 | 5.874 |
| 4 | 15 | 16 | −9.075 |

Longitudinal spherical aberrations (sine conditions), astigmatisms and distortions in the variable magnification optical system 1L of the twelfth example under the above lens arrangement and construction are shown in FIG. 35.

Thirteenth Example

Figure 20:
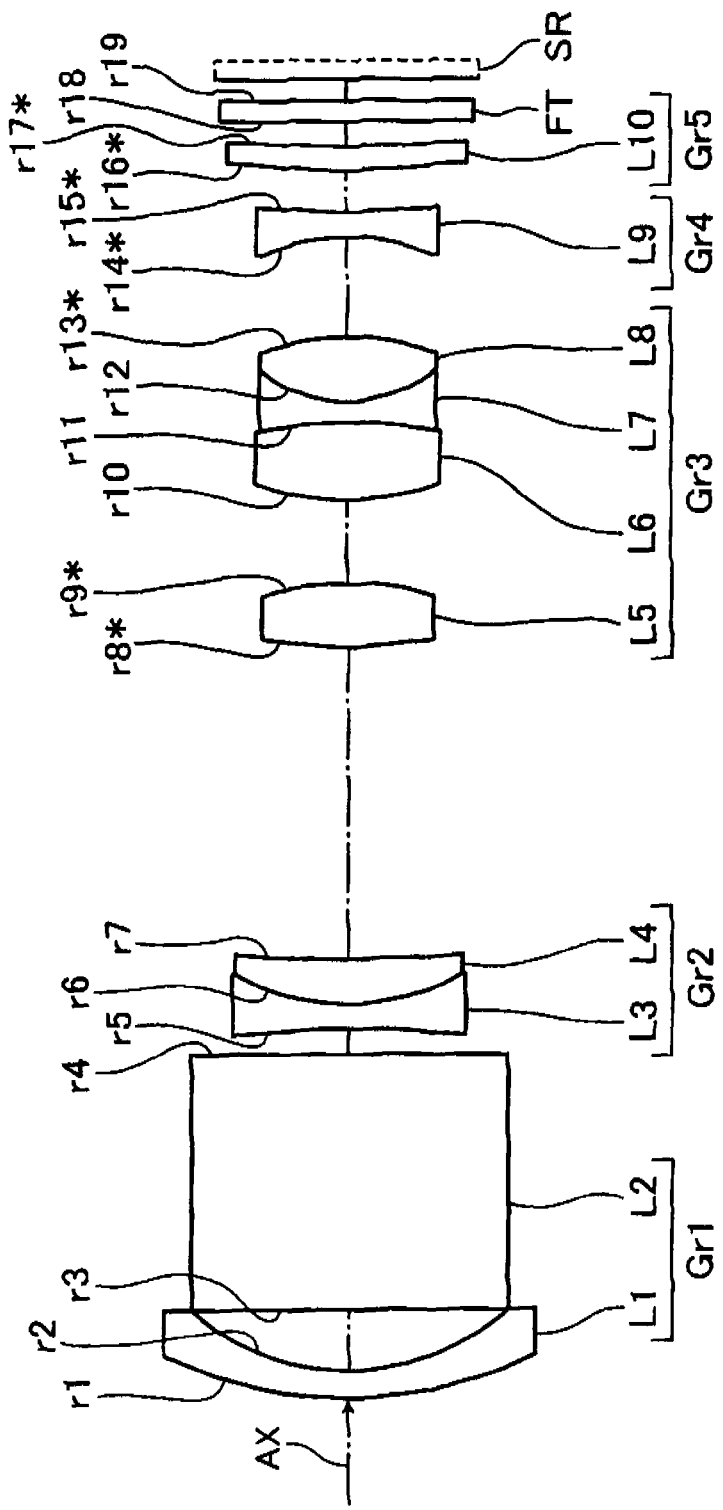
FIG. 20 is a section showing an arrangement of lens groups in a variable magnification optical system in a thirteenth example.
Figure 21:
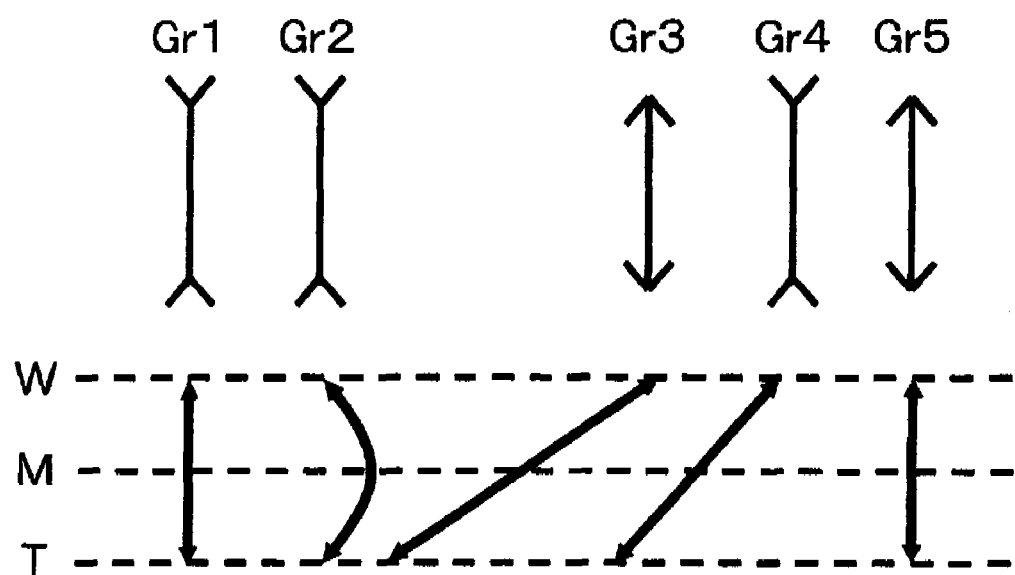
FIG. 21 is a diagram showing moving states of the respective lens groups during the zooming of the variable magnification optical system of the thirteenth example.
Figure 36A:
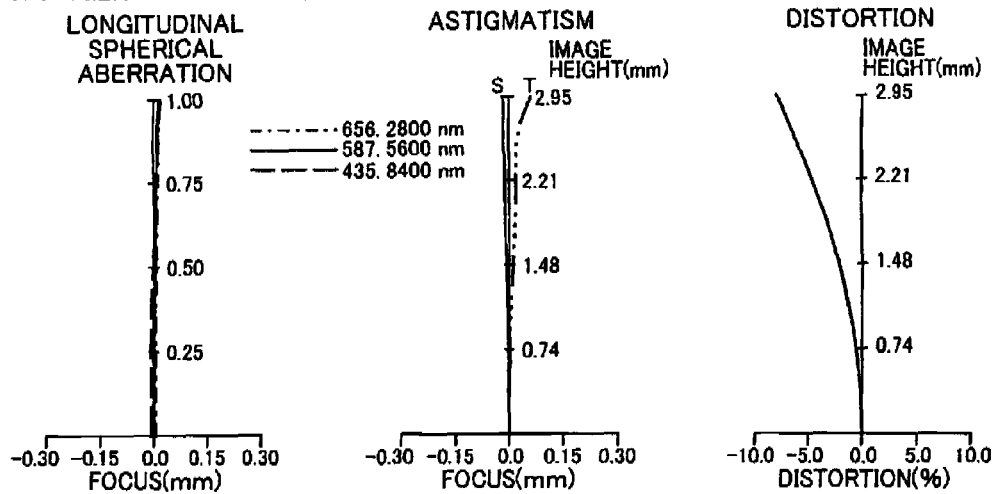
Figure 36B:
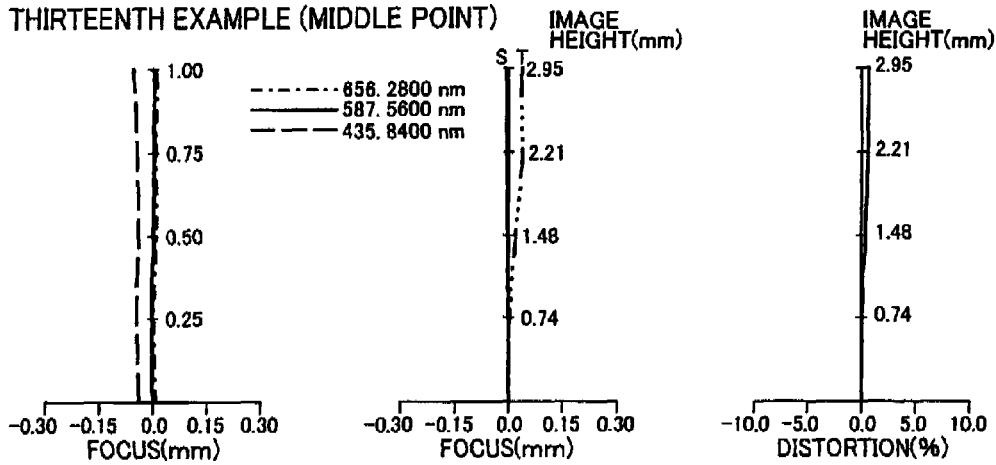
Figure 36C:
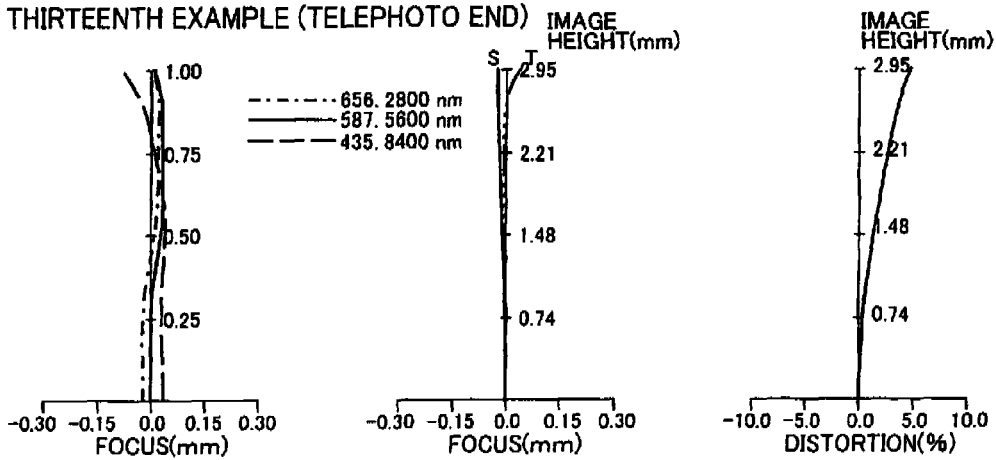

FIG. 20 is a section showing an arrangement of lens groups in a variable magnification optical system in a thirteenth example. FIG. 21 is a diagram showing moving states of the respective lens groups during the zooming of the variable magnification optical system of the thirteenth example. FIG. 36 are aberration diagrams of the variable magnification optical system in the thirteenth example.

The variable magnification optical system 1M of the thirteenth example has a five-component zooming construction of negative-negative-positive-negative-positive arrangement composed of a first lens group (Gr1) having a negative optical power as a whole, a second lens group (Gr2) having a negative optical power as a whole, a third lens group (Gr3) having a positive optical power as a whole and including an optical diaphragm ST, a fourth lens group (Gr4) having a negative optical power as a whole and a fifth lens group (Gr5) having a positive optical power as a whole with the respective lens groups (Gr1, Gr2, Gr3, Gr4, Gr5) successively arranged from an object side to an image side as shown in FIG. 20. At the time of zooming (magnification variation), the first lens group (Gr1) is fixed, the second lens group (Gr2) is moved, the third lens group (Gr3) and the fourth lens group (Gr4) are so moved as to increase a distance between them, and the fifth lens group (Gr5) is fixed as shown in FIG. 21.

More specifically, in the variable magnification optical system 1M of the thirteenth example, the respective lens groups (Gr1, Gr2, Gr3, Gr4, Gr5) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of a biconvex positive lens (fifth lens L5), the optical diaphragm ST (not shown), a biconvex positive lens (sixth lens L6), a biconvex negative lens (seventh lens L7) and a biconvex positive lens (eighth lens L8). Both surfaces of the fifth lens L5 are aspherical surface. The optical diaphragm ST is arranged on the image-side lens surface of the fifth lens L5 and moved together with the third lens group (Gr3). The sixth to eighth lenses L6, L7, L8 form a cemented lens. An image-side surface (one surface) of the eighth lens L8 is an aspherical surface.

The fourth lens group (Gr4) is composed of a biconcave negative lens (ninth lens L9). The ninth lens L9 is a lens, which is made of a resin material and both surfaces of which are aspherical surfaces.

The fifth lens group (Gr5) is composed of a positive meniscus lens (tenth lens L10) convex toward the object side. The tenth lens L10 is a lens, which is made of a resin material and both surfaces of which are aspherical surfaces.

A light receiving surface of an image pickup element SR is arranged at the image side of the fifth lens group (Gr5) via a parallel plate FT as a filter. The parallel plate FT includes various optical filters and a cover glass of the image pickup element.

In the variable magnification optical system 1M of this thirteenth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object, the fourth lens group (Gr4) is substantially linearly moved in the direction toward the object at a moderate rate as compared with a movement amount of the third lens group (Gr3), the fifth lens group (Gr5) is fixed and the optical diaphragm ST is moved together with the third lens group (Gr3) as shown in FIG. 21. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1M of the thirteenth example are shown below.

Numerical Example 13

| Unit: mm | | | | |
|---|---|---|---|---|
| Surface data | | | | |
| Surface Number | r | d | nd | vd |
| Object Plane | ∞ | ∞ | | |
| 1 | 9.820 | 0.656 | 1.94595 | 17.98 |
| 2 | 5.430 | 1.508 | | |
| 3 | ∞ | 6.070 | 1.84666 | 23.78 |
| 4 | ∞ | Variable | | |
| 5 | −23.740 | 0.600 | 1.80610 | 40.73 |
| 6 | 5.383 | 1.077 | 1.92286 | 20.88 |
| 7 | 33.539 | Variable | | |
| 8* | 7.393 | 1.533 | 1.49700 | 81.36 |
| 9* (Diaphragm) | −9.298 | 2.005 | | |
| 10 | 6.078 | 1.855 | 1.49700 | 81.61 |
| 11 | −11.756 | 0.499 | 1.83400 | 37.34 |
| 12 | 3.246 | 1.510 | 1.58913 | 61.25 |
| 13* | −5.782 | Variable | | |
| 14* | −5.206 | 0.605 | 1.53048 | 55.72 |
| 15* | 10.958 | Variable | | |
| 16* | 11.911 | 0.584 | 1.63219 | 23.42 |
| 17* | 26.703 | 0.595 | | |
| 18 | ∞ | 0.500 | 1.51680 | 64.20 |
| 19 | ∞ | 0.500 | | |
| Image Plane | ∞ | | | |

| Unit: mm |
|---|
| Aspherical Surface Data |

Eighth Surface

K = 0.0000e+000, A4 = −3.9218e−003, A6 = 9.3476e−006,
A8 = −1.1874e−004, A10 = −7.5621e−006, A12 = 6.6668e−006,
A14 = −9.3014e−007

Ninth Surface

K = 0.0000e+000, A4 = −3.2549e−003, A6 = 2.5446e−004,
A8 = −2.8406e−004, A10 = 6.6524e−005, A12 = −8.4231e−006,
A14 = 3.5031e−007

Thirteenth Surface

K = 0.0000e+000, A4 = 2.3306e−003, A6 = −2.1621e−004,
A8 = −2.1511e−006, A10 = 7.0489e−006, A12 = −2.2819e−006,
A14 = 1.8639e−007

Fourteenth Surface

K = 0.0000e+000, A4 = 1.5789e−003, A6 = −1.0449e−003,
A8 = −2.0428e−004, A10 = 9.5814e−005, A12 = −1.0748e−005,
A14 = 4.2392e−008

Fifteenth Surface

K = 0.0000e+000, A4 = −3.0669e−003, A6 = −2.8863e−004,
A8 = −1.2917e−004, A10 = 2.2730e−005, A12 = 4.7379e−006,
A14 = −9.2321e−007

Sixteenth Surface

K = 0.0000e+000, A4 = −1.3816e−003, A6 = −8.1028e−005,
A8 = −2.4204e−005, A10 = 2.0528e−006

Seventeenth Surface

K = 0.0000e+000, A4 = 7.8893e−004, A6 = −1.3041e−004,
A8 = −3.5725e−005, A10 = 3.2869e−006

| | Wide-Angle End | Middle Point | Telephoto End |
|---|---|---|---|
| Variable Distance | | | |
| Between 4th and 5th Surfaces | 0.600 | 2.556 | 1.588 |
| Between 7th and 8th Surfaces | 7.468 | 2.864 | 0.500 |
| Between 13th and 14th Surfaces | 2.342 | 2.351 | 2.842 |
| Between 15th and 16th Surfaces | 0.993 | 3.632 | 6.474 |
| Various Data | | | |
| Zoom Data | | | |
| Zoom Ratio ft/fw: 2.74 | | | |
| Focal Length | 4.550 | 7.553 | 12.487 |
| F-Number | 2.880 | 3.983 | 5.367 |
| Angle of View | 32.960 | 21.334 | 13.292 |
| Image Height | 2.950 | 2.950 | 2.950 |
| Entire Lens Length | 31.332 | 31.334 | 31.311 |
| BF | 1.428 | 1.429 | 1.407 |

| Zoom Lens Group Data | | | |
|---|---|---|---|
| Group | Start Surface | End Surface | Focal Length |
| 1 | 1 | 4 | −13.843 |
| 2 | 5 | 7 | −24.978 |
| 3 | 8 | 13 | 6.272 |
| 4 | 14 | 15 | −6.568 |
| 5 | 16 | 17 | 33.501 |

Longitudinal spherical aberrations (sine conditions), astigmatisms and distortions in the variable magnification optical system 1M of the thirteenth example under the above lens arrangement and construction are shown in FIG. 36.

Fourteenth Example

Figure 22:
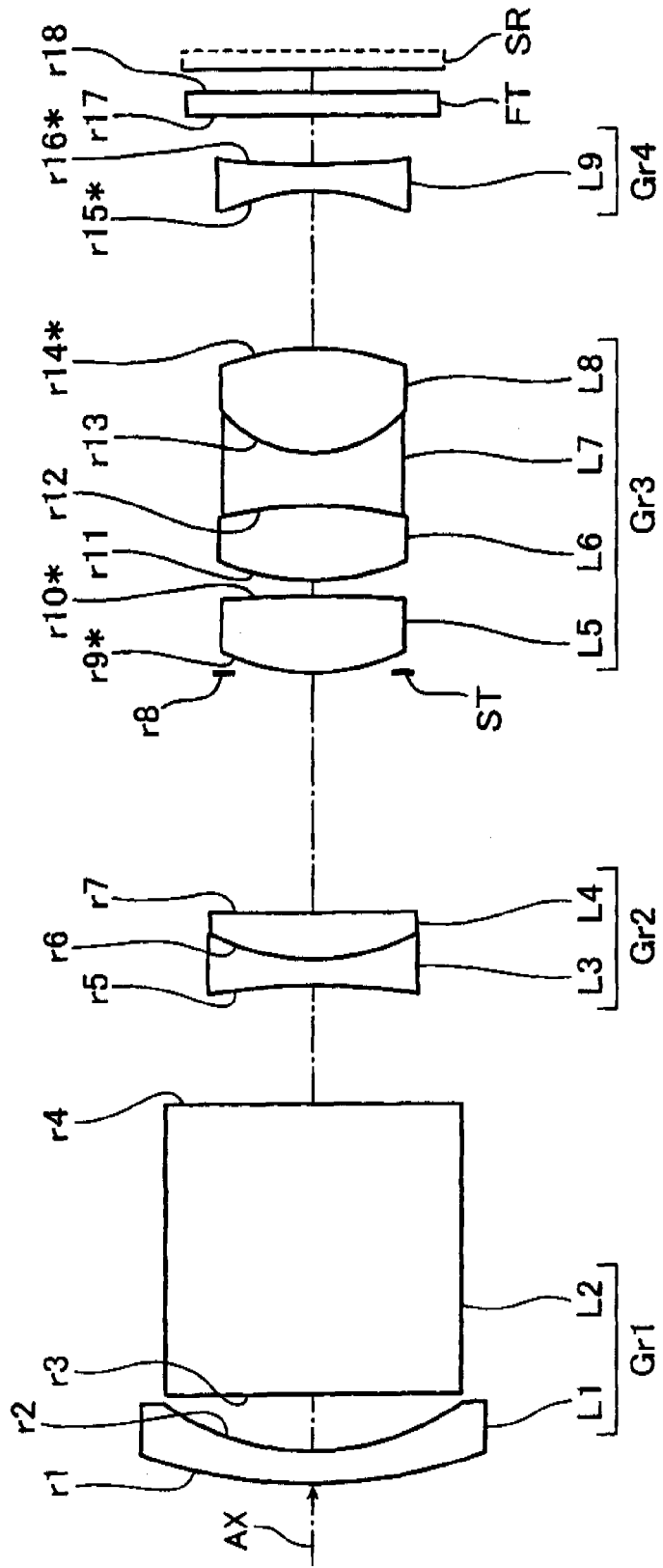
FIG. 22 is a section showing an arrangement of lens groups in a variable magnification optical system in a fourteenth example.
Figure 23:
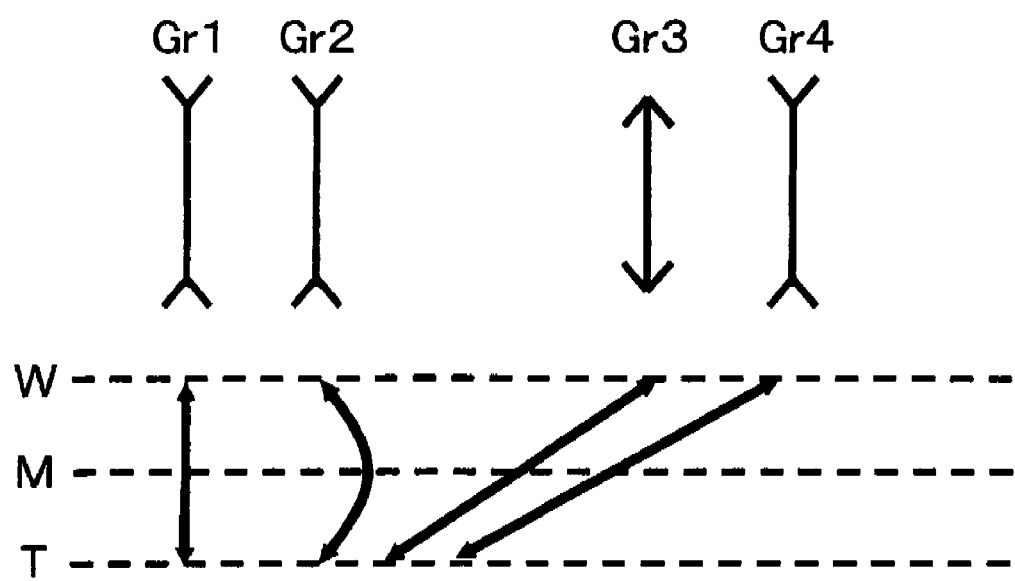
FIG. 23 is a diagram showing moving states of the respective lens groups during the zooming of the variable magnification optical system of the fourteenth example, FIG. 24 are aberration diagrams of the variable magnification optical system in the first example, FIG. 25 are aberration diagrams of the variable magnification optical system in the second example, FIG. 26 are aberration diagrams of the variable magnification optical system in the third example, FIG. 27 are aberration diagrams of the variable magnification optical system in the fourth example, FIG. 28 are aberration diagrams of the variable magnification optical system in the fifth example, FIG. 29 are aberration diagrams of the variable magnification optical system in the sixth example, FIG. 30 are aberration diagrams of the variable magnification optical system in the seventh example, FIG. 31 are aberration diagrams of the variable magnification optical system in the eighth example, FIG. 32 are aberration diagrams of the variable magnification optical system in the ninth example, FIG. 33 are aberration diagrams of the variable magnification optical system in the tenth example, FIG. 34 are aberration diagrams of the variable magnification optical system in the eleventh example, FIG. 35 are aberration diagrams of the variable magnification optical system in the twelfth example, FIG. 36 are aberration diagrams of the variable magnification optical system in the thirteenth example, and FIG. 37 are aberration diagrams of the variable magnification optical system in the fourteenth example.

FIG. 22 is a section showing an arrangement of lens groups in a variable magnification optical system in a fourteenth example. FIG. 23 is a diagram showing moving states of the respective lens groups during the zooming of the variable magnification optical system of the fourteenth example. FIG. 37 are aberration diagrams of the variable magnification optical system in the fourteenth example.

The variable magnification optical system 1N of the fourteenth example has a four-component zooming construction of negative-negative-positive-negative arrangement composed of a first lens group (Gr1) having a negative optical power as a whole, a second lens group (Gr2) having a negative optical power as a whole, a third lens group (Gr3) having a positive optical power as a whole and including an optical diaphragm ST and a fourth lens group (Gr4) having a negative optical power as a whole with the respective lens groups (Gr1, Gr2, Gr3, Gr4) successively arranged from an object side to an image side as shown in FIG. 22. At the time of zooming (magnification variation), the first lens group (Gr1) is fixed, the second lens group (Gr2) is moved, the third lens group (Gr3) and the fourth lens group (Gr4) are so moved as to decrease a distance between them, and the optical diaphragm ST is moved together with the third lens group (Gr3) as shown in FIG. 23.

More specifically, in the variable magnification optical system 1N of the fourteenth example, the respective lens groups (Gr1, Gr2, Gr3, Gr4) are constructed as follows successively from the object side to the image side.

The first lens group (Gr1) is composed of a negative meniscus lens (first lens L1) convex toward the object side and a prism (L2).

The second lens group (Gr2) is composed of a biconcave negative lens (third lens L3) and a positive meniscus lens (fourth lens L4) convex toward the object side. The third lens L3 and the fourth lens L4 form a cemented lens.

The third lens group (Gr3) is composed of the optical diaphragm ST, a biconvex positive lens (fifth lens L5), a biconvex positive lens (sixth lens L6), a biconcave negative lens (seventh lens L7) and a biconvex positive lens (eighth lens L8). The optical diaphragm ST is arranged at the object side of the fifth lens L5 and moved together with the third lens group (Gr3). The optical diaphragm ST may be a mechanical shutter. Both surfaces of the fifth lens L5 are aspherical surfaces. The sixth to eighth lenses L6, L7 and L8 form a cemented lens. An image-side surface (one surface) of the eighth lens L8 is an aspherical surface.

The fourth lens group (Gr4) is composed of a biconcave negative lens (ninth lens L9). The ninth lens L9 is a lens, which is made of a resin material and both surfaces of which are aspherical surfaces.

A light receiving surface of an image pickup element SR is arranged at the image side of the fourth lens group (Gr4) via a parallel plate FT as a filter. The parallel plate FT includes various optical filters and a cover glass of the image pickup element.

In the variable magnification optical system 1N of this fourteenth example, during the zooming from a wide-angle end (WIDE) to a telephoto end (TELE) via a middle point (MIDDLE), the first lens group (Gr1) is fixed, the second lens group (Gr2) is moved along a curve convex toward the image side substantially at the middle point, the third lens group (Gr3) is substantially linearly moved in a direction toward the object at a moderate rate as compared with a movement amount of the fourth lens group (Gr4), the fourth lens group (Gr4) is substantially linearly moved in the direction toward the object and the optical diaphragm ST is moved together with the third lens group (Gr3) as shown in FIG. 23. In this way, during the zooming from the wide-angle end (WIDE) to the telephoto end (TELE), the second to fourth lens groups (Gr2, Gr3, Gr4) are so moved as to reduce distances between the first lens group (Gr1) and the third lens group (Gr3) and between the first lens group (Gr1) and the fourth lens group (Gr4).

Construction data of the respective lenses in the variable magnification optical system 1N of the fourteenth example are shown below.

Numerical Example 14

| Unit: mm | | | | |
|---|---|---|---|---|
| Surface data | | | | |
| Surface Number | r | d | nd | vd |
| Object Plane | ∞ | ∞ | | |
| 1 | 12.854 | 0.734 | 1.94595 | 17.98 |
| 2 | 6.518 | 12.69 | | |
| 3 | ∞ | 6.498 | 1.84666 | 23.78 |
| 4 | ∞ | Variable | | |
| 5 | −16.670 | 0.600 | 1.80610 | 40.73 |
| 6 | 5.436 | 1.056 | 1.92286 | 20.88 |
| 7 | 134.661 | Variable | | |
| 8 (Diaphragm) | ∞ | 0.000 | | |
| 9* | 4.920 | 1.728 | 1.49700 | 81.36 |
| 10* | −35.514 | 0.349 | | |
| 11 | 5.892 | 1.657 | 1.49700 | 81.61 |
| 12 | −9.786 | 1.175 | 1.83400 | 37.34 |
| 13 | 3.000 | 2.287 | 1.58913 | 61.25 |
| 14* | −5.952 | Variable | | |
| 15* | −4.911 | 0.600 | 1.53048 | 55.72 |
| 16* | 24.808 | Variable | | |
| 17 | ∞ | 0.500 | 1.51680 | 64.20 |
| 18 | ∞ | 0.500 | | |
| Image Plane | ∞ | | | |

Aspherical Surface Data

Ninth Surface

K = 0.0000e+000, A4 = −1.4278e−003, A6 = 4.0896e−004,
A8 = −1.1016e−004, A10 = −8.7832e−006, A12 = 6.7995e−006,
A14 = −7.3379e−007
Tenth Surface K = 0.0000e+000, A4 = −3.6777e−004, A6 = 7.3259e−004,
A8 = −3.3666e−004, A10 = 6.8722e−005, A12 = −6.4575e−006,
A14 = 1.5797e−007
Fourteenth Surface K = 0.0000e+000, A4 = 1.4400e−003, A6 = −2.0781e−004,
A8 = 7.0679e−005, A10 = −7.5826e−006, A12 = −9.7445e−007,
A14 = 1.8455e−007
Fifteenth Surface K = 0.0000e+000, A4 = 8.83619e−004, A6 = 2.6413e−004,
A8 = −2.5302e−004, A10 = 1.0426e−004, A12 = −1.0748e−005,
A14 = 4.2392e−008
Sixteenth Surface K = 0.0000e+000, A4 = −5.3592e−004, A6 = 3.0939e−004,
A8 = −1.5654e−004, A10 = 3.1223e−005, A12 = 4.7042e−006,
A14 = −9.2321e−007

| | Wide-Angle End | Middle Point | Telephoto End |
|---|---|---|---|
| Variable Distance | | | |
| Between 4$^{th}$ and 5$^{th}$ Surfaces | 2.627 | 3.304 | 1.375 |
| Between 7$^{th}$ and 8$^{th}$ Surfaces | 5.350 | 2.119 | 0.500 |
| Between 14$^{th}$ and 15$^{th}$ Surfaces | 3.495 | 2.821 | 2.821 |
| Between 16$^{th}$ and 17$^{th}$ Surfaces | 1.077 | 4.304 | 7.583 |

-continued

Unit: mm

Various Data
Zoom Data
Zoom Ratio ft/fw: 2.74

| Focal Length | 5.022 | 8.343 | 13.784 |
|---|---|---|---|
| F-Number | 2.880 | 4.086 | 5.592 |
| Angle of View | 30.430 | 19.474 | 12.080 |
| Image Height | 2.950 | 2.950 | 2.950 |
| Entire Lens Length | 31.332 | 31.339 | 31.318 |
| BF | 1.909 | 5.143 | 8.671 |

Zoom Lens Group Data

| Group | Start Surface | End Surface | Focal Length |
|---|---|---|---|
| 1 | 1 | 4 | −14.815 |
| 2 | 5 | 7 | −29.767 |
| 3 | 8 | 14 | 6.456 |
| 4 | 15 | 16 | −7.674 |

Longitudinal spherical aberrations (sine conditions), astigmatisms and distortions in the variable magnification optical system 1N of the fourteenth example under the above lens arrangement and construction are shown in FIG. 37.

Numerical values obtained in the case of applying the above conditional expressions (1) to (15) to the variable magnification optical systems 1A to 1N of the above first to fourteen examples are shown in Table-1 and Table 2.

As described above, the variable magnification optical systems 1A to 1N of the above first to fourteenth examples satisfy prerequisites according to the present invention, with the result that downsizing can be accomplished while a relatively high zoom ratio of about 2 to 3× and a cost reduction are realized. The variable magnification optical systems 1A to 1N of the above first to fourteenth examples can be downsized sufficiently for incorporation into digital apparatuses, particularly incorporation into mobile terminals and the high-pixel image pickup element 17 can be employed.

For example, the high-pixel image pickup element 17 of the class (grade) such as 5M pixels, 8M pixels or 10M pixels has a short pixel pitch (has a small pixel area) if the size thereof is fixed. Thus, the variable magnification optical system 1 needs to have a resolution corresponding to this pixel pitch, and various aberrations need to be suppressed within specified ranges specified, for example, by a specification at a required resolution, e.g. in the case of evaluating the variable magnification optical system 1 based on an MTF. In the variable magnification optical systems 1A to 1N of the above first to fourteenth examples, various aberrations are suppressed within specified ranges as shown in the respective aberration diagrams.

Although the variable magnification optical systems 1A to 1N that are continuously zoomed are shown in the above first to fourteenth examples, the variable magnification optical system 1 may be of the two-focus switching type and have the same optical construction for more downsizing.

TABLE 1

| | | EX. 1 | EX. 2 | EX. 3 | EX. 4 | EX. 5 | EX. 6 | EX. 7 |
|---|---|---|---|---|---|---|---|---|
| Conditional Expression (1) | $\beta 3T/\beta 3W$ | 2.03 | 2.12 | 2.13 | 2.38 | 2.04 | 1.99 | 1.74 |
| Conditional Expression (2) | $(\beta 3T/\beta 3W)/Z$ | 0.74 | 0.77 | 0.78 | 0.87 | 0.74 | 0.72 | 0.63 |
| Conditional Expression (5) | $|f4/fw|$ | 2.06 | 2.20 | 2.92 | 6.74 | 2.08 | 1.79 | 1.73 |
| Conditional Expression (6) | $(\beta 4T/\beta 4W)/Z$ | 0.49 | 0.47 | 0.47 | 0.42 | 0.49 | 0.50 | 0.57 |
| Conditional Expression (3) | f3/fw | 1.41 | 1.42 | 1.48 | 1.52 | 1.40 | 1.31 | 1.37 |
| Conditional Expression (4) | v3p | 81.61 | 81.61 | 59.46 | 59.46 | 81.61 | 70.45 | 76.48 |
| Conditional Expression (7) | $T12/(fw \times ft)^{1/2}$ | 0.095 | 0.095 | 0.095 | 0.095 | 0.095 | 0.088 | 0.090 |
| Conditional Expression (8) | Npr | 1.847 | 1.847 | 1.847 | 1.847 | 1.847 | 1.847 | 1.847 |
| Conditional Expression (9) | N1n | 1.946 | 1.990 | 1.938 | 1.810 | 19.46 | 1.946 | 1.927 |
| Conditional Expression (10) | Y'/TL | 0.113 | 0.111 | 0.111 | 0.112 | 0.111 | 0.113 | 0.113 |
| Conditional Expression (11) | f4/ft | 0.75 | 0.80 | 1.06 | 2.45 | 0.76 | 0.65 | 0.63 |
| Conditional Expression (12) | f3/ft | 0.51 | 0.52 | 0.54 | 0.55 | 0.51 | 0.48 | 0.50 |
| Conditional Expression (13) | αw | 20.5 | 20.5 | 19.6 | 16.2 | 20.0 | 21.2 | 22.8 |
| Conditional Expression (14) | |αw − αt| | 5.1 | 4.9 | 5.5 | 4.4 | 4.9 | 5.6 | 8.3 |
| Conditional Expression (15) | Lb/fw | 1.39 | 1.29 | 1.52 | 1.71 | 1.39 | 1.32 | 1.73 |

TABLE 2

| | | EX. 8 | EX. 9 | EX. 10 | EX. 11 | EX. 12 | EX. 13 | EX. 14 |
|---|---|---|---|---|---|---|---|---|
| Conditional Expression (1) | $\beta 3T/\beta 3W$ | 1.80 | 1.94 | 1.82 | 1.99 | 1.77 | 1.80 | 1.59 |
| Conditional Expression (2) | $(\beta 3T/\beta 3W)/Z$ | 0.66 | 0.71 | 0.66 | 0.73 | 0.64 | 0.65 | 0.58 |
| Conditional Expression (5) | $|f4/fw|$ | 1.81 | 1.74 | 2.01 | 2.38 | 1.84 | 1.44 | 1.53 |
| Conditional Expression (6) | $(\beta 4T/\beta 4W)/Z$ | 0.55 | 0.51 | 0.54 | 0.50 | 0.55 | 0.57 | 0.61 |
| Conditional Expression (3) | f3/fw | 1.60 | 1.41 | 1.26 | 1.57 | 1.19 | 1.38 | 1.29 |
| Conditional Expression (4) | v3p | 75.17 | 81.61 | 81.36 | 81.61 | 81.36 | 81.61 | 81.61 |
| Conditional Expression (7) | $T12/(fw \times ft)^{1/2}$ | 0.095 | 0.095 | 0.095 | 0.095 | 0.073 | 0.211 | 0.165 |
| Conditional Expression (8) | Npr | 1.904 | 1.847 | 1.847 | 1.847 | 1.847 | 1.847 | 1.847 |
| Conditional Expression (9) | N1n | 2.002 | 1.946 | 1.946 | 1.946 | 1.946 | 1.946 | 1.946 |
| Conditional Expression (10) | Y'/TL | 0.116 | 0.116 | 0.108 | 0.099 | 0.108 | 0.094 | 0.094 |
| Conditional Expression (11) | f4/ft | 0.66 | 0.63 | 0.73 | 0.87 | 0.67 | 0.53 | 0.56 |
| Conditional Expression (12) | f3/ft | 0.58 | 0.51 | 0.46 | 0.57 | 0.43 | 0.50 | 0.47 |
| Conditional Expression (13) | αw | 23.9 | 22.7 | 23.3 | 19.5 | 24.9 | 20.5 | 24.9 |
| Conditional Expression (14) | |αw − αt| | 8.1 | 6.1 | 9.4 | 5.5 | 11.2 | 6.7 | 12.2 |
| Conditional Expression (15) | Lb/fw | 1.69 | 1.46 | 1.62 | 1.60 | 1.58 | 0.31 | 1.73 |

The specification discloses the aforementioned arrangements. The following is a summary of the primary arrangements of the embodiments.

In the description of the following variable magnification optical system including first to fourth lens groups, β3t denotes an image magnification of the third lens group at a telephoto end, β3w denotes an image magnification of the third lens group at a wide-angle end, f3 denotes a combined focal length of the third lens group, v3p denotes a maximum value of Abbe numbers of positive lenses in the third lens group, β4t denotes an image magnification of the fourth lens group at the telephoto end, β4w denotes an image magnification of the fourth lens group at the wide-angle end, f4 denotes a combined focal length of the fourth lens group, fw denotes a focal length of the entire system at the wide-angle end and Z denotes a zoom ratio of the entire system.

A variable magnification optical system according to one aspect comprises a first lens group having a negative optical power, a second lens group having a negative optical power, a third lens group having a positive optical power and a fourth lens group having a negative optical power successively from an object side to an image side, wherein the first lens group includes only one negative lens as a lens having an optical power and the third lens group satisfies the following conditional expression (1).

$$1.4 < \beta 3t/\beta 3w < 4 \qquad (1)$$

A variable magnification optical system according to another mode comprises a first lens group having a negative optical power, a second lens group having a negative optical power, a third lens group having a positive optical power and a fourth lens group having a negative optical power successively from an object side to an image side, wherein the first lens group includes only one negative lens as a lens having an optical power and the third lens group satisfies the following conditional expression (2).

$$1.5 < (\beta 3t/\beta 3w)/Z < 2 \qquad (2)$$

The variable magnification optical systems constructed as above are negative-lead optical systems and advantageous in terms of the entire length of the optical system, a front lens diameter size and error sensitivity in a zoom lens whose zoom ratio is about 2 to 3×. Further, in these variable magnification optical systems, an optical axis adjustment between lenses in the first lens group where decentration sensitivity tends to be strict becomes unnecessary and a relatively large const reduction is possible by including only one negative lens as a lens having an optical power in the first lens group. Since the third lens group mainly bears a zooming burden in these variable magnification optical systems, the zooming burden of the third lens group is large. However, by satisfying the conditional expression (1) or (2), the entire variable magnification optical system (unit) can be downsized by reducing a movement amount for zooming. In other words, below the lower limit of the conditional expression (1) or (2), a moving distance at the time of zooming increases and the variable magnification optical system cannot be downsized, which is not preferable.

On the other hand, above the upper limit of the conditional expression (1), the decentration sensitivity of the third lens group becomes too high and an on-axis coma aberration and blurring asymmetric on a screen called one side blurring occur, thereby leading to a deteriorated image quality, which is not preferable.

According to another aspect, in the above variable magnification optical systems, the third lens group preferably satisfies the following conditional expressions (3) and (4).

$$1.25 < f3/fw < 2 \qquad (3)$$

$$71 \leq v3p \leq 100 \qquad (4)$$

The conditional expression (3) specifies the above variable magnification optical systems in terms of optical power. In other words, above the upper limit of the conditional expression (3), a moving distance at the time of zooming increases and the variable magnification optical system cannot be downsized, which is not preferable. Below the lower limit of the conditional expression (3), the decentration sensitivity of the third lens group becomes too high and an on-axis coma aberration and blurring asymmetric on a screen called one side blurring occur, thereby leading to a deteriorated image quality, which is not preferable.

The conditional expression (4) represents conditions for reducing an on-axis color aberration under the conditions defined by the conditional expression (3). In other words, below the lower limit of the conditional expression (4), it becomes difficult to correct an on-axis color aberration, which is not preferable. On the other hand, above the upper limit of the conditional expression (4), a radius of curvature becomes smaller and an uneven thickness ratio becomes larger if it is tried to obtain the same optical power. Thus, weld and birefringence occur in the case of resin lenses, and a reduction in a refractive index distribution and surface accuracy occurs in the case of glass lenses, which is not preferable.

According to another aspect, in the above variable magnification optical systems, the fourth lens group preferably satisfies the following conditional expression (5).

$$1.1 < |f4/fw| < 9 \qquad (5)$$

The conditional expression (5) defines a range necessary to realize a zoom ratio of about 2 to 3× under the conditions defined by the conditional expression (1) when the fourth lens group also bears a zooming burden. In other words, above the upper limit of the conditional expression (5), the zooming burden of the third lens group becomes too large if it is tried to maintain compactness. Thus, the decentration sensitivity of the third lens group increases, which is not preferable. Below the lower limit of the conditional expression (5), an exit pupil position variation becomes large in the fourth lens group, whereby a beam incident angle on an image pickup element increases and a difference in the beam incident angle on the image pickup element between at the wide-angle end and at the telephoto end increases to create shading and deteriorate an image quality, which is not preferable.

According to another aspect, in the above variable magnification optical systems, the fourth lens group preferably satisfies the following conditional expression (6).

$$0.3 < (\beta 4t/\beta 4w)/Z < 0.8 \qquad (6)$$

Below the lower limit of the conditional expression (6), the zooming burden of the third lens group becomes too large if it is tried to maintain compactness. Thus, the decentration sensitivity of the third lens group increases, which is not preferable. On the other hand, above the upper limit of the conditional expression (6), relative positional accuracy of the third and fourth lens groups becomes too strict to necessitate an adjustment between the lens groups and a position error in an optical axis direction or decentration direction by a driving device becomes severe to lead to a cost increase of the driving device, which is not preferable.

According to another aspect, in the above variable magnification optical systems, the fourth lens group is preferably composed of only one negative lens. By composing the fourth lens group of only one negative lens in this way, a load of a driving device for driving the fourth lens group can be reduced and an optical axis adjustment in the fourth lens group becomes unnecessary, wherefore a cost reduction can be realized.

According to another aspect, in the above variable magnification optical systems, focusing is preferably performed from an infinite object to a short-distance object by moving the fourth lens group. By performing focusing the fourth lens group in this way, it becomes possible to suppress a movement amount accompanying focusing and make aberration variations smaller.

According to another aspect, in the above variable magnification optical systems, the first lens group is preferably fixed at the time of zooming and includes a reflecting member. By fixing the first lens group at the time of zooming in this way, a lens effective diameter of the first lens group can be suppressed. Further, if the first lens group is movable, a driving device has to be arranged outside the first lens group, leading to a size increase in an outer diameter direction. It is very effective in downsizing in the outer diameter direction to fix the first lens group at the time of zooming in this way. Further, by arranging the reflecting member, it becomes possible to make the optical system thinner and increase a degree of freedom in the shape of an apparatus into which this variable magnification optical system is to be incorporated.

An image pickup device according to another aspect comprises a variable magnification optical system having any one of the above constructions and an image pickup element for converting an optical image into an electrical signal, wherein the variable magnification optical system can form an optical image of an object on a light receiving surface of the image pickup element. According to this construction, it is possible to provide an image pickup device which can be downsized.

A digital apparatus according to another aspect comprises the above image pickup device and a control unit for causing the image pickup device to perform at least one of still image recording and video recording of a subject, wherein the variable magnification optical system of the image pickup device is so incorporated as to be able to form an optical image of the subject on the light receiving surface of the image pickup element. Preferably, the digital apparatus is a mobile terminal. According to this construction, it is possible to provide a digital apparatus and a mobile terminal which can be downsized.

According to another aspect, the above digital apparatus further comprises an image processing unit for performing a specified image processing to an output of the image pickup element. More preferably, the specified image processing includes a distortion correction processing for correcting a distortion of the optical image of the subject formed on the light receiving surface of the image pickup element. By including the image processing unit, it becomes possible to reduce aberrations, which cannot be optically corrected, and a reduction in peripheral light quantity.

According to this construction, it is possible to provide a digital apparatus which performs a specified image processing. For example, it is possible to correct an aberration, which cannot be optically corrected, by an image processing by means of an information processing or correct a reduction in peripheral light quantity by an image processing by means of an information processing.

In a construction for correcting, for example, a distortion by an image processing by means of an information processing, an aberration burden by a lens closest to an object or an image plane is drastically reduced. This leads to a reduction in the number of lenses and an exit pupil position control becomes easier, wherefore the lenses can be shaped to have a better workability. Particularly, if only one negative lens is included as the lens having the optical power in the first lens group or if the fourth lens group is composed of only one negative lens, it is particularly effective to correct a distortion of an image. Alternatively, in such a construction for correcting a distortion by an image processing by means of an information processing, it is sufficient to consider only various aberrations except the distortion, wherefore a degree of freedom in the design of the variable magnification optical system is increased and an easier design becomes possible.

The present invention has been appropriately and fully described above by way of the embodiments with reference to the drawings to express the present invention. It should be appreciated that a person skilled in the art can easily modify and/or improve the above embodiments. Thus, unless a modification or improvement made by a person skilled in the art departs from the scope as claimed, such a modification or improvement is construed to be included in the scope as claimed.

What is claimed is:

1. A variable magnification optical system, comprising a first lens group having a negative optical power, a second lens group having a negative optical power, a third lens group having a positive optical power, and a fourth lens group having a negative optical power successively from an object side to an image side, wherein:

the first lens group includes only one negative lens as a lens having an optical power, and the third lens group satisfies the following conditional expression (1):

$$1.4 < \beta 3t/\beta 3w < 4 \tag{1}$$

where $\beta 3t$ denotes an image magnification of the third lens group at a telephoto end and $\beta 3w$ denotes an image magnification of the third lens group at a wide-angle end.

2. A variable magnification optical system according to claim 1, wherein the third lens group satisfies the following conditional expressions (3) and (4):

$$1.25 < f3/fw < 2 \tag{3}$$

$$71 \leq \nu 3p \leq 100 \tag{4}$$

where f3 denotes a combined focal length of the third lens group, fw denotes a focal length of the entire system at the wide-angle end and $\nu 3p$ denotes a maximum value of Abbe numbers of positive lenses in the third lens group.

3. A variable magnification optical system according to claim 1, wherein the fourth lens group satisfies the following conditional expression (5):

$$1.1 < |f4/fw| < 9 \tag{5}$$

where f4 denotes a combined focal length of the fourth lens group and fw denotes a focal length of the entire system at the wide-angle end.

4. A variable magnification optical system according to claim 1, wherein the fourth lens group satisfies the following conditional expression (6):

$$0.3 < (\beta 4t/\beta 4w)/Z < 0.8 \tag{6}$$

where $\beta 4t$ denotes an image magnification of the fourth lens group at the telephoto end, $\beta 4w$ denotes an image magnification of the fourth lens group at the wide-angle end and Z denotes a zoom ratio of the entire system.

5. A variable magnification optical system according to claim 1, wherein the fourth lens group is composed of only one negative lens.

6. A variable magnification optical system according to claim 1, wherein focusing is performed from an infinite object to a short-distance object by moving the fourth lens group.

7. A variable magnification optical system according to claim 1, wherein the first lens group is fixed at the time of zooming and includes a reflecting member.

8. An image pickup device, comprising:
a variable magnification optical system according to claim 1, and
an image pickup element for converting an optical image into an electrical signal,
wherein the variable magnification optical system forms an optical image of an object on a light receiving surface of the image pickup element.

9. A digital apparatus, comprising:
an image pickup device including a variable magnification optical system according to claim 1, and an image pickup element for converting an optical image into an electrical signal, the variable magnification optical system forming an optical image of an object on a light receiving surface of the image pickup element, and
a control unit for causing the image pickup device to perform at least one of still image recording and video recording of a subject,
wherein the variable magnification optical system of the image pickup device is so incorporated as to form an optical image of the subject on the light receiving surface of the image pickup element.

10. A digital apparatus, comprising:
an image pickup device including a variable magnification optical system according to claim 1, and an image pickup element for converting an optical image into an electrical signal, the variable magnification optical system forming an optical image of an object on a light receiving surface of the image pickup element,
an image processing unit for performing a specified image processing to an output of the image pickup element, and
a control unit for causing the image pickup device to perform at least one of still image recording and video recording of a subject,
wherein the variable magnification optical system of the image pickup device is so incorporated as to form an optical image of the subject on the light receiving surface of the image pickup element.

11. A digital apparatus, comprising:
an image pickup device including a variable magnification optical system according to claim 1, and an image pickup element for converting an optical image into an electrical signal, the variable magnification optical system forming an optical image of an object on a light receiving surface of the image pickup element,
an image processing unit for performing a specified image processing to an output of the image pickup element, and
a control unit for causing the image pickup device to perform at least one of still image recording and video recording of a subject,
wherein:
the variable magnification optical system of the image pickup device is so incorporated as to form an optical image of the subject on the light receiving surface of the image pickup element, and
the specified image processing includes a distortion correction processing for correcting a distortion of the optical image of the subject formed on the light receiving surface of the image pickup element.

12. A digital apparatus composed of a mobile terminal, comprising:
an image pickup device including a variable magnification optical system according to claim 1, and an image pickup element for converting an optical image into an electrical signal, the variable magnification optical system forming an optical image of an object on a light receiving surface of the image pickup element, and
a control unit for causing the image pickup device to perform at least one of still image recording and video recording of a subject,
wherein the variable magnification optical system of the image pickup device is so incorporated as to form an optical image of the subject on the light receiving surface of the image pickup element.

13. A variable magnification optical system, comprising a first lens group having a negative optical power, a second lens group having a negative optical power, a third lens group having a positive optical power, and a fourth lens group having a negative optical power successively from an object side to an image side, wherein:
the first lens group includes only one negative lens as a lens having an optical power, and
the third lens group satisfies the following conditional expression (2):

$$1.5 < (\beta 3t/\beta 3w)/Z < 2 \tag{2}$$

where β3t denotes an image magnification of the third lens group at a telephoto end, β3w denotes an image magnification of the third lens group at a wide-angle end and Z denotes a zoom ratio of the entire system.

14. A variable magnification optical system according to claim 13, wherein the third lens group satisfies the following conditional expressions (3) and (4):

$$1.25 < f3/fw < 2 \tag{3}$$

$$71 \leq v3p \leq 100 \tag{4}$$

where f3 denotes a combined focal length of the third lens group, fw denotes a focal length of the entire system at the wide-angle end and v3p denotes a maximum value of Abbe numbers of positive lenses in the third lens group.

15. A variable magnification optical system according to claim 13, wherein the fourth lens group satisfies the following conditional expression (5):

$$1.1 < |f4/fw| < 9 \tag{5}$$

where f4 denotes a combined focal length of the fourth lens group and fw denotes a focal length of the entire system at the wide-angle end.

16. A variable magnification optical system according to claim 13, wherein the fourth lens group satisfies the following conditional expression (6):

$$0.3 < (\beta 4t/\beta 4w)/Z < 0.8 \tag{6}$$

where β4t denotes an image magnification of the fourth lens group at the telephoto end, β4w denotes an image magnification of the fourth lens group at the wide-angle end and Z denotes a zoom ratio of the entire system.

17. A variable magnification optical system according to claim 13, wherein the fourth lens group is composed of only one negative lens.

18. A variable magnification optical system according to claim 13, wherein focusing is performed from an infinite object to a short-distance object by moving the fourth lens group.

19. A variable magnification optical system according to claim 13, wherein the first lens group is fixed at the time of zooming and includes a reflecting member.

20. An image pickup device, comprising:
- a variable magnification optical system according to claim 13, and
- an image pickup element for converting an optical image into an electrical signal,
- wherein the variable magnification optical system forms an optical image of an object on a light receiving surface of the image pickup element.

21. A digital apparatus, comprising:
- an image pickup device including a variable magnification optical system according to claim 13, and an image pickup element for converting an optical image into an electrical signal, the variable magnification optical system forming an optical image of an object on a light receiving surface of the image pickup element, and
- a control unit for causing the image pickup device to perform at least one of still image recording and video recording of a subject,
- wherein the variable magnification optical system of the image pickup device is so incorporated as to form an optical image of the subject on the light receiving surface of the image pickup element.

22. A digital apparatus, comprising:
- an image pickup device including a variable magnification optical system according to claim 13, and an image pickup element for converting an optical image into an electrical signal, the variable magnification optical system forming an optical image of an object on a light receiving surface of the image pickup element,
- an image processing unit for performing a specified image processing to an output of the image pickup element, and
- a control unit for causing the image pickup device to perform at least one of still image recording and video recording of a subject,
- wherein the variable magnification optical system of the image pickup device is so incorporated as to form an optical image of the subject on the light receiving surface of the image pickup element.

23. A digital apparatus, comprising:
- an image pickup device including a variable magnification optical system according to claim 13, and an image pickup element for converting an optical image into an electrical signal, the variable magnification optical system forming an optical image of an object on a light receiving surface of the image pickup element,
- an image processing unit for performing a specified image processing to an output of the image pickup element, and
- a control unit for causing the image pickup device to perform at least one of still image recording and video recording of a subject,
- wherein:
- the variable magnification optical system of the image pickup device is so incorporated as to form an optical image of the subject on the light receiving surface of the image pickup element, and
- the specified image processing includes a distortion correction processing for correcting a distortion of the optical image of the subject formed on the light receiving surface of the image pickup element.

24. A digital apparatus composed of a mobile terminal, comprising:
- an image pickup device including a variable magnification optical system according to claim 13, and an image pickup element for converting an optical image into an electrical signal, the variable magnification optical system forming an optical image of an object on a light receiving surface of the image pickup element, and
- a control unit for causing the image pickup device to perform at least one of still image recording and video recording of a subject,
- wherein the variable magnification optical system of the image pickup device is so incorporated as to form an optical image of the subject on the light receiving surface of the image pickup element.

* * * * *